US010749384B2

(12) United States Patent
Park et al.

(10) Patent No.: US 10,749,384 B2
(45) Date of Patent: Aug. 18, 2020

(54) ELECTRONIC DEVICE AND METHOD FOR COMMUNICATING WITH EXTERNAL ELECTRONIC DEVICE

(71) Applicant: SAMSUNG ELECTRONICS CO., LTD., Suwon-si, Gyeonggi-do (KR)

(72) Inventors: Chun-Ho Park, Seoul (KR); Min-Ho Kang, Suwon-si (KR); Doo-Suk Kang, Suwon-si (KR); Hyuk Kang, Yongin-si (KR); Bo-Kun Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 27 days.

(21) Appl. No.: 16/015,418

(22) Filed: Jun. 22, 2018

(65) Prior Publication Data
US 2019/0006891 A1   Jan. 3, 2019

(30) Foreign Application Priority Data
Jun. 30, 2017 (KR) ........................ 10-2017-0083766

(51) Int. Cl.
*H02J 50/80* (2016.01)
*H02J 7/02* (2016.01)
*H04W 4/80* (2018.01)
*H02J 50/90* (2016.01)
(Continued)

(52) U.S. Cl.
CPC .............. *H02J 50/80* (2016.02); *H02J 7/025* (2013.01); *H02J 50/90* (2016.02); *H04W 4/80* (2018.02);
(Continued)

(58) Field of Classification Search
CPC .. H02J 50/80; H02J 50/90; H02J 7/025; H02J 50/12; H02J 50/30; H02J 50/10;
(Continued)

(56) References Cited

U.S. PATENT DOCUMENTS

| | | | |
|---|---|---|---|
| 6,965,816 B2 * | 11/2005 | Walker | B64C 13/20 |
| | | | 701/16 |
| 9,378,603 B2 | 6/2016 | Seino | |

(Continued)

FOREIGN PATENT DOCUMENTS

JP     2009-177644     8/2009

*Primary Examiner* — M Baye Diao
(74) *Attorney, Agent, or Firm* — Nixon & Vanderhye P.C.

(57) ABSTRACT

An electronic device according to various embodiments may include: a wireless communication circuit configured to support short-range communication; a wireless charging circuit configured to support wireless charging; at least one processor electrically connected to the wireless communication circuit and the wireless charging circuit; and a memory electronically connected to the at least one processor. The memory is configured to store instructions that when executed by the at least one processor cause the electronic device to perform operations comprising: identifying an area in which the electronic device is located, based on at least one of a second signal for communicating with an external electronic device via the wireless communication circuit when the external electronic device is located in a second area, a first signal for communicating with the external electronic device via the wireless charging circuit when the external electronic device is located in a first area within the second area, and a combination of at least a part of the first signal and the second signal; identifying an operation mode corresponding to the area; and controlling operation of the electronic device, based on the identified operation mode.

20 Claims, 20 Drawing Sheets

(51) Int. Cl.
  *H02J 50/12* (2016.01)
  *H04W 88/02* (2009.01)
  *H04B 5/00* (2006.01)
  *H04W 76/25* (2018.01)
  *H04W 4/06* (2009.01)
  *H02J 50/30* (2016.01)
  *H02J 50/10* (2016.01)

(52) U.S. Cl.
  CPC .............. *H02J 50/10* (2016.02); *H02J 50/12* (2016.02); *H02J 50/30* (2016.02); *H04B 5/0037* (2013.01); *H04W 4/06* (2013.01); *H04W 76/25* (2018.02); *H04W 88/02* (2013.01)

(58) Field of Classification Search
  CPC ....... H04W 4/80; H04W 76/25; H04W 88/02; H04W 4/06; H04W 88/06; H04W 12/06; H04W 4/023; H04B 5/0037
  USPC ........................................................ 320/108
  See application file for complete search history.

(56) References Cited

U.S. PATENT DOCUMENTS

| | | |
|---|---|---|
| 10,015,303 B2 * | 7/2018 | Kim ................... H04B 5/0031 |
| 10,067,735 B2 * | 9/2018 | Chun ................... H04W 76/14 |
| 2007/0156179 A1 * | 7/2007 | S.E. ................... A61N 1/36089 607/2 |
| 2012/0109422 A1 | 5/2012 | Katou |
| 2017/0047784 A1 * | 2/2017 | Jung ....................... H02J 50/12 |

* cited by examiner ic Property Office on Jun. 30, 2017, the disclosure of which is incorporated by reference herein in its entirety.

ELECTRONIC DEVICE AND METHOD FOR COMMUNICATING WITH EXTERNAL ELECTRONIC DEVICE

CROSS-REFERENCE TO RELATED APPLICATION

This application is based on and claims priority under 35 U.S.C. § 119 to Korean Patent Application Serial No. 10-2017-0083766, which was filed in the Korean Intellectual Property Office on Jun. 30, 2017, the disclosure of which is incorporated by reference herein in its entirety.

TECHNICAL FIELD

The disclosure relates to an electronic device, and for example, to an electronic device and a method for communicating with an external electronic device.

BACKGROUND

A smart key for a vehicle can unlock a lock of the door or the trunk of the vehicle and can start an engine via bidirectional communication, when a user only carries the vehicle smart key. The vehicle smart key uses an immobilizer function and a unique cryptogram, whereby vehicle theft is prevented and convenience may be provided.

The vehicle smart key can provide a function of a certain user authentication device (theftproof), and can start an engine after system authentication. The vehicle smart key can perform a door/trunk lock control function, an alarm function, an engine start function, or the like at a long distance (e.g., about 30 m) using the smart key. The vehicle smart key may recognize proximity (e.g., about 5 m) between the vehicle and the smart key using short-range communication, and can automatically unlock the door and start the engine of the vehicle.

An existing vehicle smart key has provided a smart key function basically using two wireless frequency signals, such as a low frequency (LF) signal and an ultra high frequency (UHF) signal. For example, the smart key uses an LF antenna to recognize a short-distance and uses a UHF antenna to recognizes a long-distance, in performing a smart key operation.

When it is desired to operate a vehicle smart key by including the vehicle smart key in an electronic device (e.g., a portable phone), the way of installing an antenna in consideration of the limited space in the electronic device and the way of securing performance after the installation of the antenna need to be considered. In order to install the existing smart key function in the portable terminal, a UHF antenna and an LF antenna need to be installed in the portable terminal. From the perspective of the structure and the size of a terminal, it is very difficult to prepare a space for the installation of the LF and UHF band antennas in the terminal. Particularly, the vehicle smart key uses the LF and UHF band antennas. Conversely, the electronic device mainly use a GHz band antenna. Therefore, it may be difficult to install the antennas of the vehicle smart key in the electronic device. Also, although the antennas can be installed in the electronic device, it is difficult to secure the desired performance using the corresponding antennas. For example, when a smart key is installed in the electronic device, performance may deteriorate according to various conditions, such as a way that the electronic device is held, the location of the electronic device, or the like due to the characteristics of the electronic device. Also, there is desire for a method of avoiding the deterioration in the performance.

SUMMARY

According to various embodiments of the disclosure, an electronic device may include: a wireless communication circuit configured to support short-range communication; a wireless charging circuit configured to support wireless charging; at least one processor electrically connected to the wireless communication circuit and the wireless charging circuit; and a memory electronically connected to the at least one processor, wherein the memory is configured to store instructions and, the instructions when executed by the at least one processor, cause the electronic device to perform operations including: identifying an area where the electronic device is located, based on at least one of a second signal for communicating with an external electronic device via the wireless communication circuit when the external electronic device is located in a second area, a first signal for communicating with the external electronic device via the wireless charging circuit when the external electronic device is located in a first area within the second area, and a combination of at least a part the first signal and the second signal; identifying an operation mode corresponding to the identified area; and controlling operation of the electronic device, based on the determined operation mode.

According to various embodiments, a method of communicating with an external electronic device by an electronic device may include: identifying an area where the electronic device is located, based on at least one of a second signal for communicating with the external electronic device via a wireless communication circuit when the external electronic device is located in a second area, a first signal for communicating with the external electronic device via the wireless charging circuit when the external electronic device is located in a first area within the second area, and a combination of at least a part the first signal and/or the second signal; identifying an operation mode corresponding to the identified area from among a plurality of operation modes of the electronic device; and controlling operation of the electronic device, based on the identified operation mode.

According to various embodiments, an electronic device may include: a housing; a touch screen display exposed through a first part of the housing; a wireless communication circuit configured to support short-range communication; a wireless charging circuit configured to support wireless charging; a power supply electrically connected to the wireless charging circuit; at least one processor electrically connected to the wireless communication circuit and the wireless charging circuit; and a memory electronically connected to the processor, wherein the memory stores instructions, that when executed by the at least one processor, cause the electronic device to perform operations, including: identifying a second mode, based on a second signal received from an external electronic device in a second area via the wireless communication circuit, and displaying a second menu corresponding to the identified second mode on the touch screen display; and identifying a first mode, based on a first signal received in a first area within the second area via the wireless charging circuit, and displaying a first menu corresponding to the identified first mode on the touch screen display.

According to various embodiments, an electronic device may provide the function of a vehicle smart key, thereby controlling at least some functions of an external electronic device (e.g., a vehicle).

According to various embodiments, an electronic device may provide different functions according to the distance between the electronic device and an external electronic device, using a short-range communication scheme and a resonance-based wireless charging scheme

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
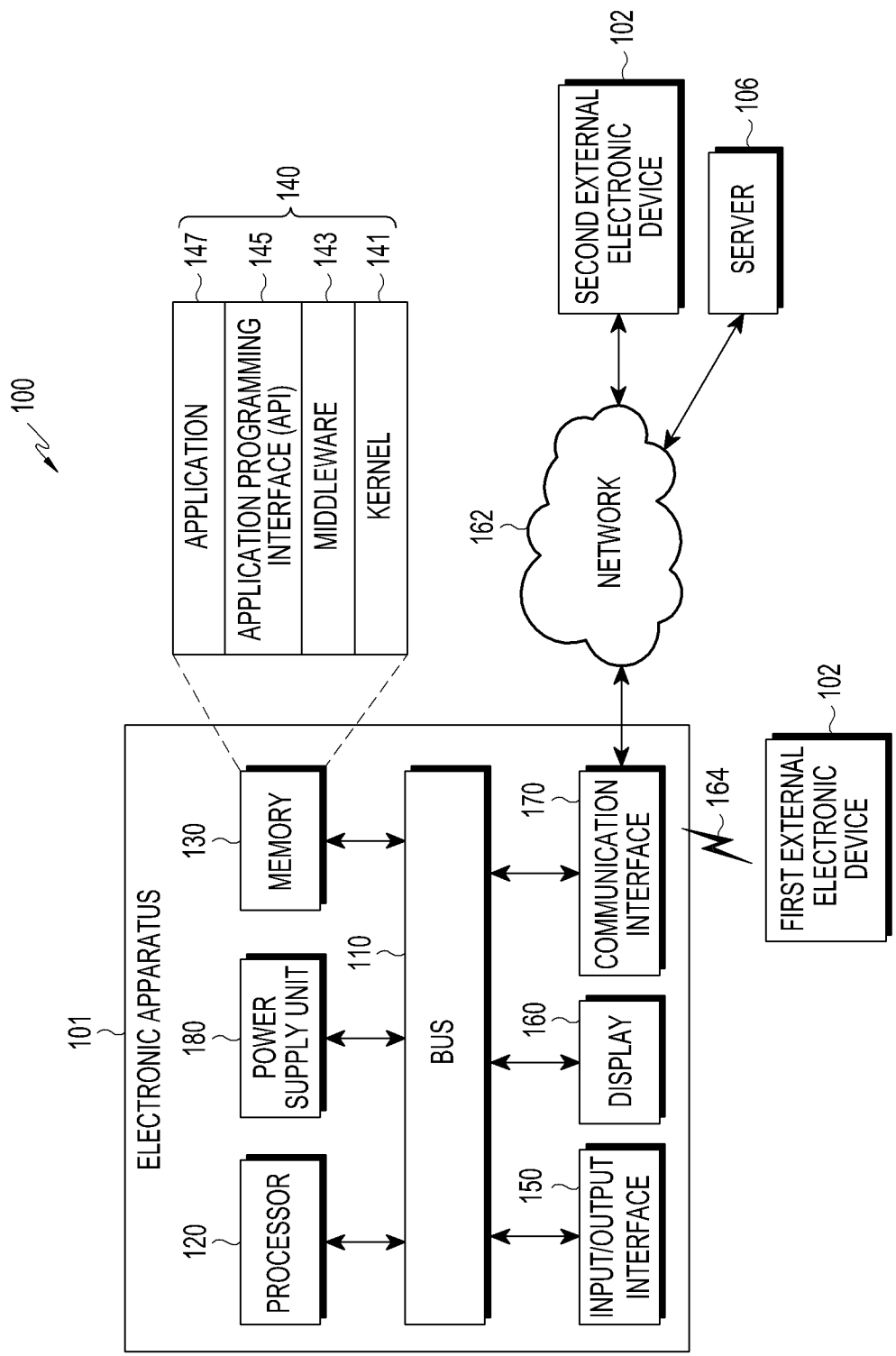
FIG. 1 is a diagram illustrating an electronic device in a network environment according to various embodiments.

Hereinafter, various example embodiments will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments may be used to identify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily refer to "specifically designed to" in hardware. Alternatively, in some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device, or the like.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various embodiments, the electronic device may be a combination of one or more of the aforementioned various devices. According to some embodiments, the electronic device may also be a flexible device. Further, the electronic device according to an embodiment is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a diagram illustrating an electronic device 101 in a network environment 100 according to various embodiments.

The electronic device 101 may include a bus 110, a processor (e.g., including processing circuitry) 120, a memory 130, an input/output interface (e.g., including input/output circuitry) 150, a display 160, a communication interface (e.g., including communication circuitry) 170, and a power supply 180. The electronic device 101 may include at least one from among, for example, a battery, a PMIC, a BT/BLE communication unit, an eSE sensor, a sensor processing unit, a wireless charger, a power element, and an AP, in association with a smart key operation. In some embodiments, the electronic device 101 may omit at least one of the elements, or may further include other elements. The electronic device 101 may, for example, and without limitation, be a device that a user can carry (e.g., a smart phone, a wearable device, or the like), or a vehicle capable of communicating with a device that a user can carry, or the like.

The bus 110 may connect elements 110 to 170, and may include a circuit for transmitting communication (e.g., a control message or data) between the elements.

The processor 120 may include various processing circuitry, such as, for example, and without limitation, one or more of a dedicated processor, a central processing unit (CPU), an application processor (AP), and a communication processor (CP), or the like. The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an Operating System (OS).

The kernel 141 may control or manage, for example, system resources (e.g., the bus 110, the processor 120, the memory 130, or the like) used for executing operations or functions implemented in other programs (e.g., middleware 143, an API 145, or an application program 147). Furthermore, the kernel 141 may provide an interface via which the middleware 143, the API 145, or the application programs 147 may access the individual elements of the electronic device 101 to control or manage the system resources.

The middleware 143 may function as, for example, an intermediary to enable the API 145 or the application programs 147 to communicate with the kernel 141 to exchange data.

Furthermore, the middleware 143 may process one or more task requests, which are received from the application programs 147, according to priorities thereof. For example, the middleware 143 may assign, to at least one of the application programs 147, a priority to use a system resource of the electronic device 101 (e.g., the bus 110, the processor 120, the memory 130, or the like). For example, the middleware 143 may perform scheduling or loading balancing on the one or more task requests by processing the one or more task requests according to the priorities assigned to the one or more application programs.

The API 145 is an interface via which the applications 147 control functions provided from the kernel 141 or the middleware 143, and may include, for example, at least one interface or function (e.g., instruction) for file control, window control, image processing, text control, or the like.

The input/output interface 150 may include various input/output circuitry and serve as an interface that may transfer command or data, which is input from a user or an external device, to another element(s) of the electronic device 101. Furthermore, the input/output interface 150 may output commands or data received from the other element(s) of the electronic device 101 to a user or an external device.

The display 160 may include, for example, a liquid crystal display (LCD), a light-emitting diode (LED) display, an organic light-emitting diode (OLED) display, a micro electro mechanical systems (MEMS) display, or an electronic paper display, or the like, but is not limited thereto. The display 160 may display various contents (e.g., text, images, videos, icons, and/or symbols) to a user. The display 160 may include a touch screen and may receive, for example, a touch, gesture, proximity, or hovering input using an electronic pen or the user's body part.

The communication interface 170 may include various communication circuitry and establish communication between the electronic device 101 and an external device (e.g., a first external electronic device 102, a second external electronic device 104, or a server 106). For example, the communication interface 170 may be connected to the network 162 via wireless communication or wired communication, and may communicate with an external device (e.g., the second external electronic device 104 or the server 106). The communication interface 170 may include a wireless communication circuit (e.g., a wireless communication circuit 415 of FIG. 4A) that wirelessly communicates with an external device.

The wireless communication may use at least one of, for example, long term evolution (LTE), LTE-advanced (LTE-A), code division multiple access (CDMA), wideband CDMA (WCDMA), universal mobile telecommunications system (UMTS), WiBro (Wireless Broadband), global system for mobile communications (GSM), and the like, as a cellular communication protocol. In addition, the wireless communication may include, for example, short-range communication 164. The short-range communication 164 may include at least one of, for example, Wi-Fi, light fidelity (Li-Fi), Bluetooth, near field communication (NFC), and the like. The GNSS may include at least one of, for example, a global positioning system (GPS), a global navigation satellite system (Glonass), a Beidou navigation satellite system (hereinafter referred to as "Beidou"), and a European global satellite-based navigation system (Galileo), according to a use area, a bandwidth, or the like. Hereinafter, in the present disclosure, the "GPS" may be interchangeably used with the "GNSS". The wired communication may include, for example, at least one of a universal serial bus (USB), high definition multimedia interface (HDMI), recommended standard 232 (RS-232), a plain old telephone service (POTS), and the like. The network 162 may include at least one of a communication network such as a computer network (e.g., a LAN or a WAN), the Internet, and a telephone network. The wireless communication circuit may communicate (Wi-Fi, ZigBee, BT/BLE) with the wireless communication circuit (e.g., the wireless communication circuit 415 of FIG. 4A) of the first external electronic device 102 using a 2.4 GHz bidirectional frequency. The wireless communication circuit may perform transmission and reception of data with the first external electronic device 102 via a wireless communication circuit that supports wireless communication of a predetermined frequency. The wireless communication circuit of the electronic device 101 may transmit information associated with the electronic device 101 to the first external electronic device 102. When the electronic device 101 is enabled to perform proximity communication with the first external electronic device 102 via a wireless communication circuit, the electronic device 101 may connect proximity communication with the first external electronic device 102 via a wireless communication circuit (the wireless communication circuit 415 of FIG. 4A) in the communication interface 170, and may transmit detailed information associated with the electronic device 101 to the first external electronic device 102.

The power supply 180 may be provided with alternating current (AC) power from the outside, and may convert the provided AC power into direct current (DC) power. Generally, the power supply 180 may be provided with power from the outside. The power supply 180 may include a battery (not illustrated), a control circuit (e.g., a control circuit 419 of FIG. 4A) that controls wiredly/wirelessly supplied power, and a wireless charging circuit (e.g., a wireless charging circuit 410 of FIG. 4A) that charges the battery (not illustrated) with power that wirelessly provided from a vehicle.

The control circuit (e.g., the control circuit 419 of FIG. 4A) may supply power to the battery (not illustrated) included in the power supply 180 according to control of the processor 120. A single battery or a plurality of batteries included in the control circuit (e.g., the control circuit 419 of FIG. 4A) may supply power to the electronic device 101. According to an embodiment, the control circuit (e.g., the control circuit 419 of FIG. 4A) may supply, to the electronic device 101, power input from an external power source via a wired cable. According to an embodiment, the control circuit (e.g., the control circuit 419 of FIG. 4A) may control the electronic device 101 such that the battery is charged with power that is wirelessly received from the first external electronic device 102 via the wireless charging circuit (e.g., the wireless charging circuit 410 of FIG. 4A). For example, the control circuit may wirelessly receive power from the first external electronic device 102 via a wireless power transmission/reception conductive pattern (or coil (e.g., a coil 411 of FIG. 4A)) installed in the wireless charging circuit (e.g., the wireless charging circuit 410 of FIG. 4A). The wireless charging circuit (e.g., the wireless charging circuit 410 of FIG. 4A) may be wirelessly provided with power via an interface for wirelessly receiving power from the first external electronic device 102, resonance coupling, laser, light, or the like, and may perform data communication using available communication resources when receiving power. For example, the wireless charging circuit (e.g., the wireless charging circuit 410 of FIG. 4A) may perform, with the first external electronic device 102, transmission and reception of initial information and information indicating whether proximity communication exists. The wireless charging circuit (e.g., the wireless charging circuit 410 of FIG. 4A) may include a charging circuit for wirelessly receiving power from the first external electronic device 102. The wireless charging circuit (the wireless charging circuit 410 of FIG. 4A) may receive information associated with the first external electronic device 102 from the first external electronic device 102. The wireless charging circuit (e.g., the wireless charging circuit 410 of FIG. 4A) may receive a signal from the first external electronic device 102 in response to an event that senses the first external electronic device 102. The communication interface 170 may receive a charging function control signal that controls a charging function of the electronic device 101 from the processor 120, and may transmit the same to the first external electronic device 102. The charging function control signal may be a control signal that controls the wireless charging circuit (e.g., the wireless charging circuit 410 of FIG. 4A) of the electronic device 101 such that a charging function is enabled or disabled. The communication interface 170 may transmit a trigger signal to the first external electronic device 102. The electronic device 101 may sense the first external electronic device 102 using at least one of BLE, a proximity sensor, an NFC, and WiGig. Also, the electronic device 101 may detect the first external electronic device 102 using various methods excluding the above described methods, and may transmit a trigger signal corresponding to the detection to the first external electronic device 102.

According to an embodiment, the processor 120 may compare information associated with the first external electronic device 102 which is included in a signal that the first external electronic device 102 transmits and information associated with a plurality of external electronic devices that is stored in advance in the electronic device 101, to authenticate the first external electronic device 102. According to an embodiment, when the strength of a signal transmitted and received to/from the first external electronic device 102 is greater than a designated threshold value, the processor 120 may operate the electronic device 101 in a first mode such that a control signal corresponding to the first mode is transmitted to the external electronic device 102. When the wireless charging signal is received from the external electronic device 102 while the electronic device 101 operates in the first mode, the processor 120 may operate the electronic device 101 in a second mode, such that a control signal corresponding to the second mode is transmitted to the external electronic device 102. According to an embodiment, the processor 120 may wirelessly receive power from the external electronic device 102, and charge a power supply (e.g., a battery) with the received power. The processor 120 may calculate (determine) charging efficiency of the wirelessly received power, and may transmit the calculated efficiency to the external electronic device 102. According to an embodiment, the processor 120 may compare the media access control (MAC) address of the external electronic device 102 that transmits the signal and the MAC addresses of a plurality of external electronic devices that are stored in advance, to authenticate the external electronic device 102. The authentication is to determine whether to approve controlling the external electronic device 102 using the electronic device 101. For example, the processor 120 may authenticate the external electronic device 102 using a previously stored key value, based on a secure channel that is connected to the external electronic device 102.

According to an embodiment, the first external electronic device 102 may determine an area where the electronic device is located, based on at least one of a signal transmitted and received in proximity communication with the electronic device 101, a wireless charging signal transmitted and received to/from the electronic device 101, or a combination of at least a part thereof. The first external electronic device 102 may determine the operation mode of the first external electronic device 102, based on the determined area, and may control operation of the first external electronic device 102, based on the determined operation mode. The first external electronic device 102 may transmit the signal to the electronic device 101, and may receive a response signal from the electronic device 101 in response to the transmitted signal. The first external electronic device 102 may compare information associated with the electronic device 101 and information associated with a plurality of electronic devices that is stored in advance in the first external electronic device 102, to authenticate the electronic device 101. The first external electronic device 102 may maintain connection with the electronic device 101.

According to an embodiment, the first external electronic device 102 may be a vehicle that is capable of communicating with a device that a user can carry (e.g., a smart phone, a wearable device, or the like), or a device that a user can carry. At least one function or operation performed by the electronic device 101 may be performed in the first external electronic device 102, and at least one function or operation performed by the first external electronic device 102 may be performed by the electronic device 101.

According to an embodiment, each of the first and second external electronic devices 102 and 104 may be of a type the same as or different from the electronic device 101. According to an embodiment, the server 106 may include a group of one or more servers. According to various embodiments, all or a part of operations executed in the electronic device 101 may be performed by another electronic device or a plurality of electronic devices (e.g., the electronic devices 102 and 104, or the server 106). According to an embodiment, when the electronic device 101 has to perform some functions or services automatically or in response to a request, the electronic device 101 may request another device (e.g., the external electronic device 102 or 104 or the server 106) to perform at least some functions relating thereto, instead of, or in addition to, performing the functions or services by itself. The other electronic device (e.g., the external electronic device 102 or 104, or the server 106) may execute a requested function or additional function, and may transfer the result to the electronic device 101. The electronic device 101 may process the received result as it is or may additionally process the received result, to provide the requested functions or services. To this end, for example, cloud computing, distributed computing, or client-server computing technology may be used.

Figure 2:
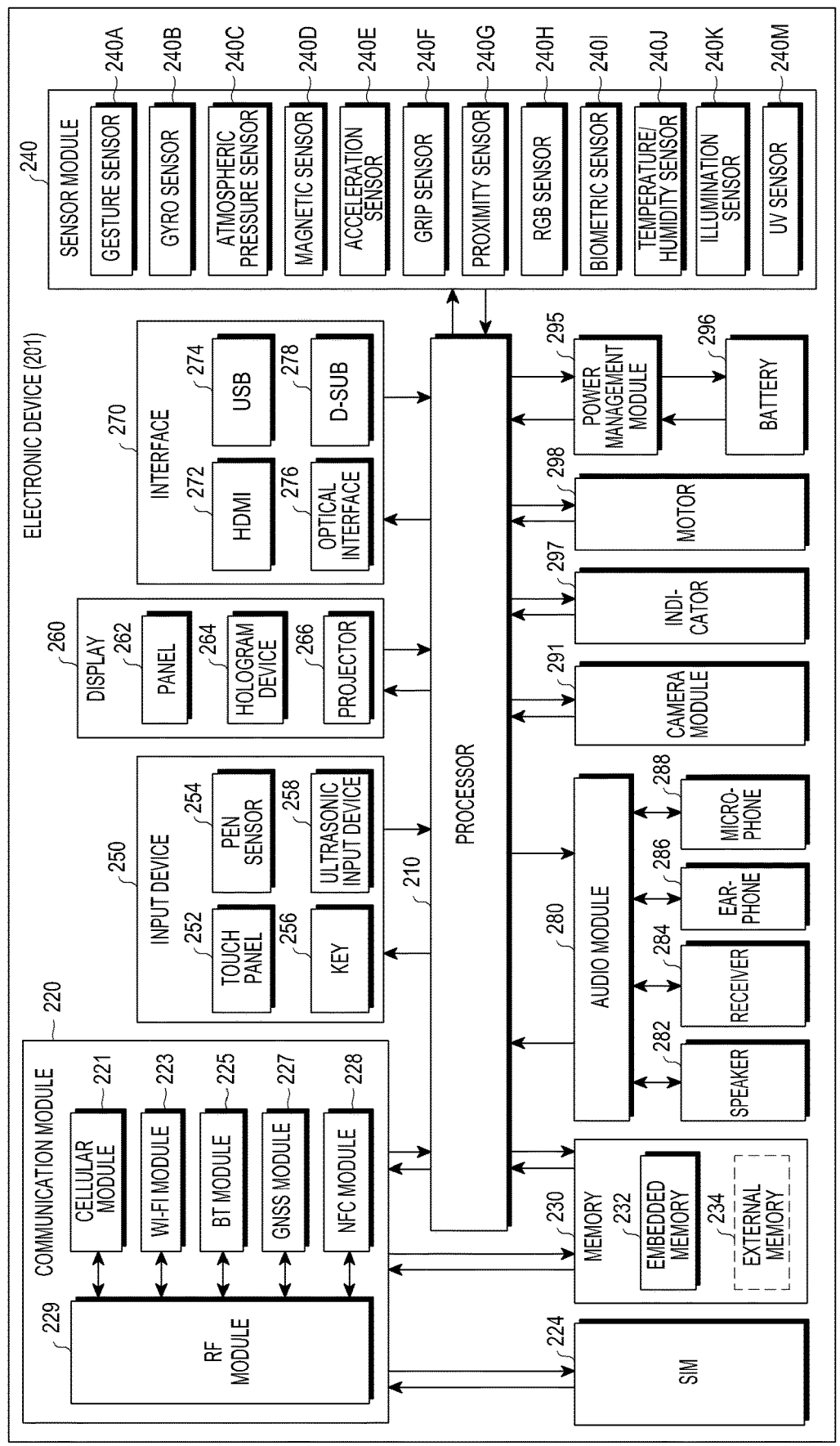
FIG. 2 is a block diagram of an electronic device according to various embodiments.

FIG. 2 is a block diagram illustrating an electronic device 201 according to various embodiments.

The electronic device 201 may include, for example, a part or the entirety of the electronic device 101 illustrated in FIG. 1. The electronic device 201 may include one or more processors (e.g., AP) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 (e.g., the processor 120) may include various processing circuitry and drive an operating system or an application program, whereby a plurality of hardware or software elements connected thereto is controlled and various data processing and operations may be performed. The processor 210 may be embodied, for example, as a System on Chip (SoC). According to an embodiment, the processor 210 may further include a graphic processing unit (GPU) and/or an image signal processor. The processor 210 may include at least a part (e.g., cellular module 221) of the elements illustrated in FIG. 2. The processor 210 loads a command or data received from the other elements (e.g., a non-volatile memory) in a volatile memory, processes the command or data, and stores various data in a non-volatile memory.

The communication module 220 may have a configuration equal or similar to that of the communication interface 170 of FIG. 1. The communication module 220 may include various communication circuitry that may be included in various communication chips, such as, for example, and without limitation, a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229, or the like.

The cellular module 221 may provide, for example, a voice call service, a video call service, a text message service, an Internet service, or the like via a communication network. According to an embodiment, the cellular module 221 may distinguish and authenticate the electronic device 201 in a communication network using a subscriber identification module (e.g., a SIM card) 224. According to an embodiment, the cellular module 221 may perform at least some of the functions that the processor 210 may provide. According to an embodiment, the cellular module 221 may include a communication processor (CP).

Each of the Wi-Fi module 223, the Bluetooth module 225, the GNSS module 227, or the NFC module 228 may include, for example, a processor that processes data transmitted and received via a corresponding module. According to an embodiment, at least some (e.g., two or more) of the cellular module 221, the Wi-Fi module 223, the Bluetooth module 225, the GNSS module 227, and the NFC module 228 may be included in a single integrated chip (IC) or IC package.

The RF module 229 may transmit and receive, for example, a communication signal (e.g., an RF signal). The RF module 229 may include, for example, a transceiver, a power amplifier module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal via a separate RF module.

The subscriber identification module 224 may include, for example, a card including a subscriber identification module and/or an embedded SIM, or may include unique identification information (e.g., integrated circuit card identifier (ICCID)) or subscriber information (e.g., an international mobile subscriber identity (IMSI)).

The memory 230 (e.g., the memory 130) may include, for example, an embedded memory 232 and/or an external memory 234. The embedded memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a Solid State Drive (SSD).

The external memory 234 may further include a flash drive, for example, a compact flash (CF), a secure digital (SD), a micro secure digital (Micro-SD), a mini secure digital (Mini-SD), an extreme digital (xD), a multi-media card (MMC), a memory stick, or the like. The external memory 234 may be functionally and/or physically connected to the electronic device 201 via various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an Red, Green, and Blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. According to an embodiment, the electronic device 201 may further include a processor, which is configured to control the sensor module 240, as a part of the processor 210 or separately from the processor 210, in order to control the sensor module 240 while the processor 210 is in a sleep state.

The input device 250 may include various input circuitry, such as, for example, and without limitation, a touch panel 252, a (digital) pen sensor 254, a key 256, and an ultrasonic input unit 258, or the like. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is a part of a touch panel or is separated from a touch panel. The key 256 may include, for example, a physical button, an optical key, or a keypad. The ultrasonic input device 258 may sense ultrasound waves generated from an input device by using a microphone (e.g., the microphone 288), and identify data corresponding to the sensed ultrasound waves.

The display 260 (e.g., the display 160) may include a panel 262, a hologram device 264, and a projector 266. The panel 262 may include a configuration that is identical or similar to the display 160 illustrated in FIG. 1. The panel 262 may be embodied to be, for example, flexible, transparent, or wearable. The panel 262 and the touch panel 252 may be formed as one module. The hologram device 264 may show a three dimensional image in the air by using light interference. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278, or the like. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert, for example, a sound and an electric signal. At least some elements of the audio module 280 may be included in, for example, the input/output interface 150 illustrated in FIG. 1. The audio module 280 may process sound information that is input or output via, for example, a speaker 282, a receiver 284, earphones 286, the microphone 288, and the like.

The camera module 291 is a device for capturing an image or a video, and may include one or more image sensors (e.g., a front side sensor or a back side sensor), a lens, an image signal processor (ISP), or a flash (e.g., an LED or xenon lamp).

The power management module 295 may manage, for example, the power of the electronic device 201. The electronic device 201 may be an electronic device that is provided with power via a battery, but may not be limited thereto. According to an embodiment, the power management module 295 may include a power management integrated circuit (PMIC), a charger integrated circuit (IC), or a battery or fuel gauge. The PMIC may use a wired and/or wireless charging method. The wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a predetermined state of the electronic device 201 or a part of the electronic device 201 (e.g., the processor 210), such as a boot-up state, a message state, a charging state, or the like. The motor 298 may convert an electrical signal into a mechanical vibration and may generate a vibration, a haptic effect, or the like. Although not illustrated, the electronic device 201 may include a processing device (e.g., GPU) for supporting mobile TV. The processing unit for supporting mobile TV may process media data according to a standard, such as digital multimedia broadcasting (DMB), digital video broadcasting (DVB), MediaFlo™, and the like.

Each of the above-described elements in the present document may include one or more components, and the names of the corresponding components may vary based on the type of electronic device. According to various embodiments, an electronic device in the present document may include at least one of the described elements, and a few elements may be omitted or additional elements may be further included. In addition, some of the elements of an electronic device according to various embodiments may be combined as a single entity, and may perform the same functions as those of original elements.

Figure 3:
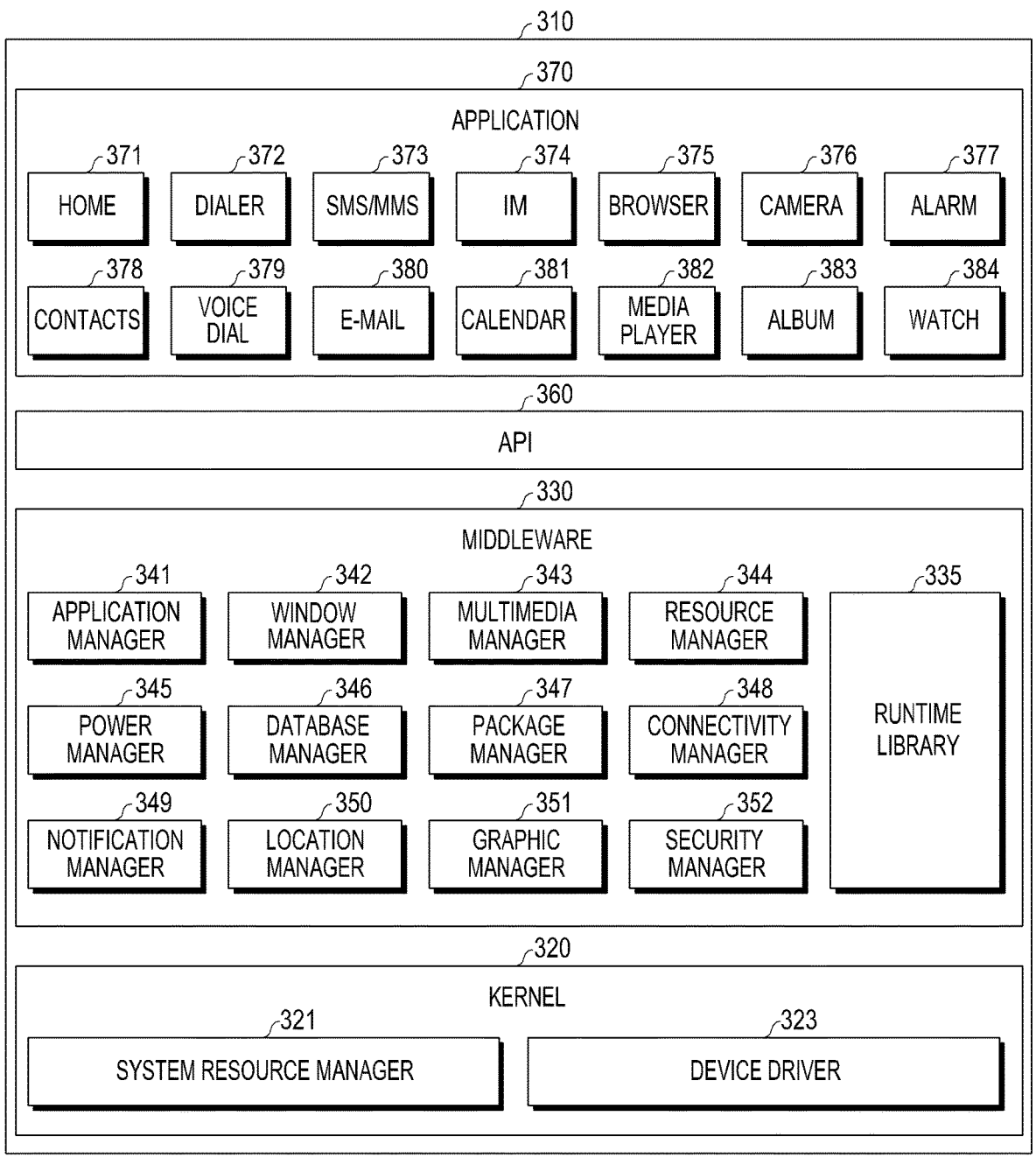
FIG. 3 is a block diagram of a program module according to various embodiments.

FIG. 3 is a block diagram illustrating a program module according to various embodiments.

According to an embodiment, the program module 310 (e.g., the program 140) may include an operating system (OS) that controls resources relating to an electronic device (e.g., the electronic device 101) and/or various applications (e.g., the application programs 147) running on the operating system. The operation system may be, for example, Android™, iOS™, Windows™, Symbian™, Tizen™, Samsung Bada OS, or the like.

The program module 310 may include a kernel 320, middleware 330, an application programming interface (API) 360, and/or an application 370. At least some of the program module 310 may be preloaded on an electronic device, or may be downloaded from an external electronic device (e.g., the external electronic device 102 or 104, or the server 106).

The kernel 320 (e.g., the kernel 141) may include, for example, a system resource manager 321 and/or a device driver 323. The system resource manager 321 may control, assign, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 via the API 360 such that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform input/output management, memory management, a function for an arithmetic function, or the like.

The application manager 341 may manage, for example, the life cycle of at least one of the applications 370. The window manager 342 may manage Graphical User Interface (GUI) resources used on a screen. The multimedia manager 343 may determine formats required for reproducing various media files and may encode or decode a media file using a coder/decoder (codec) appropriate for a corresponding format. The resource manager 344 may manage resources, such as a source code, a memory, a storage space, and the like of at least one of the applications 370.

The power manager 345 may operate together with, for example, a basic input/output system (BIOS) to manage the capacity, temperature, or power of a battery, and provide power information required for operation of the electronic device. The database manager 346 may generate, search for, or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, or the like, in such a manner as not to disturb a user. The location manager 350 may manage location information of the electronic device. The graphic manager 351 may manage graphic effects to be provided to a user or user interfaces related to the graphic effects. The security manager 352 may provide various security functions required for system security, user authentication, or the like. According to an embodiment, when the electronic device (e.g., the electronic device 101) has a telephone call function, the middleware 330 may further include a telephony manager that manages a voice or video call function of the electronic device.

The middleware 330 may include a middleware module for forming a combination of various functions of the aforementioned elements. The middleware 330 may provide a module specified for each type of operating system in order to provide a differentiated function. Also, the middleware 330 may dynamically delete some of the existing elements, or may add new elements.

The API 360 (e.g., the API 145) is, for example, a set of API programming functions, and may be provided in a different configuration according to an operating system. For example, in the case of Android or iOS, one API set may be provided for each platform. In the case of Tizen, two or more API sets may be provided for each platform.

The applications 370 (e.g., the application programs 147) may include, for example, one or more applications that can provide functions, such as home 371, dialer 372, SMS/MMS 373, Instant Message (WI) 374, browser 375, camera 376, alarm 377, contacts 378, voice dial 379, email 380, calendar 381, media player 382, album 383, clock 384 (e.g., watch). Additionally, or alternatively, though not illustrated, the applications 370 may include various other applications, such as, for example, and without limitation, applications related to health care (e.g., measuring exercise quantity or blood sugar), or environment information (e.g., atmospheric pressure, humidity, or temperature information), or the like.

According to an embodiment, the applications 370 may include an application (hereinafter, referred to as an "information exchange application" for convenience of description) that supports exchanging information between an electronic device (e.g., the electronic device 101) and an external electronic device (e.g., the external electronic device 102 or 104). The information exchange application may include, for example, a notification relay application for transmitting predetermined information to an external electronic device or a device management application for managing an external electronic device.

For example, the notification relay application may include a function of transmitting, to an external electronic device (e.g., the external electronic device 102 or 104), notification information generated from other applications of the electronic device (e.g., an SMS/MMS application, an e-mail application, a health management application, or an environmental information application). Furthermore, the notification relay application may, for example, receive notification information from an external electronic device and may provide the received notification information to a user.

For example, the device management application may manage (e.g., install, delete, or update) at least one function of an external electronic device (e.g., the external electronic device 102 or 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service, a message service, or the like).

According to an embodiment, the applications 370 may include applications (e.g., a health care application of a mobile medical appliance, or the like) designated according to the attributes of an external electronic device (e.g., the external electronic device 102 or 104). According to an embodiment, the applications 370 may include applications received from an external electronic device (e.g., the server 106 or the external electronic device 102 or 104). According to an embodiment, the applications 370 may include a preloaded application or a third party application that can be downloaded from a server. The names of the elements of the program module 310 of the illustrated embodiment may be changed according to the type of operating system.

According to various embodiments, at least a part of the program module 310 may be implemented as software, firmware, hardware, or a combination of two or more thereof. At least some of the program module 310 may be implemented (e.g., executed) by, for example, a processor (e.g., the processor 210). At least some of the program module 310 may include, for example, a module, a program, a routine, a set of instructions, or a process for performing one or more functions.

Figure 4A:
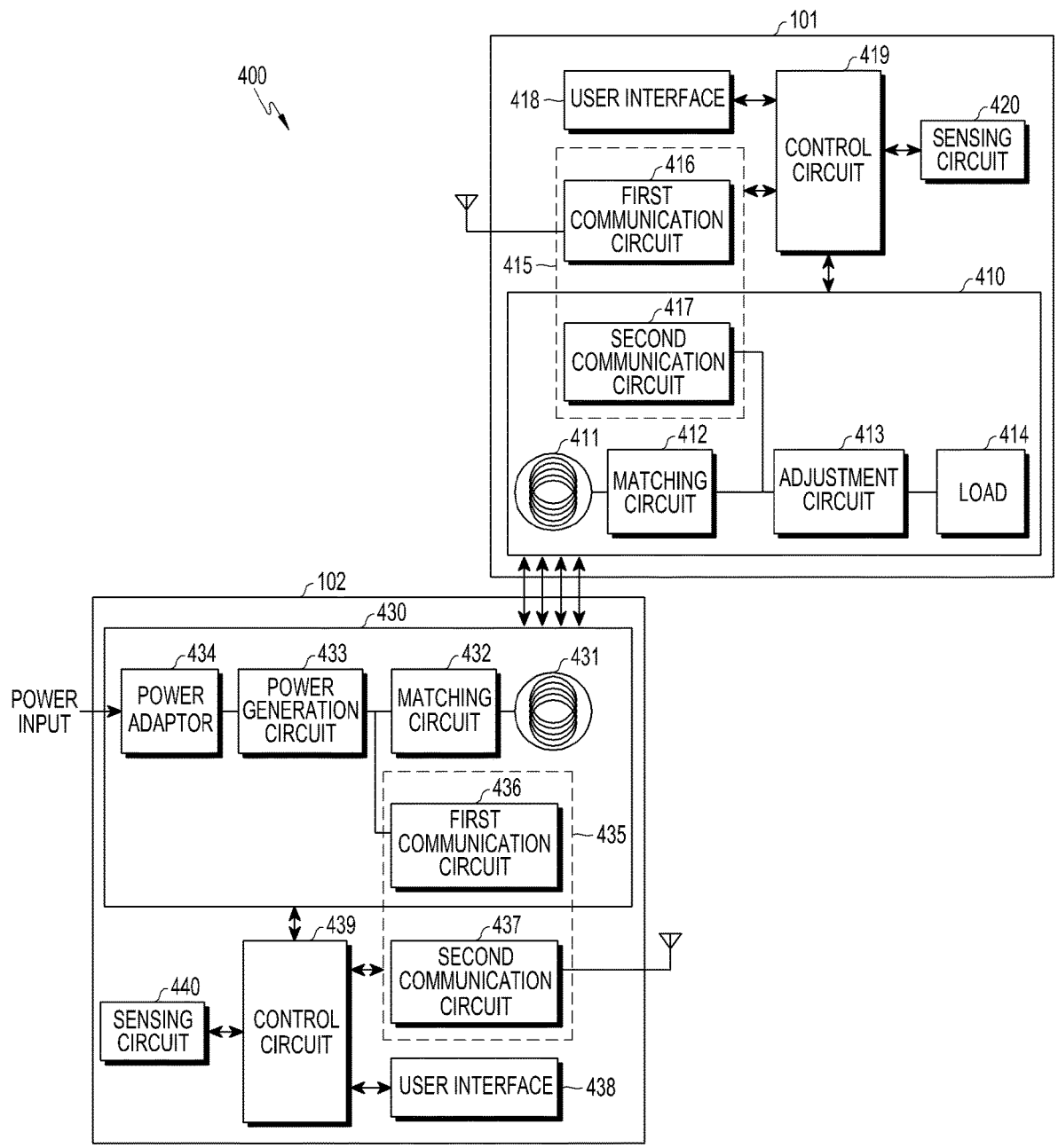
FIG. 4A is a block diagram illustrating an electronic device and an external electronic device in a system for wireless charging according to various embodiments.
Figure 4B:
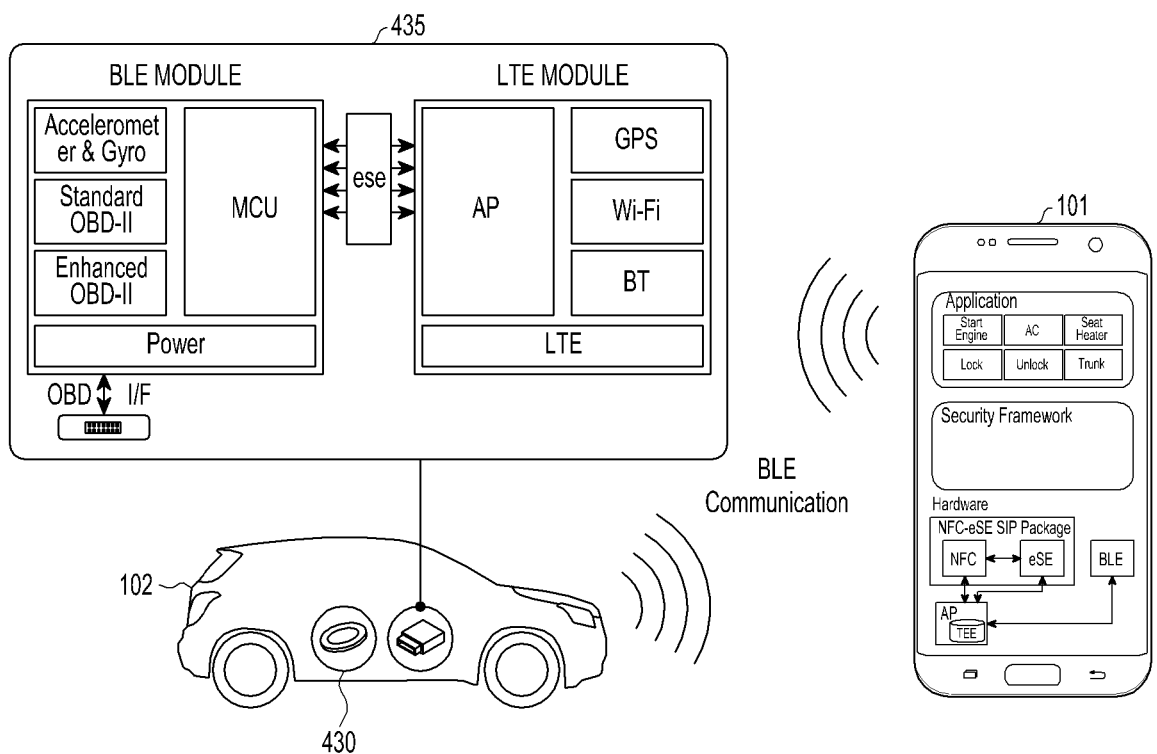
FIG. 4B is a diagram illustrating an electronic device and an external electronic device according to various embodiments.

FIG. 4A is a block diagram illustrating an electronic device and an external electronic device in a system for wireless charging according to various embodiments. FIG. 4B is a diagram illustrating an electronic device and an external electronic device according to various embodiments.

Referring to FIGS. 4A and 4B, a system 400 for wireless charging according to various embodiments may include an electronic device (e.g., a portable terminal) 101 and an external electronic device (e.g., a vehicle) 102. The wireless charging system 400 may be a system that wirelessly transmits and receives power, and is capable of charging a battery of a power receiving device (e.g., the electronic device 101) without separately connecting a wired charging connector to the power receiving device (e.g., the electronic device 101). According to an embodiment, the external electronic device 102 may include a wireless charging circuit 430, a sensing circuit 440, a control circuit 439, a user interface 438, and/or a communication circuit 435. The charging circuit 430 of the external electronic device 102 may include transmission conductive pattern (or coil) 431, a matching circuit 432, a power generation circuit 433, a power adaptor 434, and a first communication circuit 436. According to an embodiment, the electronic device 101 may include a wireless charging circuit 410, a sensing circuit 420, a control circuit 419, a user interface 418, and/or a communication circuit 415. The wireless charging circuit 410 of the electronic device 101 may include transmission conductive pattern (or coil) 411, a matching circuit 412, an adjustment circuit 413, a load 414, and a second communication circuit 417. According to an embodiment, the external electronic device 102 (e.g., a vehicle) may perform transmission and reception of a wireless charging-related signal with the electronic device 101 (e.g., a portable terminal). According to an embodiment, a communication circuit 415 and 435 may unicast, multicast, or broadcast wireless charging-related information. The communication circuit 415 and 435 may include at least one of a first communication circuit 416 and 436, respectively, and a second communication circuit 417 and 437, respectively.

According to various embodiments, the wireless charging circuit 410 may wirelessly receive supply of power via an interface for wirelessly receiving power from the external electronic device 102, resonance coupling, laser, light, or the like, and may perform data communication using available communication resources when receiving power. According to an embodiment, the wireless charging circuit 410 is capable of transmitting and receiving information indicating whether proximity communication with the external electronic device 102 exists and initial information. The wireless charging circuit 410 may include a charging circuit for wirelessly receiving power from the external electronic device 102. The wireless charging circuit 410 may receive information associated with the external electronic device 102 from the external electronic device 102. The wireless charging circuit 410 may receive a signal from the external electronic device 102 in response to an event of sensing the external electronic device 102.

According to various embodiments, the wireless communication circuit 415 may perform transmission and reception of data with the external electronic device 102 via a wireless communication circuit that supports wireless communication having a predetermined frequency range. The wireless charging circuit 415 may transmit information associated with the electronic device 101 to the external electronic device 102. When proximity communication with the external electronic device 102 is enabled via the wireless communication circuit 415, the electronic device 101 may connect proximity communication with the external electronic device 102 via the wireless communication circuit 415, and may transmit detailed information associated with the electronic device 101 to the external electronic device 102.

According to various embodiments, the control circuit 419 (e.g., the processor 120 of FIG. 1) may supply power to a battery (not illustrated) included in the electronic device 101. One or a plurality of batteries that may be included in the control circuit 419 may supply power to the electronic device 101. According to an embodiment, the control circuit 419 may supply, to the electronic device 101, power input from an external electric power source (not shown) via a wired cable. According to an embodiment, the control circuit 419 may control the electronic device 101 such that a battery is charged with power that is wirelessly received from the external electronic device 102 via the wireless charging circuit 410. The control circuit 439 of the external electronic device 102 may wirelessly transmit power to the electronic device 101 via a wireless power transmission and reception conductive pattern (or coil) 431 that is installed in the wireless charging circuit 430. The control circuit 419 of the electronic device may wirelessly receive power from the external electronic device 102 via a wireless power transmission and reception conductive pattern (or coil) 411 that is installed in the wireless charging circuit 410.

According to various embodiments, the sensing circuit 420 may further include a control circuit for controlling at least one sensor included therein. According to an embodiment, the sensing circuit 420 may transmit a trigger signal to the external electronic device 102. The electronic device 101 may sense the external electronic device 102 using at least one of BLE, a proximity sensor, NFC, and WiGig. According to another embodiment, the electronic device 101 may detect the external electronic device 102 using various methods excluding the above described methods, and may transmit trigger signals corresponding to those detection methods to the external electronic device 102.

According to various embodiments, the wireless charging circuits 410 and 430 that are respectively included in the electronic device 101 and the external electronic device 102 may support a resonance coupling scheme. According to an embodiment, in the case of the resonance coupling scheme of the wireless charging scheme, the external electronic device 102 (e.g., a vehicle) may generate electromagnetic waves having a selected resonant frequency using the wireless charging circuit 430, and the electronic device 101 (e.g., a portable terminal) may receive the generated electromagnetic waves using the wireless charging circuit 410. The external electronic device 102 may identify an object by sensing that at least one of the frequency, current, and voltage of a power transmission circuit is changed. According to an embodiment, the external electronic device 102 may distinguish the electronic device 101 and objects (e.g., a key, a coin, or the like) that is incapable of receiving wireless power from among objects existing in a sensing area. The external electronic device 102 may request identification information of the electronic device 101 and/or setting information associated with wireless charging. According to an embodiment, the identification information may include version information, a production code, or a basic device identifier. According to an embodiment, the setting information may include a wireless charging frequency, the maximum chargeable power level, the amount of power required for charging, the amount of average power transmitted, or the like.

According to various embodiments, the electronic device 101 (e.g., a portable terminal) may provide a function, such as a vehicle smart key function, based on at least one of proximity with the external electronic device 102 (e.g., a vehicle) obtained based on a signal transmitted and received in resonance scheme-based wireless charging and short-range communication with the external electronic device 102 (e.g., a vehicle) such as Bluetooth low energy (BLE), the strength of a transmitted and received signal, and wireless charging efficiency. According to an embodiment, the electronic device 101 (e.g., a portable terminal) may determine the distance to the external electronic device 102 (e.g., a vehicle) and may provide a function such as a vehicle smart key, and the external electronic device 102 (e.g., a vehicle) may provide various functions corresponding thereto.

According to an embodiment, the external electronic device 102 (e.g., a vehicle) may perform transmission and reception of a wireless charging signal with the wireless charging circuit 410 of the electronic device 101 (e.g., a portable terminal), and may determine proximity to the electronic device 101 (e.g., a portable terminal), based on the wireless charging signal. The first communication circuit 436 of the wireless charging circuit 410 may include a BLE module of FIG. 4B.

According to an embodiment, an application of the electronic device 101 (e.g., a portable terminal) may provide a user interface for a smart key operation, and may process (or store) information for authentication.

According to an embodiment, the external electronic device 102 (e.g., a vehicle) may provide various functions by determining proximity to the electronic device 101 (e.g., a portable terminal), based on a signal transmitted and received in resonance scheme-based wireless charging and short-range communication with the electronic device 101 (e.g., a portable terminal) such as Bluetooth low energy (BLE).

According to an embodiment, at least one of the electronic device 101 (e.g., a portable terminal) and the external electronic device 102 (e.g., a vehicle) determines that the electronic device 101 (e.g., a portable terminal) is located in a third area when the strength of a transmitted and received BLE signal is less than or equal to a previously designated strength, and may determine that the electronic device 101 (e.g., a portable terminal) is located in a second area in the third area when the strength of the BLE signal is greater than the previously designated strength. According to an embodiment, when the electronic device 101 (e.g., a portable terminal) and the external electronic device 102 (e.g., a vehicle) sense a wireless charging signal, it is determined that the electronic device 101 (e.g., a portable terminal) is located in a first area within the second area. According to an embodiment, when the strength of the wireless charging signal is less than or equal to a previously designated strength, the electronic device 101 (e.g., a portable terminal) and the external electronic device 102 (e.g., a vehicle) may determine that the electronic device 101 (e.g., a portable terminal) is located close to the external electronic device 102 (e.g., a vehicle), and when the strength of the wireless charging signal is greater than the previously designated strength, the electronic device 101 (e.g., a portable terminal) and the external electronic device 102 (e.g., a vehicle) may determine that the electronic device 101 (e.g., a portable terminal) is within the external electronic device 102 (e.g., a vehicle). According to an embodiment, depending on whether the electronic device 101 (e.g., a portable terminal) exists in the third area, the second area, or the first area, at least one of the electronic device 101 (e.g., a portable terminal) and the external electronic device 102 (e.g., a vehicle) may provide different functions. According to various embodiments, when the electronic device 101 (e.g., a portable terminal) is located in the first area, the at least one of the external electronic device 102 (e.g., a vehicle) and the electronic device 101 (e.g., a portable terminal) may determine whether the electronic device 101 (e.g., the vehicle) is located inside or outside the vehicle, based on the strength of a wireless charging signal. According to an embodiment, based on whether the electronic device 101 (e.g., a portable terminal) exists inside or outside the external electronic device 102 (e.g., a vehicle), at least one of the electronic device 101 (e.g., a portable terminal) and the external electronic device 102 (e.g., a vehicle) may provide different functions.

According to various embodiments, an electronic device may include the wireless communication circuit 435 configured to support short-range communication, a wireless charging circuit (the wireless charging circuit 430 of FIG. 4A) configured to support wireless charging, at least one processor (e.g., the control circuit 439 of FIG. 4A) electrically connected to the wireless communication circuit (e.g., the wireless communication circuit 435 of FIG. 4A) and the wireless charging circuit (e.g., the wireless charging circuit 430 of FIG. 4A), and the memory 130 electronically connected to the processor (e.g., the control circuit 439 of FIG. 4A). The memory 130 is configured to store instructions and, upon execution, the instructions enable the processor (e.g., the control circuit 439 of FIG. 4A) to perform: determining an area where the electronic device 101 is located, based on a second signal that is used to communicate with an external electronic device 102 via the wireless communication circuit (e.g., the wireless communication circuit 435 of FIG. 4A) when the external electronic device 102 is located in a second area, based on a first signal that is used to communicate with the external electronic device 102 via the wireless charging circuit (e.g., the wireless charging circuit 430 of FIG. 4A) when the external electronic device 102 is located in a first area within the second area, or based on a combination of at least a part thereof; determining the operation mode corresponding to the determined area; and controlling operation of the electronic device 101, based on the determined operation mode.

According to an embodiment, when the external electronic device 102 is located in a third area outside the second area, the instructions enable the processor (e.g., the control circuit 439 of FIG. 4A) to determine a distance to the external electronic device 102 using a third signal that is used to communicate with the external electronic device 102 via the wireless communication circuit (e.g., the wireless communication circuit 435 of FIG. 4A).

According to an embodiment, the instructions enable the processor (e.g., the control circuit 439 of FIG. 4A) to operate the external electronic device in different modes according to whether the external electronic device 102 is located in the first area, the second area, or the third area.

According to an embodiment, the instructions enable the processor (e.g., the control circuit 439 of FIG. 4A) to perform: transmitting the first signal to the external electronic device 102 to sense the external electronic device 102; transmitting the second signal to the external electronic device 102, and receiving a response signal from the external electronic device 102 in response to the transmitted second signal; determining whether information associated with the external electronic device 102 is the same as information associated with the external electronic device 102 that is stored in advance in the memory 130 to authenticate the external electronic device 102; and maintaining a connection with the external electronic device 102.

According to an embodiment, the instructions enable the processor (e.g., the control circuit 439 of FIG. 4A) to perform: determining the operation mode of the electronic device 101 as a first mode when the external electronic device 102 is sensed in the first area; determining the operation mode of the electronic device as a second mode when the external electronic device 102 is sensed in the second area; and determining the operation mode of the electronic device 101 as a third mode when the external electronic device 102 is sensed in the third area.

According to an embodiment, the first mode includes a function of wirelessly transmitting power to the external electronic device 102, the second mode includes a function of transmitting a control signal that controls operation of the external electronic device 102, and the third mode includes a function of outputting at least one alarm.

According to an embodiment, the instructions enable the processor (e.g., the control circuit 439 of FIG. 4A) to perform: wirelessly providing the power to the external electronic device 102, based on the determined first mode; determining efficiency of the wirelessly provided power, and transmitting different functions, based on the comparison of the determined efficiency and a designated threshold value.

According to an embodiment, the first signal is a wireless charging signal, the second signal is a Bluetooth Low Energy (BLE) signal, and the third signal is a BLE Long Range signal.

According to an embodiment, the instructions enable the processor (e.g., the control circuit 439 of FIG. 4A) to perform: determining an area where the external electronic device 102 is located, based on proximity to the external electronic device obtained using the strength of a response signal in response to the second signal, adjustment of transmission power of the second signal, the round trip time of the second signal, signaling after connection with the external electronic device, or a combination of at least a part thereof.

According to an embodiment, the instructions enable the processor (e.g., the control circuit 439 of FIG. 4A) to perform: determining an area where the external electronic device 102 is located using charging efficiency based on the first signal, adjustment of power of the wireless charging circuit, or a combination of at least a part thereof.

According to various embodiments, an electronic device may include a housing, a display (e.g., the display 160 of FIG. 1) exposed through a first part of the housing, a wireless communication circuit (e.g., the wireless communication circuit 415 of FIG. 4A) configured to support short-range communication, a wireless charging circuit (e.g., the wireless charging circuit 410 of FIG. 4A) configured to support wireless charging, a power supply (e.g., the power supply 180 of FIG. 1) electrically connected to the wireless charging circuit (e.g., the wireless charging circuit 410 of FIG. 4A), at least one processor (e.g., the processor 120 of FIG. 1 or the control circuit 419 of FIG. 4A) electrically connected to the wireless communication circuit (e.g., the wireless communication circuit 415 of FIG. 4A) and the wireless charging circuit (e.g., the wireless charging circuit 410 of FIG. 4A), and a memory (e.g., the memory 130 of FIG. 1) electronically connected to the processor (e.g., the processor 120 of FIG. 1 or the control circuit 419 of FIG. 4A). The memory (e.g., the memory 130 of FIG. 1) stores instructions and, upon execution, the instructions enable the processor (e.g., the processor 120 of FIG. 1 or the control circuit 419 of FIG. 4A) to perform: determining a second mode, based on a second signal received from the external electronic device 102 in a second area via the wireless communication circuit (e.g., the wireless communication circuit 415 of FIG. 4A), and displaying a second menu corresponding to the determined second mode on the display (e.g., the display 160 of FIG. 1); and determining a first mode, based on a first signal received in a first area within the second area via the wireless charging circuit (e.g., the wireless charging circuit 410 of FIG. 4A), and displaying a first menu corresponding to the determined first mode on the display (e.g., the display 160 of FIG. 1).

According to an embodiment, the instructions enable the processor (e.g., the processor 120 of FIG. 1 or the control circuit 419 of FIG. 4A) to perform: determining a third mode, based on a third signal received from the external electronic device 102 in a third area outside the second area via the wireless communication circuit (e.g., the wireless communication circuit 415 of FIG. 4A), and displaying a third menu corresponding to the determined third mode on the display (e.g., the display 160 of FIG. 1).

According to an embodiment, the first mode includes a function of wirelessly receiving power from the external electronic device 102, the second mode includes a function of transmitting a control signal that controls operation of the external electronic device 102, and the third mode includes a function of outputting at least one alarm from the external electronic device 102.

According to an embodiment, the first menu includes first information for wirelessly receiving power from the external electronic device 102, the second menu includes second information for controlling the external electronic device 102, and the third menu includes third information for controlling the external electronic device 102.

According to an embodiment, the instructions enable the processor (e.g., the processor 120 of FIG. 1 or the control circuit 419 of FIG. 4A) to perform: wirelessly receiving the power from the external electronic device 102, based on the determined first mode, determining efficiency of the wirelessly provided power; and providing different functions, based on the comparison of the determined efficiency and a designated threshold value.

According to an embodiment, the instructions may enable the processor (e.g., the processor 120 of FIG. 1 or the control circuit 419 of FIG. 4A) to perform: determining an area where the electronic device 101 is located, based on the first signal, the second signal, the third signal, or a combination of at least a part thereof, and determining an operation mode corresponding to the determined area.

According to an embodiment, the instructions may enable the processor (e.g., the processor 120 of FIG. 1 or the control circuit 419 of FIG. 4A) to perform: sensing the external electronic device 102 by receiving the third signal from the external electronic device 102; transmitting a response signal to the external electronic device 102 in response to the received second signal when the second signal is received from the external electronic device 102; authenticating the external electronic device 102 by determining whether information associated with the external electronic device 102 is the same as information associated with the external electronic device 102 that is stored in advance in the memory (e.g., the memory 130 of FIG. 1); and maintaining connection with the external electronic device 102.

According to an embodiment, the instructions may enable the processor (e.g., the processor 120 of FIG. 1 or the control circuit 419 of FIG. 4A) to perform primary authentication with respect to the external electronic device 102 when the media access control (MAC) address of the external electronic device 102 that transmits the third signal is included in the MAC addresses of a plurality of external electronic device 102 stored in the memory (e.g., the memory 130 of FIG. 1), to establish a secure channel with the external electronic device, and to perform secondary authentication with respect to the external electronic device 102, based on the established secure channel using a key value stored in the memory (e.g., the memory 130 of FIG. 1).

Figure 4C:
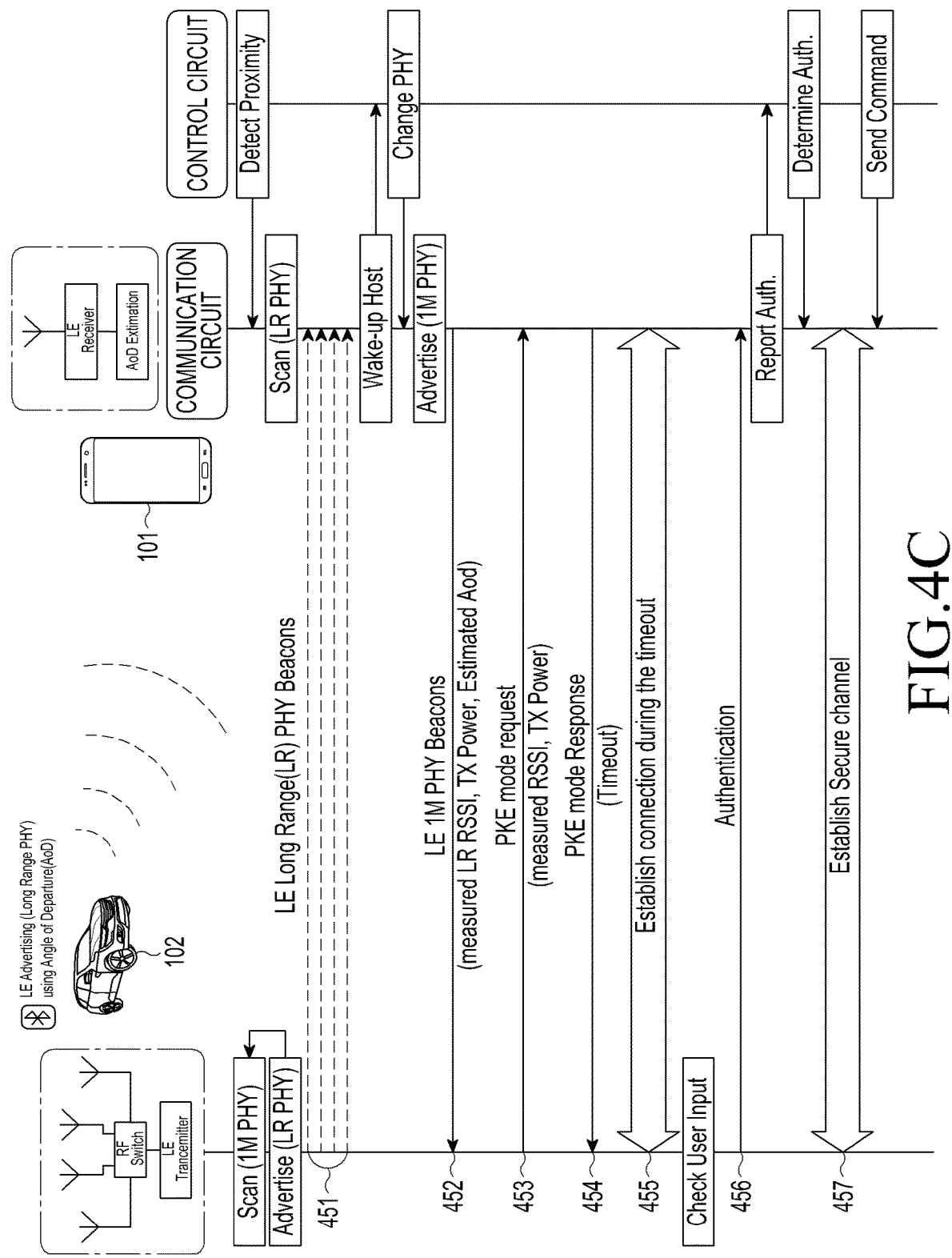
FIG. 4C is a flowchart illustrating signaling between an electronic device and an external electronic device according to various embodiments.

FIG. 4C is a flowchart illustrating signaling between an electronic device and an external electronic device according to various embodiments.

Referring to FIG. 4C, the external electronic device 102 (e.g., a vehicle) may periodically (or aperiodically) transmit a BLE Long Range signal (e.g., BLE Long Range PHY Beacons) in operation 451. According to an embodiment, the external electronic device 102 (e.g., a vehicle) may broadcast a BLE Long Range signal when connection with the electronic device 101 (e.g., a portable terminal) is terminated.

In operation 452, the electronic device 101 (e.g., a portable terminal) may transmit a BLE Long Range signal to the external electronic device 102 (e.g., a vehicle). For example, when the electronic device receives a BLE Long Range Beacon from the external electronic device, the electronic device changes to 1 M PHY and transmits a BLE Long Range signal. According to an embodiment, the electronic device 101 (e.g., a portable terminal) may measure a signal strength, transmission power, and an angle of departure (AoD) using a BLE Long Range signal, and may transmit a BLE signal including the measured value to the external electronic device 102 (e.g., a vehicle).

In operation 453, the external electronic device 102 (e.g., a vehicle) may request a PKE mode from the electronic device 101 (e.g., a portable terminal). According to an embodiment, the external electronic device 102 (e.g., a vehicle) may transmit a PKE mode request including information associated with the measured signal strength and transmission power to the electronic device 101 (e.g., a portable terminal).

In operation 454, the electronic device 101 (e.g., a portable terminal) may transmit, to the external electronic device 102 (e.g., a vehicle), a response to the PKE mode request received from the external electronic device 102 (e.g., a vehicle).

In operation 455, the electronic device 101 (e.g., a portable terminal) and the external electronic device 102 (e.g., a vehicle) may establish connection after transmitting and receiving the PKE mode request and the PKE mode response. For example, the external electronic device 102 may display information (e.g., device name or the like) received from the electronic device 101, and may receive a user input (e.g., a confirm operation).

In operation 456, the external electronic device 102 (e.g., a vehicle) may request authentication from the electronic device 101 (e.g., a portable terminal). According to an embodiment, the electronic device 101 (e.g., a portable terminal) may perform authentication in response to the authentication request received from the external electronic device 102 (e.g., a vehicle).

In operation 457, the electronic device 101 (e.g., a portable terminal) and the external electronic device 102 (e.g., a vehicle) may establish a secure channel as the distance therebetween becomes short. According to an embodiment, the establishing the secure channel may be performed before operation 456.

Figure 4D:
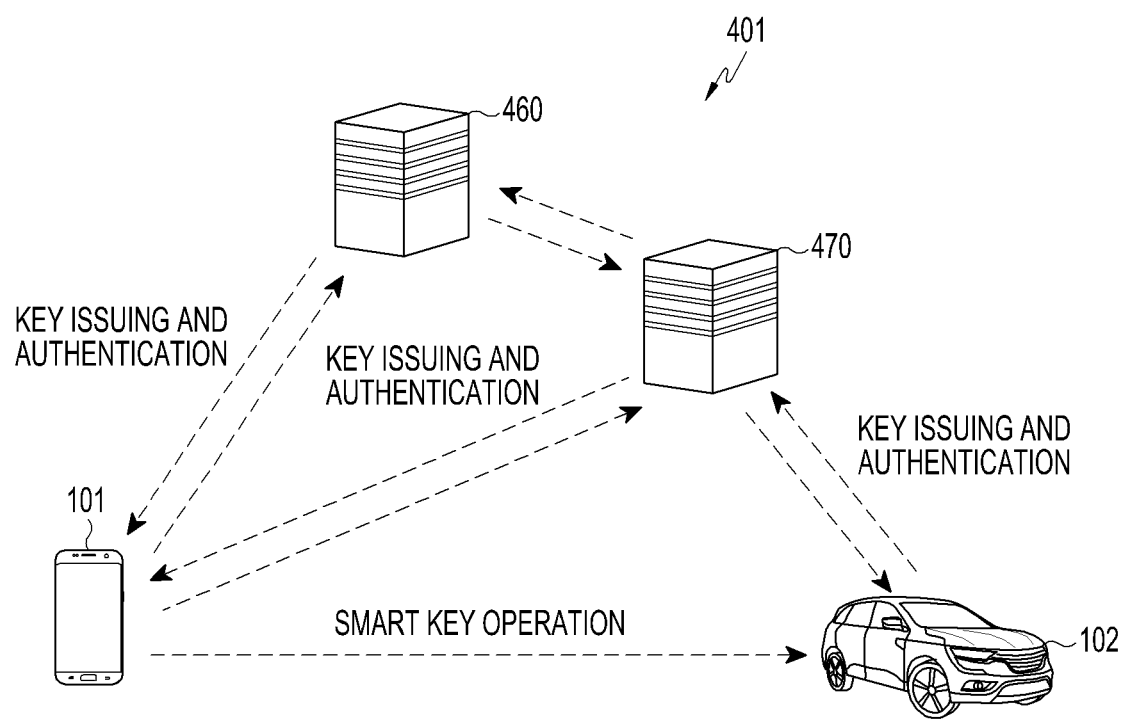
FIG. 4D is a diagram illustrating a system including an electronic device, an external electronic device, and a server according to various embodiments.

FIG. 4D is a diagram illustrating a system including an electronic device, an external electronic device, and a server according to various embodiments.

Referring to FIG. 4D, according to various embodiments, the network system 401 of the present disclosure may include the electronic device 101, the external electronic device 102, a first server 460, and a second server 470. The electronic device 101, the external electronic device 102, the first server 460, and the second server 470 included in the network system 401 may mutually interoperate. The first server 460 and the second server 470 may interoperate as separate entities, or may be one integrated server. According to an embodiment, the first server 460 may interoperate with the electronic device 101, and may perform an intermediary function such that the first electronic device 101 and the second server 470 interoperate. Also, the second server 470 may interoperate with the electronic device 101 via the first server 460, or may directly interoperate with the electronic device 101.

According to various embodiments, the first server 460 may be an electronic device manufacturer server (manufacturer server of the electronic device 101) that supports issuing, updating, authenticating a smart key for the electronic device 101, and installation of an application related to the electronic device 101. The second server 470 that performs issuing, updating, and authenticating a smart key for the external electronic device 102 may be a vehicle manufacturer server. The electronic device 101 may obtain the key (e.g., the master key) of the vehicle 102 from the second server 470, in order to control a smart key function. For example, when user authentication is successfully performed via the first server 460, the electronic device 101 may obtain the key of the vehicle 102 from the second server 470. As another example, when user authentication is successfully performed via the second server 470, the electronic device 101 may obtain the key of the vehicle 102 from the second server 470.

According to various embodiments, the electronic device 101 may perform issuing and authenticating the key with the first and second servers 460 and 470 to perform the smart key operation of the external electronic device 102. The first and second servers 460 and 470 that perform issuing and authenticating the key with the electronic device 101 may provide key issue information to the external electronic device 102, or may receive key issue information from the external electronic device 102. The first and second servers 460 and 470 may be a server of a vehicle company that produces the external electronic device 102, or a server of a company that produces the electronic device 101. According to an embodiment, the first and second servers 460 and 470 may be an electronic device manufacturer server (manufacturer server of the electronic device 101) that provides a smart key service. According to an embodiment, the first server 460 and the second server 470 may transmit and receive information associated with issuing and authenticating a key. The electronic device 101 and the external electronic device 102 may set up a communication channel using the authenticated key, and may transmit and receive data via the setup channel.

Figure 5:
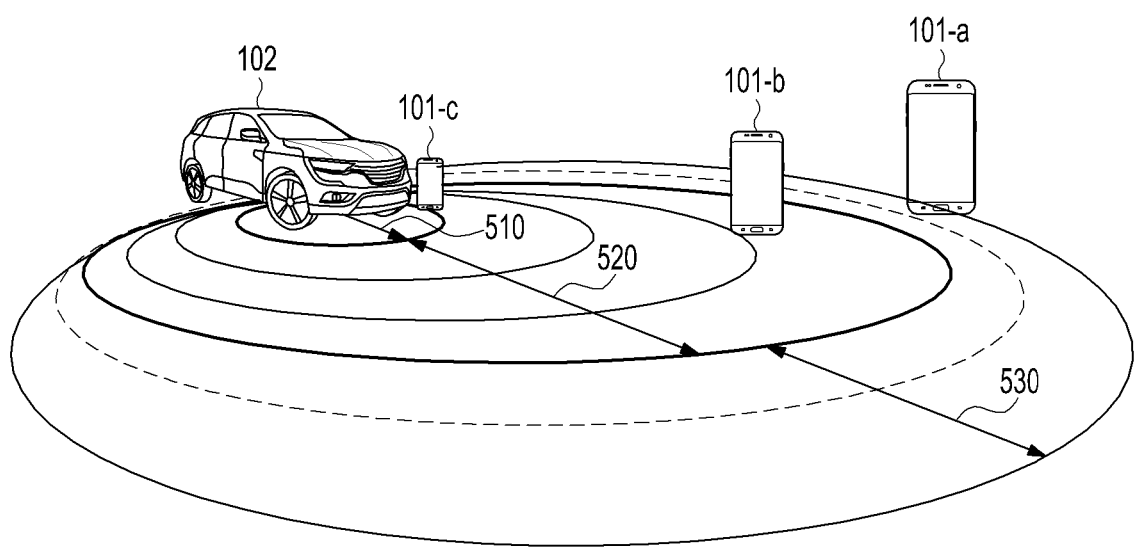
FIG. 5 is a diagram illustrating different distances between an electronic device and an external electronic device according to various embodiments.

FIG. 5 is a diagram illustrating different distances between an electronic device and an external electronic device according to various embodiments.

Referring to FIG. 5, an electronic device (e.g., the electronic device 101 of FIG. 1) and the external electronic device 102 may include various devices that a user can carry and of which mobility is secured. According to an embodiment, the external electronic device 102 may include various vehicles that a user can board, or electronic devices (e.g., a system of a vehicle) included in the vehicles. An electronic device 101-a, 101-b, or 101-c may be located in a first area 510, a second area 520, or a third area 530, according to the distance to the external electronic device 102. The electronic device 101-a, 101-b, or 101-c may move from the third area 530 to the second area 520, or may move from the second area 520 to the first area 510. Alternatively, the electronic device 101-a, 101-b, or 101-c may move from the first area 510 to the second area 520, or may move from the second area 520 to the third area 530. As described above, the electronic device 101-a, 101-b, or 101-c may freely move around the external electronic device 102.

According to an embodiment, the third area 530 is an area at which the distance to the external electronic device 102 is greater than or equal to a second threshold value, and is within the maximum distance at which the external electronic device 102 can sense the electronic device 101-a. In the third area 530, the external electronic device 102 may sense the electronic device 101-a for the first time, or the electronic device 101-a may sense the external electronic device 102 for the first time.

According to various embodiments, at least one of the electronic device 101-a, 101-b, or 101-c and the external electronic device 102 located in each area 530, 520, or 510 may determine an area (or distance) where a partner electronic device (e.g., the external electronic device 102 in the case of the electronic device 101-*a*, 101-*b*, or 101-*c*) is located, based on a signal transmitted and received via a short-range communication circuit (e.g., the second communication circuit 417 and 437 of FIG. 4A), a wireless charging signal transmitted and received via a wireless charging circuit (e.g., the wireless charging circuit 410 and 430 of FIG. 4A), or a combination of at least a part thereof. At least one of the electronic device 101-*a*, 101-*b*, or 101-*c* and the external electronic device 102 may determine an operation mode, based on the determined area (or distance), and may control operation, based on the determined operation mode. The external electronic device 102 may transmit a short-range communication signal to the electronic device 101-*a*, 101-*b*, or 101-*c*, and may receive a response signal from the electronic device 101-*a*, 101-*b*, or 101-*c* in response to the transmitted signal. According to an embodiment, the external electronic device 102 may compare information associated with the electronic device 101-*a*, 101-*b*, or 101-*c* and information associated with a plurality of electronic devices that is stored in advance in the external electronic device 102, to perform an authentication operation with the electronic device 101-*a*, 101-*b*, or 101-*c*. According to an embodiment, the electronic device 101-*a*, 101-*b*, or 101-*c* may compare information associated with the external electronic device 102 and information associated with a plurality of electronic devices that is stored in advance in the electronic device 101-*a*, 101-*b*, or 101-*c*, to perform an authentication operation with the external electronic device 102. The external electronic device 102 that has performed the authentication operation with the electronic device 101-*a*, 101-*b*, or 101-*c* may maintain connection with the electronic device 101-*a*, 101-*b*, or 101-*c*.

According to various embodiments, the electronic device 101-*a*, 101-*b*, or 101-*c* may provide an immobilizer function, a remote keyless entry (RKE) function, a PKE/passive keyless entry/go (PKG) function, a smart access function, or the like, which are provided by a vehicle smart key, by interoperating with the external electronic device 102.

The external electronic device 102 may correct information received from the electronic device 101-*a*, 101-*b*, or 101-*c*, based on at least a part of information obtained from at least one sensor included in the electronic device 101-*a*, 101-*b*, or 101-*c*, to determine a relative position. The external electronic device 102 may periodically perform sampling of a BLE signal, which is transferred from the electronic device, in each antenna, and may extract an inphase & quardrature (I&Q) value.

According to an embodiment, the electronic device 101-*a*, 101-*b*, or 101-*c* may perform different operations according to the distance to the external electronic device 102 or the type of a received signal.

According to an embodiment, an electronic device (e.g., the electronic device 101-*c*) located in the first area 510 may operate in a first mode, an electronic device (e.g., the electronic device 101-*b*) located in the second area 520 may operate in a second mode, and an electronic device (e.g., the electronic device 101-*a*) located in the third area 530 may operate in a third mode.

According to an embodiment, in the third mode, the electronic device 101-*a* (e.g., a portable terminal) may execute a smart key application for quick execution, or may display a pop-up including various information related to a vehicle. Some functions of the smart key application may be restricted. As another example, the electronic device 101-*a* (e.g., a portable terminal) may automatically execute an application or a function capable of controlling the vehicle, may display a short-cut to switch to the corresponding function on a screen in the form of a pop-up, or may provide a notification to a user in the form of an announcement. As another example, the electronic device 101 may configure an AoD screen to perform a smart key operation, even though a user does not separately activate the screen of the electronic device 101-*a* (e.g., a portable terminal). As another example, the electronic device 101 may display information related to the smart key in another electronic device (e.g., a wearable device) that is connected to the electronic device 101. According to an embodiment, the external electronic device 102 (e.g., a vehicle) may control a headlight to be turned on.

According to an embodiment, the second mode may include a function by which the electronic device 101-*b* transmits, to the external electronic device 102, a control signal for controlling operation (e.g., controlling the door or the engine of the vehicle), and may include various functions by which the external electronic device 102 unlocks the door of the vehicle, operates an engine in a standby state, adjust a car seat, or the like. According to an embodiment, the second mode may include a function by which the electronic device 101-*b* displays a vehicle's start-up menu. As another example, the electronic device may perform control such that the door or the engine of the external electronic device 102 is turned on/off.

According to an embodiment, when the electronic device 101-*b* moves from the second area 520 to the third area 530, the external electronic device 102 (e.g., a vehicle) may sense that the electronic device 101-*b* becomes distant. When the external electronic device 102 (e.g., a vehicle) senses that the electronic device 101-*b* becomes distant, the external electronic device 102 may change the operation mode from the second mode to the third mode, to control the headlight (e.g., change the state from On to Off). According to an embodiment, when the operation mode is changed from the second mode to the third mode again, the electronic device 101-*a* (e.g., a portable terminal) may store a parking location, and the external electronic device 102 (e.g., a vehicle) may perform control such that the door of the vehicle is locked.

According to an embodiment, at least one of the electronic device 101-*c* or the external electronic device 102 may operate in the first mode.

According to an embodiment, in the first mode, the electronic device (e.g., the electronic device 101-*c* of FIG. 5) may connect multimedia to the vehicle, such as navigation, Bluetooth, a mirroring link, or may perform a vehicle mode, and the external electronic device 102 may control the engine of the vehicle to be in a standby state. According to various embodiments, while at least one of the electronic device (e.g., the electronic device 101-*c* of FIG. 5) and the external electronic device 102 operate in the first mode, when the strength of a wireless charging signal that the electronic device (e.g., the electronic device 101-*c* of FIG. 5) receives from the external electronic device 102 is less than or equal to a predetermined strength, at least one of the electronic device (e.g., the electronic device 101-*c* of FIG. 5) and the external electronic device 102 may interrupt operation of the first mode. According to an embodiment, the electronic device (e.g., the electronic device 101-*c* of FIG. 5) may perform at least one of disconnecting multimedia from the vehicle, releasing a vehicle mode, and storing a parking location. In this instance, when the engine of the vehicle is in a standby state, the external electronic device 102 may perform at least one of outputting an escape alarm, and locking the door of the vehicle.

According to an embodiment, when the electronic device 101-*c* and the external electronic device 102 sense a wireless charging-related signal, it is determined that the electronic device 101-*c* is located in the first area. According to an embodiment, when the electronic device 101-*c* (e.g., a portable terminal) is located in the first area, the electronic device or the external electronic device may determine the relative positions of the electronic device and the external electronic device, based on at least a part of the strength and efficiency of a wireless signal. For example, it is determined whether the electronic device 101 (e.g., a portable terminal) exists inside or outside the vehicle. For example, when the strength of the wireless charging signal is less than or equal to a previously designated strength, the electronic device 101 and the external electronic device 102 (e.g., a vehicle) may determine that the electronic device 101-*c* (e.g., a portable terminal) is located close to the external electronic device 102 (e.g., a vehicle), and when the strength of the wireless charging signal is greater than the previously designated strength, the electronic device 101-*c* (e.g., a portable terminal) and the external electronic device 102 (e.g., a vehicle) may determine that the electronic device 101-*c* (e.g., a portable terminal) is located inside the external electronic device 102 (e.g., a vehicle). Based on the result of the determination, at least one of the electronic device 101-*c* (e.g., a portable terminal) and the external electronic device 102 (e.g., a vehicle) may provide different functions.

According to various embodiments, at least one of the electronic device 101-*a*, 101-*b*, or 101-*c* and the external electronic device 102 may determine the distance to a partner electronic device (e.g., the external electronic device 102 in the case of the electronic device (e.g., the electronic device 101-*a*, 101-*b*, or 101-*c*), or the electronic device 101-*a*, 101-*b*, or 101-*c* in the case of the external electronic device 102) in real time or at determined time intervals, and may control operation of the partner electronic device based on the determined distance. At least one of the electronic device 101-*a*, 101-*b*, or 101-*c* and the external electronic device 102 may transmit a control signal for controlling operation of the partner electronic device, based on the determined distance. At least one of the electronic device 101-*a*, 101-*b*, or 101-*c* and the external electronic device 102 may determine the distance to the partner electronic device in real time or at determined time intervals, and may control operation of the partner electronic device, based on the determined distance.

According to various embodiments, at least one of the electronic device 101-*a*, 101-*b*, or 101-*c* and the external electronic device 102 may determine an area (distance) where a partner electronic device (e.g., the external electronic device 102 in the case of the electronic device (e.g., the electronic device 101-*a*, 101-*b*, or 101-*c*), or the electronic device 101-*a*, 101-*b*, or 101-*c* in the case of the external electronic device 102) exists using the strength of a transmitted and received short-range communication signal, adjusting transmission power of the signal, the round trip time of the signal, signaling after connection to the partner electronic device, or a combination of at least a part thereof. At least one of the electronic device 101-*a*, 101-*b*, or 101-*c* and the external electronic device 102 may determine an area (or distance) where the partner electronic device is located using charging efficiency based on a wireless charging signal transmitted and received to/from the partner electronic device, adjustment of power of the wireless charging circuit, or a combination of at least a part thereof.

According to various embodiments, at least one of the electronic device 101-*a*, 101-*b*, or 101-*c* and the external electronic device 102 may provide various services or functions to a user, based on the determined area (or distance).

According to various embodiments, in the case in which the electronic device 101-*a* (e.g., a portable terminal) is located in the third area 530 (or when the distance to the external electronic device 102 is greater than or equal to a second threshold value, and is within the maximum distance at which the electronic device 101-*a* can be sensed), when it is sensed that the electronic device 101-*a* approaches, the external electronic device 102 (e.g., a vehicle) may operate in the third mode and may control the headlight of the vehicle to be turned on/off. According to an embodiment, the electronic device 101-*a* may execute a key application for quick execution. According to an embodiment, the electronic device 101-*a* may output the distance or direction to the external electronic device 102 to a user.

According to various embodiments, the external electronic device 102 may transmit a control signal to the electronic device 101-*a*, to enable the electronic device 101-*a* to execute an application capable of controlling the external electronic device 102, or to execute various information related to the vehicle via a pop-up. According to an embodiment, the electronic device 101-*a* may display a pop-up including various information for controlling the external electronic device 102, after the external electronic device 102 is sensed. When the electronic device 101-*a* enters the second area 520 from the third area 530, or when the electronic device 101-*a* is located in the second area 520 (or the distance to the external electronic device 102 is greater than or equal to a first threshold value and less than a second threshold value), the external electronic device 102 may sense that the electronic device approaches. According to an embodiment, when the external electronic device 102 senses that the electronic device 101-*b* approaches, the external electronic device 102 operates in the second mode, to control the door of the vehicle or the engine (change the state from Off to On), or to adjust the car seat to be appropriate for a driver. According to an embodiment, the electronic device 101-*b* may display a vehicle start-up menu.

According to various embodiments, the external electronic device 102 may transmit a control signal to the electronic device 101-*c*, to enable the electronic device 101-*c* to execute an application capable of controlling the external electronic device 102, or to execute various information related to the vehicle via a pop-up. The external electronic device 102 may transmit the control signal to the electronic device 101-*c* in response to the approach of the electronic device 101-*c*. The external electronic device 102 may control or execute at least one function or operation which may be provided to a user (or the electronic device 101-*c*) in response to the approach of the electronic device 101-*c*. When the electronic device 101-*c* becomes close to the external electronic device 102 (e.g., when the electronic device 101-*c* enters an area where the electronic device 101-*c* can wirelessly receive power from the external electronic device 102), the external electronic device 102 may activate a wireless charging function to charge the designated electronic device 101-*c*, and may perform a designated operation according to charging efficiency. According to an embodiment, when the electronic device 101-*c* is located in the first area 510 (or when the distance to the external electronic device 102 is within the first threshold value) or when the electronic device 101-*c* moves from the second area 520 to the first area 510, the external electronic device 102 may activate a wireless charging function in order to wirelessly transmit power to the electronic device 101-*c*.

The external electronic device 102 may wirelessly transmit power to the electronic device 101-*c* using the activated wireless charging function. The external electronic device 102 may calculate the efficiency of power transmitted to the electronic device 101-*c* in real time or at designated time intervals. The external electronic device 102 may perform a designated operation according to the efficiency of power transmitted to the electronic device 101-*c*.

According to various embodiments, the electronic device 101 may compare information associated with the external electronic device 102, which is included in a short-range communication signal transmitted by the external electronic device 102, and information associated with a plurality of external electronic devices that is stored in advance in the electronic device 101-*c*. When it is determined that the information associated with the external electronic device 102 is the same as the information stored in the memory 130, the electronic device 101-*c* may perform an authentication operation with the external electronic device 102 in order to wirelessly receive power from the external electronic device 102. According to an embodiment, the electronic device 101-*c* may compare the media access control (MAC) address of the external electronic device 102 that transmits a signal in the short-range communication and the MAC addresses of a plurality of external electronic devices stored in advance, to authenticate the external electronic device 102. The authentication may be performed to determine whether to approve controlling the external electronic device 102 using the electronic device 101-*c*, or to wirelessly receive power from the external electronic device 102. The electronic device 101-*c* may authenticate the external electronic device 102, based on a secure channel connected to the external electronic device 102, using a previously stored key value.

According to various embodiments, the electronic device 101-*b* may operate in the second mode when the strength of a short-range communication signal is greater than or equal to a designated threshold value. The electronic device 101-*b* may transmit a control signal corresponding to the second mode to the external electronic device 102. While the electronic device 101-*b* operates in the second mode, when the wireless charging signal is received from the external electronic device 102, the electronic device 101-*b* may operate in the first mode. The electronic device 101-*c* may transmit a control signal corresponding to the first mode to the external electronic device 102. The electronic device 101-*c* may wirelessly receive power from the external electronic device 102, and may charge a power supply (e.g., a battery). At least one of the electronic device 101-*c* and the external electronic device 102 may calculate the efficiency of wireless power charging. At least one of the electronic device 101-*c* and the external electronic device 102 may or may not transmit the calculated efficiency to a partner electronic device (e.g., the external electronic device 102 in the case of the electronic device 101-*c*, or the electronic device 101-*c* in the case of the external electronic device 102).

According to various embodiments, at least one function or operation performed by the electronic device 101-*a*, 101-*b*, or 101-*c* may be performed by the external electronic device 102. At least one function or operation performed by the external electronic device 102 may be performed by the electronic device 101-*a*, 101-*b*, or 101-*c*. According to an embodiment, the external electronic device 102 may correct information received from the electronic device 101-*a*, 101-*b*, or 101-*c*, based on at least a part of information obtained from at least one sensor included in the electronic device 101-*a*, 101-*b*, or 101-*c*, to determine an area (or distance) where the electronic device 101-*a*, 101-*b*, or 101-*c* is located.

Although it has been described that the electronic device 101-*a* located in the third area 530 moves to the first area 510 via the second area 520 with reference to FIG. 5, various embodiments may be applied to the case in which the electronic device 101-*c* located in the first area 510 moves to the third area 530 via the second area 520, or may be applied to the case in which the electronic device 101-*c* freely moves between areas. According to an embodiment, when the electronic device 101-*c* is sensed from the first area 510, the external electronic device 102 may operate in the first mode and may wirelessly transmit power to the electronic device 101. According to an embodiment, while the external electronic device 102 wirelessly transmits power to the electronic device 101-*c*, when the electronic device 101-*c* moves to the second area 520, the external electronic device 102 may sense that the electronic device 101-*c* becomes distant. For example, the external electronic device 102 changes an operation mode from the first mode to the second mode again, and may perform a function corresponding to the second mode (e.g., interrupting a wireless charging operation). According to an embodiment, while the external electronic device 102 operates in the second mode, when the electronic device 101-*b* moves to the third area 530, the external electronic device 102 may sense that the electronic device 101-*b* becomes distant. For example, the external electronic device 102 changes the operation mode from the second mode to the third mode again, and may perform a function corresponding to the second mode (e.g., locking a door).

Figure 6:
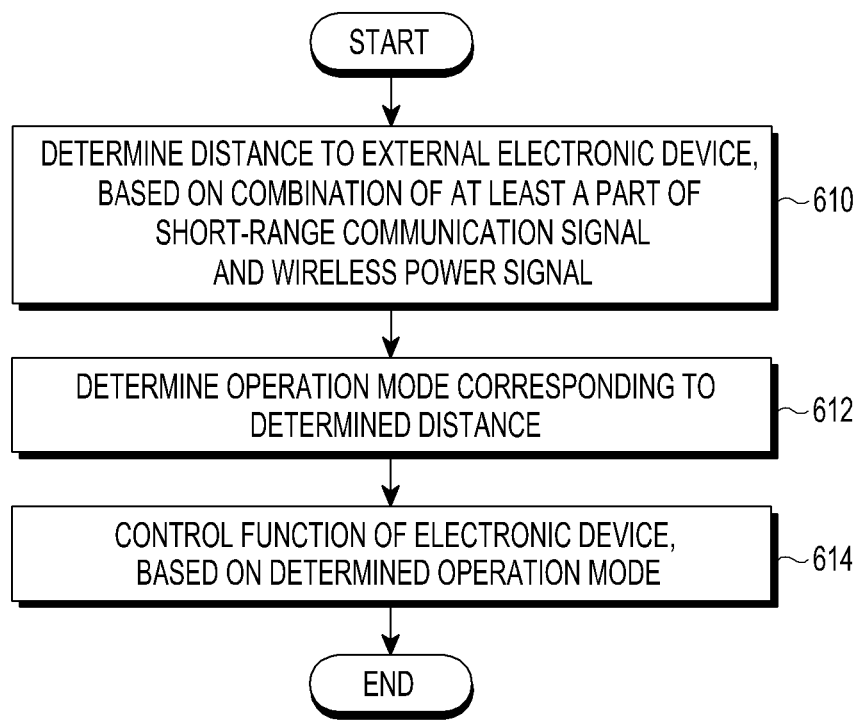
FIG. 6 is a flowchart illustrating a process of determining the distance to an external electronic device and a controlling operation according to an embodiment.

FIG. 6 is a flowchart illustrating a process of determining the distance to an external electronic device and a controlling operation according to an embodiment.

Hereinafter, referring to FIG. 6, a process in which an electronic device controls an operation mode will be described in greater detail as follows.

According to various embodiments, in operation 610, the electronic device 101 (e.g., the processor 120) or the external electronic device 102 may determine the distance between the electronic device and the external electronic device 102, based on at least a part of a short-range communication signal and a wireless power signal.

According to various embodiments, at least one of the electronic device 101 and the external electronic device 102 may perform a function based on proximity to a partner electronic device (e.g., the external electronic device 102 in the case of the electronic device 101, or the electronic device 101 in the case of the external electronic device 102), based on at least a part of a second signal (e.g., a BLE signal), a first signal (e.g., a wireless charging signal), and a third signal (e.g., a BLE Long Range signal).

According to an embodiment, when the electronic device 101 receives the second signal, it is determined that the electronic device is located in a second area (e.g., the second area 520 of FIG. 5). For example, the electronic device 101 may receive the second signal (e.g., a BLE signal) from an external electronic device (e.g., the first external electronic device 102) via a wireless communication circuit (e.g., the communication interface 170), and may determine proximity to the external electronic device 102 based on at least a part of the received signal.

According to an embodiment, when the electronic device 101 receives the first signal (e.g., a wireless charging signal), it is determined that the electronic device is located in a first area (e.g., the first area 510 of FIG. 5). The second signal that the electronic device receives may be a wireless charging signal transmitted from the wireless charging circuit of the activated external electronic device when the electronic device 101 is located in a second area (e.g., the second area 520 of FIG. 5) or when the electronic device 101 is close to the first area (e.g., the first area 510 of FIG. 5) in the second area. For example, the electronic device 101 may determine proximity to the external electronic device 102, based on the first signal (e.g., a wireless charging signal) received from the external electronic device 102 via the wireless charging circuit (e.g., the wireless charging circuit 410 of FIG. 4A).

According to an embodiment, when the electronic device 101 receives the third signal (e.g., a BLE Long Range signal), or when the strength of the second signal is less than or equal to a threshold value, it is determined that the electronic device 101 is located in a third area (e.g., the third area 530). For example, the electronic device 101 may determine proximity to the external electronic device 102, based on the third signal (e.g., a BLE Long Range signal).

According to an embodiment, the electronic device 101 (e.g., the processor 120) may transmit the second signal to the external electronic device 102, and may receive a response signal from the external electronic device 102 in response to the transmitted second signal. The electronic device 101 (e.g., the processor 120) may determine whether information associated with the external electronic device 102 is the same as information associated with the external electronic device 102 that is stored in advance in the memory (e.g., the memory 130), and may perform an authentication operation for controlling the external electronic device 102 or receiving power. The electronic device 101 (e.g., the processor 120) may determine the proximity to the external electronic device 102 using the strength of the second signal, adjustment of transmission power of the second signal, the round trip time of the second signal, signaling after connection to the external electronic device, and a combination of at least a part thereof. The electronic device 101 (e.g., the processor 120) may determine the proximity to the external electronic device 102 using charging efficiency based on the first signal, the adjustment of power of the wireless charging circuit (e.g., the wireless charging circuit 410 of FIG. 4A), and a combination of at least a part thereof.

According to various embodiments, in operation 612, the electronic device 101 (e.g., the processor 120) may determine an operation mode corresponding to (e.g. based on) the determined distance. According to an embodiment, the electronic device 101 (e.g., the processor 120) may determine an operation mode based on the determined proximity. At least one of the electronic device 101 (e.g., the processor 120) and the external electronic device 102 may determine an operation mode corresponding to the proximity. For example, the operation mode may be determined such that the electronic device operates in a second mode in the second area (e.g., the second area 520 of FIG. 5), the electronic device operates in a first mode in the first area (e.g., the first area 510 of FIG. 5), and the electronic device operates in a third mode in the third area (e.g., the third area 530 of FIG. 5).

The operation mode may include the first mode, the second mode, and the third mode, according to the distance to the external electronic device 102 or an area where the electronic device 101 is located. The first mode is a mode in which the electronic device 101 or the external electronic device 102 (e.g., a vehicle) operates when the electronic device 101 is located in the first area (e.g., inside the external electronic device 102 (vehicle) or an area (e.g., the wireless charging area) very close to the external electronic device 102). The second mode is a mode in which the electronic device 101 or the external electronic device 102 (e.g., a vehicle) operates when the electronic device 101 is located in the second area (e.g., a BLE area). The third mode is a mode in which the electronic device 101 or the external electronic device 102 (e.g., a vehicle) operates when the electronic device 101 is located in the third area (e.g., a BLE Long Range area).

In the first mode, the electronic device (e.g., the electronic device 101-c of FIG. 5) may connect multimedia to the vehicle, such as navigation, Bluetooth, a mirroring link, or may perform a vehicle mode, and the external electronic device 102 may control the engine of the vehicle to be in a standby state. The second mode may include a function by which the electronic device (e.g., the electronic device 101-c of FIG. 5) transmits a control signal for controlling operation (e.g., controlling the door or engine of the vehicle) to the external electronic device 102, and a function by which the external electronic device 102 controls the door or engine of the vehicle. According to an embodiment, when the electronic device (e.g., the electronic device 101-b of FIG. 5) operates in the second mode, the electronic device (e.g., the electronic device 101-b of FIG. 5) may display a start-up menu on a display (e.g., the display 160), and the external electronic device 102 may perform at least one of unlocking the door of the vehicle and adjusting a car seat. The third mode may include a function by which the electronic device (e.g., the electronic device 101-c of FIG. 5) transmits a control signal for outputting at least one alarm (turning on/off the headlight of the vehicle) to the external electronic device 102, and a function by which the external electronic device 102 controls the headlight of the vehicle to be turned on/off. According to an embodiment, when the electronic device (e.g., the electronic device 101-c of FIG. 5) operates in the third mode, the electronic device (e.g., the electronic device 101-c of FIG. 5) executes a smart key application for quick execution or displays a pop-up including various information related to the vehicle on a display (e.g., the display 160).

According to various embodiments, in operation 614, the electronic device 101 (e.g., the processor 120) may control at least some functions of the electronic device 101, based on the determined operation mode. According to an embodiment, the external electronic device 102 may control at least some functions of the external electronic device 102, based on the determined operation mode. At least one of the electronic device 101 (e.g., the processor 120) and the external electronic device 102 may operate in different modes according to whether the electronic device 101 is located in the first area 510, the second area 520, or the third area 530.

According to various embodiments, when the electronic device 101 is located in or enters the third area (e.g., the third area 530 of FIG. 5), at least one of the electronic device 101 (e.g., the processor 120) and the external electronic device 102 may operate in the third mode. According to an embodiment, when the strength of a BLE signal that the electronic device (e.g., the electronic device 101-a of FIG. 5) receives from the external electronic device 102 is less than or equal to a predetermined strength, or when a BLE Long Range signal is received, at least one of the electronic device (e.g., the electronic device 101-a of FIG. 5) and the external electronic device 102 may operate in the third mode. According to an embodiment, the third mode may include a function by which the electronic device 101 (e.g., the processor 120) transmits a control signal for outputting at least one alarm (turning on/off the headlight of the vehicle)

to the external electronic device 102, and a function by which the external electronic device 102 controls the headlight of the vehicle to be turned on/off. According to an embodiment, when the electronic device (e.g., the electronic device 101-*a* of FIG. 5) operates in the third mode, the electronic device (e.g., the electronic device 101-*a* of FIG. 5) executes a smart key application for quick execution, and some functions of the smart key application may be restricted.

According to an embodiment, when the electronic device 101 is located in or enters the second area (e.g., the second area 520 of FIG. 5), at least one of the electronic device 101 (e.g., the processor 120) and the external electronic device 102 may operate in the second mode. According to an embodiment, when the electronic device (e.g., the electronic device 101-*b* of FIG. 5) receives a BLE signal from the external electronic device 102, or when the strength of the received BLE signal is greater than or equal to a predetermined strength, or when the strength of a received BLE Long Range signal is less than or equal to a predetermined strength, at least one of the electronic device and the external electronic device 102 may operate in the second mode. According to various embodiments, while at least one of the electronic device and the external electronic device 102 operates in the second mode, when the strength of a BLE signal that the electronic device (the electronic device 101-*b* of FIG. 5) receives from the external electronic device 102 is less than or equal to a predetermined strength, at least one of the electronic device (e.g., the electronic device 101-*b* of FIG. 5) and the external electronic device 102 may interrupt operation of the second mode. For example, the second mode may include a function by which the electronic device 101 (e.g., processor 120) transmits a control signal for controlling operation (e.g., controlling the door or engine of the vehicle) to the external electronic device 102, and a function by which the external electronic device 102 controls the door or engine of the vehicle. According to an embodiment, when the electronic device (e.g., the electronic device 101-*b* of FIG. 5) operates in the second mode, the electronic device (e.g., the electronic device 101-*b* of FIG. 5) may display a start-up menu on a display (e.g., the display 160), and the external electronic device 102 may perform at least one of unlocking the door of the vehicle and adjusting a car seat.

According to an embodiment, while the electronic device (e.g., the electronic device 101-*c* of FIG. 5) operates in the second mode, when a wireless charging signal from the external electronic device 102 is sensed or when the strength of the sensed wireless charging signal is greater than or equal to a predetermined strength, at least one of the electronic device (e.g., the electronic device 101-*c* of FIG. 5) and the external electronic device 102 may operate in the first mode. According to an embodiment, when the electronic device (e.g., the electronic device 101-*c* of FIG. 5) operates in the first mode, the electronic device (e.g., the electronic device 101-*c* of FIG. 5) may connect multimedia to the vehicle such as navigation, Bluetooth, a mirroring link, or the like, or may perform a vehicle mode, and the external electronic device 102 may control the engine of the vehicle in a standby state. According to another embodiment, while at least one of the electronic device (e.g., the electronic device 101-*c* of FIG. 5) and the external electronic device 102 operate in the first mode, when the strength of a wireless charging signal that the electronic device (e.g., the electronic device 101-*c* of FIG. 5) receives from the external electronic device 102 is less than or equal to a predetermined strength, at least one of the electronic device (e.g., the electronic device 101-*c* of FIG. 5) and the external electronic device 102 may interrupt operation of the first mode. According to an embodiment, the electronic device (e.g., the electronic device 101-*c* of FIG. 5) may perform at least one of disconnecting multimedia from the vehicle, releasing a vehicle mode, and storing a parking location. In this instance, when the engine of the vehicle is in the standby state, the external electronic device 102 may perform at least one of outputting an escape alarm, and locking the door of the vehicle.

As another example, at least one of the operations performed in the first mode may be restricted when the strength of a wireless charging signal or wireless charging efficiency does not satisfy a designated condition. For example, when the wireless charging signal that the electronic device receives or the wireless charging efficiency is greater than or equal to a threshold value, it is determined that the electronic device 101 is located within the external electronic device 102 (e.g., a vehicle). When the wireless charging signal or the wireless charging efficiency is less than or equal to the threshold value, it is determined that the electronic device exists outside the vehicle. Depending on cases, at least one of the electronic device 101 (e.g., the processor 120) and the external electronic device 102 may provide different functions. As another example, when the electronic device 101-*c* approaches a wireless charging area provided by the external electronic device 102, the electronic device 101-*c* may receive wireless charging power, and may transmit the current charging efficiency to the external electronic device 102. The external electronic device 102 may monitor the wireless charging efficiency provided by the electronic device 101-*c* and may estimate the proximity to the electronic device 101-*c*. When it is determined that power greater than or equal to a predetermined level is received, the external electronic device 102 may determine whether the electronic device 101-*c* exists at a short distance, or may exist inside the vehicle.

Figure 7:
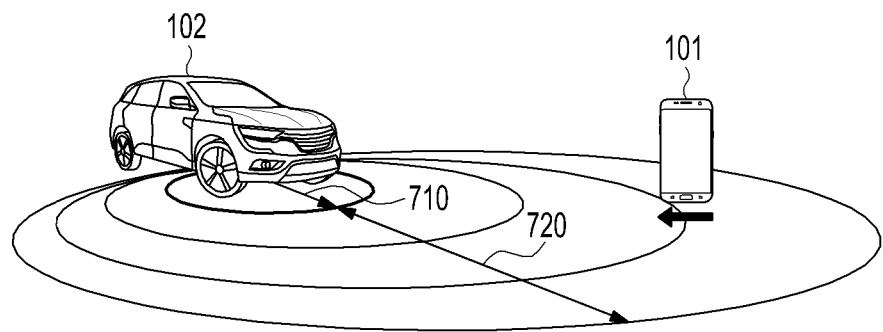
FIG. 7 is a diagram illustrating an example in which an electronic device located in a first area moves to a second area within the first area according to an embodiment.

FIG. 7 is a diagram illustrating movement of a portable electronic device from a second area to a first area according to an embodiment.

Referring to FIG. 7, the electronic device 101 may move from a second area 720 to a first area 710. The first area 710 has a smaller coverage area than the second area 720, and may overlap at least a part of the second area 720. For example, the electronic device that is located in the second area 720 may move in a direction close to the external electronic device 102, thereby moving to the first area 710. When the electronic device 101 is located in the second area 720, at least one of the electronic device 101 (e.g., the processor 120) and the external electronic device 102 may operate in a second mode. In the second mode, the electronic device 101 (e.g., processor 120) transmits a control signal for controlling operation (e.g., controlling the door or engine of the vehicle) to the external electronic device 102, and the external electronic device 102 controls the door or engine of the vehicle. According to an embodiment, the external electronic device 102 may unlock (change the state from lock to unlocking) the door of the vehicle or start up the engine, based on the fact that the electronic device 101 is located in the second area 720. According to an embodiment, the electronic device 101 may execute an application capable of controlling the external electronic device 102, or may display various information in the form of a pop-up on a display.

According to various embodiments, when the electronic device 101 is located in the first area 710, the external electronic device 102 may wirelessly transmit power to the electronic device 101. When the electronic device 101 is located in the first area 710, at least one of the electronic device 101 (e.g., the processor 120) or the external electronic device 102 may operate in a first mode. According to an embodiment, when it is determined that the electronic device 101 is located in the first area 710 or in the vehicle, the external electronic device 102 may wirelessly transmit power to the electronic device 101. According to an embodiment, the electronic device 101 may execute an application capable of controlling the external electronic device 102, or may display various information related to the vehicle in the form of a pop-up on the display. At least one of the external electronic device 102 and the electronic device 101 (e.g., the processor 120) may calculate the efficiency of wirelessly transmitted power in real time or at designated time intervals.

According to an embodiment, the first area 710 may be an area (e.g., the first area 520 of FIG. 5) where the electronic device 101 can receive a wireless charging signal from the external electronic device 102, and the second area 720 may be an area (e.g., the second area 520 of FIG. 5) where the electronic device 101 can receive a BLE signal. As another example, the first area 710 may be an area (e.g., the second area 520 of FIG. 5) where the electronic device 101 can receive a BLE signal from the external electronic device 102, and the second area 720 may be an area (e.g., the third area 530 of FIG. 5) where the electronic device 101 can receive a BLE Long Range signal.

Figure 8A:
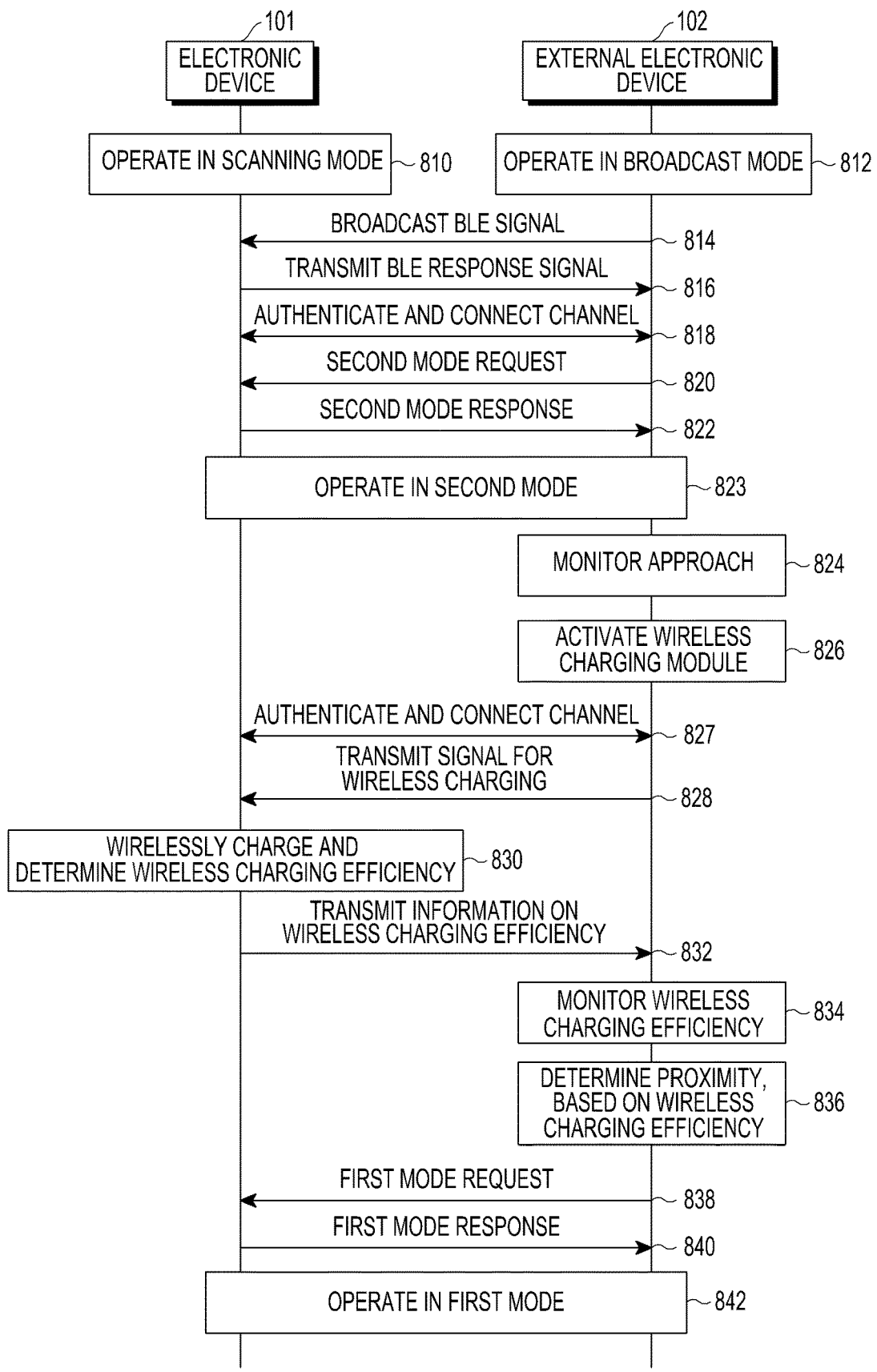
FIG. 8A is a flowchart illustrating a process of determining proximity to an external electronic device, based on a short-range communication signal and efficiency of wireless charging, and a controlling operation by an electronic device according to an embodiment.

FIG. 8A is a flowchart illustrating a process of determining proximity to the external electronic device 102 (e.g., the external electronic device 102 of FIG. 7), based on a short-range communication signal and wireless charging efficiency, and controlling operation by the electronic device 101 (e.g., the electronic device 101 of FIG. 7) according to an embodiment.

Referring to FIG. 7, for example, in the state in which the electronic device 101 (e.g., the electronic device 101 of FIG. 7) is located in the second area 720, the electronic device 101 may move to the first area 710 in the second area 720.

According to various embodiments, the electronic device 101 (e.g., the electronic device 101 of FIG. 7) may operate in a scanning mode in operation 810. For example, the electronic device 101 (e.g., the electronic device 101 of FIG. 7) may operate in a scanning mode for receiving a short-range communication signal (e.g., BLE signal) broadcasted from the external electronic device 102 (e.g., the external electronic device 102 of FIG. 7). For example, in this instance, the electronic device 101 may be located in the second area (e.g., the second area 720 of FIG. 7). According to various embodiments, the external electronic device 102 (e.g., the external electronic device 102 of FIG. 7) may operate in a broadcast mode in operation 812. For example, the external electronic device 102 (e.g., the external electronic device 102 of FIG. 7) may operate in a broadcast mode for periodically (or aperiodically) broadcasting a BLE signal. When the external electronic device 102 (e.g., the external electronic device 102 of FIG. 7) operates in the broadcast mode, the external electronic device 102 may broadcast a BLE signal. For example, when the external electronic device 102 senses disconnection from the electronic device 101, the external electronic device 102 may operate in a broadcast mode and may periodically or aperiodically broadcast a BLE signal.

According to various embodiments, the external electronic device 102 (e.g., the external electronic device 102 of FIG. 7) may broadcast a BLE signal in operation 814. According to various embodiments, the electronic device 101 (e.g., the electronic device 101 of FIG. 7) may transmit a response signal to the external electronic device 102 (e.g., the external electronic device 102 of FIG. 7) in response to the received BLE signal in operation 816. For example, the external electronic device 102 (e.g., the external electronic device 102 of FIG. 7) receives the response signal transmitted from the electronic device 101 (e.g., the electronic device 101 of FIG. 7).

According to various embodiments, the electronic device 101 (e.g., the electronic device 101 of FIG. 7) may authenticate the external electronic device 102 (e.g., the external electronic device 102 of FIG. 7) and performs channel connection in operation 818. According to an embodiment, the electronic device 101 (e.g., the electronic device 101 of FIG. 7) and the external electronic device 102 (e.g., the external electronic device 102 of FIG. 7) perform authentication, and may connect a channel (e.g., Bluetooth) to operate in the second mode, based on a signal strength. The external electronic device 102 (e.g., the external electronic device 102 of FIG. 7) recognizes a BLE response signal received from the electronic device 101 (e.g., the electronic device 101 of FIG. 7), performs authentication by determining whether the MAC address of the electronic device 101 (e.g., the electronic device 101 of FIG. 7) that transmits the received BLE response signal is the same as a registered MAC address, and connects a channel when the authentication is completed. At least one of the electronic device 101 (e.g., the electronic device 101 of FIG. 7) and the external electronic device 102 (e.g., the external electronic device 102 of FIG. 7) may perform a mutual authentication process by verifying a key value stored in a corresponding memory (e.g., the memory 130). According to an embodiment, the external electronic device 102 (e.g., the external electronic device 102 of FIG. 7) may store information associated with the electronic device in a BLE table (e.g., a database) in the memory (e.g., the memory 130). According to an embodiment, in the state in which the external electronic device 102 (e.g., the external electronic device 102 of FIG. 7) stores the information associated with the electronic device 101 (e.g., the electronic device 101 of FIG. 7) in the BLE table, the external electronic device 102 may obtain, from the received BLE signal, the MAC address of the electronic device 101 (e.g., the electronic device 101 of FIG. 7) that transmits the BLE signal, and compares the obtained MAC address and an MAC address stored in the BLE table, to authenticate the electronic device 101 (e.g., the electronic device 101 of FIG. 7). The authentication process will be described in greater detail below with reference to FIG. 12.

According to various embodiments, the external electronic device 102 (e.g., the external electronic device 102 of FIG. 7) may request the electronic device 101 (e.g., the electronic device 101 of FIG. 7) to operate in the second mode in operation 820. According to an embodiment, the external electronic device 102 (e.g., the external electronic device 102 of FIG. 7) may request the electronic device 101 (e.g., the electronic device 101 of FIG. 7) to operate in the second mode, based on the strength of the BLE response signal received from the electronic device.

According to various embodiments, the electronic device 101 (e.g., the electronic device 101 of FIG. 7) may transmit a response to the external electronic device 102 (e.g., the external electronic device 102 of FIG. 7) in response to the second mode operation request in operation 822.

According to various embodiments, the electronic device 101 (e.g., the electronic device 101 of FIG. 7) and the external electronic device 102 (e.g., the external electronic device 102 of FIG. 7) may operate in the second mode in operation 823. According to an embodiment, the external electronic device 102 transmits the second mode request to the electronic device 101 (e.g., the electronic device 101 of FIG. 7), and the electronic device 101 (the electronic device 101 of FIG. 7) that receives the second mode request transmits a second mode response to the external electronic device 102 (e.g., the external electronic device 102 of FIG. 7), whereby at least one of the electronic device 101 (e.g., the electronic device 101 of FIG. 7) and the external electronic device 102 (e.g., the external electronic device 102 of FIG. 7) may operate in the second mode. According to an embodiment, when the strength of a BLE signal that the electronic device 101 (e.g., the electronic device 101 of FIG. 7) receives from the external electronic device 102 (e.g., the external electronic device 102 of FIG. 7) is greater than or equal to a predetermined strength, at least one of the electronic device 101 (e.g., the electronic device 101 of FIG. 7) and the external electronic device 102 (e.g., the external electronic device 102 of FIG. 7) may operate in the second mode. According to an embodiment, in the state in which the electronic device 101 (e.g., the electronic device 101 of FIG. 7) and the external electronic device 102 (e.g., the external electronic device 102 of FIG. 7) operate in the second mode, when a channel is disconnected, the second mode operation may be interrupted. The second mode includes a function by which the electronic device 101 (e.g., the electronic device 101 of FIG. 7) transmits a control signal for controlling operation (controlling the door or the engine of the vehicle) to the external electronic device 102 (e.g., the external electronic device 102 of FIG. 7), and a function by which the external electronic device 102 (e.g., the external electronic device 102 of FIG. 7) controls the door or the engine of the vehicle. According to an embodiment, when the electronic device 101 (e.g., the electronic device 101 of FIG. 7) operates in the second mode, the electronic device 101 (e.g., the electronic device 101 of FIG. 7) may display a start-up menu, and the external electronic device 102 (e.g., the external electronic device 102 of FIG. 7) may perform at least one of unlocking the door of the vehicle and adjusting a car seat.

According to various embodiments, the external electronic device 102 (e.g., the external electronic device 102 of FIG. 7) may periodically or aperiodically monitor proximity of the electronic device 101 (e.g., the electronic device 101 of FIG. 7) in operation 824. According to an embodiment, the external electronic device 102 (e.g., the external electronic device 102 of FIG. 7) may determine the proximity of the electronic device (e.g., the electronic device 101 of FIG. 7) by determining whether the electronic device 101 (e.g., the electronic device 101 of FIG. 7) approaches the vehicle using at least one of an angle of departure (AoD), an angle of arrival (AoA), a variation in a signal strength, and or Doppler effect.

According to various embodiments, the external electronic device 102 (e.g., the external electronic device 102 of FIG. 7) may activate a wireless charging module in operation 826. According to an embodiment, the external electronic device 102 (e.g., the external electronic device 102 of FIG. 7) may activate a wireless charging module when the electronic device 101 (e.g., the electronic device 101 of FIG. 7) exists in the BLE area 101 (e.g., the electronic device 101 of FIG. 7) or the strength of a signal in the BLE area is greater than or equal to a predetermined strength. The external electronic device 102 (e.g., the external electronic device 102 of FIG. 7) may activate a wireless charging module in order to wirelessly provide power to the electronic device 101 (e.g., the electronic device 101 of FIG. 7).

According to various embodiments, the electronic device 101 (e.g., the electronic device 101 of FIG. 7) and the external electronic device 102 (e.g., the external electronic device 102 of FIG. 7) may perform authentication and channel connection for wireless charging, based on the activated wireless charging module in operation 827. According to an embodiment, when the electronic device 101 (e.g., the electronic device 101 of FIG. 7) approaches within a wireless charging area, the external electronic device 102 (e.g., the external electronic device 102 of FIG. 7) may authenticate the electronic device 101 (e.g., the electronic device 101 of FIG. 7) one more time in a signaling process for wireless charging.

According to various embodiments, the external electronic device 102 (e.g., the external electronic device 102 of FIG. 7) may transmit a signal for wireless charging to the electronic device 101 (e.g., the electronic device 101 of FIG. 7) in operation 828. When a channel for wireless power transmission is connected to the electronic device 101 (e.g., the electronic device 101 of FIG. 7), the external electronic device 102 (e.g., the external electronic device 102 of FIG. 7) may transmit a signal for wireless charging to the electronic device 101 (e.g., the electronic device 101 of FIG. 7). A resonance frequency used when the external electronic device 102 (e.g., the external electronic device 102 of FIG. 7) wirelessly provides power to the electronic device 101 (e.g., the electronic device 101 of FIG. 7) may include 87 kHz~205 kHz, 277 kHz~357 kHz, 3.28 MHz, or 6.78 MHz. According to an embodiment, the external electronic device 102 (e.g., the external electronic device 102 of FIG. 7) may provide, to the electronic device 101 (e.g., the electronic device 101 of FIG. 7), a control signal for wirelessly providing power to the electronic device 101 (e.g., the electronic device 101 of FIG. 7) according to an in-band scheme or an out-band scheme. For example, the external electronic device 102 (e.g., the external electronic device 102 of FIG. 7) may communicate with the electronic device 101 (e.g., the electronic device 101 of FIG. 7) according to the in-band scheme, using the resonance frequency used for wirelessly providing power. As another example, the external electronic device 102 (e.g., the external electronic device 102 of FIG. 7) may communicate with the electronic device 101 (e.g., the electronic device 101 of FIG. 7) according to the out-band scheme, using at least one of short-range communication schemes, such as near field communication (NFC), ZigBee communication, Infrared ray communication, visible ray communication, Bluetooth communication, and BLE communication. According to an embodiment, when the electronic device 101 (e.g., the electronic device 101 of FIG. 7) receives a signal for wireless charging or senses that wireless power is transmitted from a wireless power transmitting device (e.g., the external electronic device 102 (e.g., the external electronic device 102 of FIG. 7)) according to the short-range communication scheme, the electronic device 101 (e.g., the electronic device 101 of FIG. 7) may operate in the first mode.

According to various embodiments, the electronic device 101 (e.g., the electronic device 101 of FIG. 7) may charge a battery via the received wireless charging power, and may determine wireless charging efficiency in operation 830. According to an embodiment, at least one of the electronic device 101 (e.g., the electronic device 101 of FIG. 7) and the external electronic device 102 (e.g., the external electronic device 102 of FIG. 7) may determine wireless charging efficiency via a signal for wireless charging. The electronic device 101 (e.g., the electronic device 101 of FIG. 7) may perform operation based on the determined wireless charging efficiency. According to an embodiment, the electronic device 101 (e.g., the electronic device 101 of FIG. 7) or the external electronic device 102 (e.g., the external electronic device 102 of FIG. 7) may determine whether the electronic device 101 (e.g., the electronic device 101 of FIG. 7) currently exists inside the vehicle or outside the vehicle, based on the determined wireless charging efficiency. The electronic device 101 (e.g., the electronic device 101 of FIG. 7) or the external electronic device 102 (e.g., the external electronic device 102 of FIG. 7) may provide different functions, based on whether the electronic device 101 currently exists inside the vehicle or outside the vehicle. According to an embodiment, when the determined charging efficiency satisfies a designated condition (e.g., a threshold value), the electronic device 101 (e.g., the electronic device 101 of FIG. 7) may request the external electronic device 102 (e.g., the external electronic device 102 of FIG. 7) to improve charging power, and the external electronic device 102 (e.g., the external electronic device 102 of FIG. 7) that receives the request may increase the strength of transmission power. According to an embodiment, when the determined charging efficiency satisfies a designated condition, the electronic device 101 (e.g., the electronic device 101 of FIG. 7) may determine that the electronic device 101 exists at a short distance from the external electronic device 102, and may perform an operation corresponding thereto. According to an embodiment, when the wireless charging efficiency is less than or equal to a previously designated strength, at least one of the electronic device 101 (e.g., the electronic device 101 of FIG. 7) and the external electronic device 102 (e.g., the external electronic device 102 of FIG. 7) may interrupt the second mode operation.

According to various embodiments, the electronic device 101 (e.g., the electronic device 101 of FIG. 7) may transmit information associated with wireless charging efficiency to the external electronic device 102 (e.g., the external electronic device 102 of FIG. 7) in operation 832.

According to various embodiments, the external electronic device 102 (e.g., the external electronic device 102 of FIG. 7) may monitor wireless charging efficiency in operation 834. According to an embodiment, the external electronic device 102 (e.g., the external electronic device 102 of FIG. 7) may periodically or aperiodically monitor wireless charging efficiency, based on information on the wireless charging efficiency received from the electronic device 101 (e.g., the electronic device 101 of FIG. 7).

According to various embodiments, the external electronic device 102 (e.g., the external electronic device 102 of FIG. 7) may determine proximity of the electronic device 101 (e.g., the electronic device 101 of FIG. 7), based on the wireless charging efficiency in operation 836. According to an embodiment, the external electronic device 102 (e.g., the external electronic device 102 of FIG. 7) may monitor wireless charging efficiency provided by the electronic device 101 (e.g., the electronic device 101 of FIG. 7), and may estimate proximity of the electronic device 101 (e.g., a portable terminal). When it is determined that power greater than or equal to a predetermined level is used for charging, the external electronic device 102 may determine that the electronic device 101 (the electronic device 101 of FIG. 7) exists at a short distance.

According to various embodiments, the external electronic device 102 (e.g., the external electronic device 102 of FIG. 7) may request the electronic device 101 (e.g., the electronic device 101 of FIG. 7) to operate in the first mode in operation 838.

According to various embodiments, the electronic device 101 (e.g., the electronic device 101 of FIG. 7) may transmit a response to the external electronic device 102 (e.g., the external electronic device 102 of FIG. 7) in response to the first mode operation request in operation 840.

According to various embodiments, the electronic device 101 (e.g., the electronic device 101 of FIG. 7) and the external electronic device 102 (e.g., the external electronic device 102 of FIG. 7) may operate in the first mode in operation 842. When the electronic device 101 (e.g., the electronic device 101 of FIG. 7) operates in the first mode, the electronic device 101 (e.g., the electronic device 101 of FIG. 7) may connect multimedia to the vehicle such as navigation, Bluetooth, a mirroring link, or the like, or may perform a vehicle mode, and the external electronic device 102 (e.g., the external electronic device 102 of FIG. 7) may control the engine of the vehicle in a standby state. According to another embodiment, in the state in which at least one of the electronic device 101 (e.g., the electronic device 101 of FIG. 7) and the external electronic device 102 (e.g., the external electronic device 102 of FIG. 7) operates in the first mode, when the strength of a wireless charging signal that the electronic device 101 (e.g., the electronic device 101 of FIG. 7) receives from the external electronic device 102 (e.g., the external electronic device 102 of FIG. 7) is less than or equal to a predetermined strength, at least one of the electronic device 101 (e.g., the electronic device 101 of FIG. 7) and the external electronic device 102 (e.g., the external electronic device 102 of FIG. 7) may interrupt the first mode operation. According to an embodiment, the electronic device 101 (e.g., the electronic device 101 of FIG. 7) may perform at least one of disconnecting multimedia from the vehicle, releasing a vehicle mode, and storing a parking location. In this instance, when the engine of the vehicle is in the standby state, the external electronic device 102 (e.g., the external electronic device 102 of FIG. 7) may perform at least one of outputting an escape alarm, and locking the door of the vehicle.

According to an embodiment, operations 824, 826, 834, and 836 may be performed by the electronic device 101, and operations 830 and 832 may be performed by the external electronic device 102 (e.g., the external electronic device 102 of FIG. 7). Although FIG. 8A illustrates that the external electronic device 102 (e.g., the external electronic device 102 of FIG. 7) determines proximity of the electronic device 101 (e.g., the electronic device 101 of FIG. 7), this is merely an example. The electronic device 101 (e.g., the electronic device 101 of FIG. 7) may determine proximity of the external electronic device 102 (e.g., the external electronic device 102 of FIG. 7) using at least one operation performed by the external electronic device 102 (e.g., the external electronic device 102 of FIG. 7).

Figure 8B:
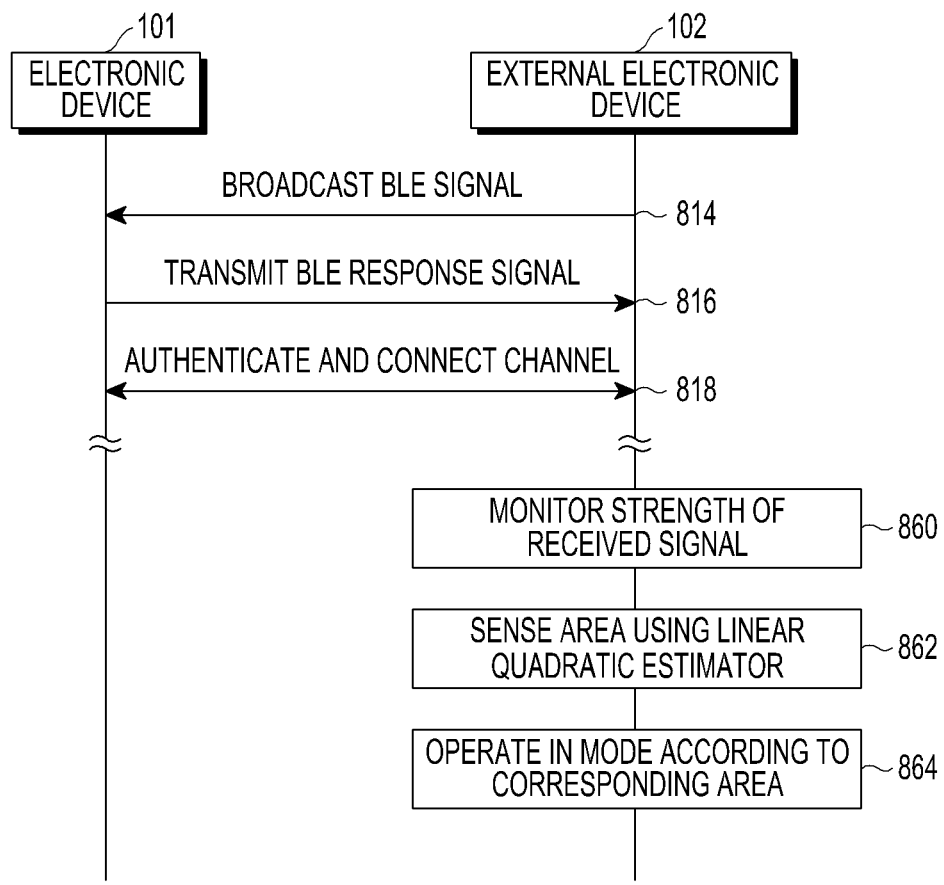
FIG. 8B is a flowchart illustrating a process of determining an area where an electronic device is located, using a linear-quadratic estimator, by an external electronic device according to an embodiment.

FIG. 8B is a flowchart illustrating a process of determining an area where an electronic device is located, using a linear-quadratic estimator, by an external electronic device according to an embodiment.

Referring to FIG. 7, for example, in the state in which the electronic device 101 is located in a second area (e.g., the second area 720 of FIG. 7), the electronic device 101 may move to a first area (e.g., the first area 710 of FIG. 7) in the second area.

According to various embodiments, the external electronic device 102 may broadcast a BLE signal, and the electronic device 101 may receive the broadcasted BLE signal in operation 814. The external electronic device 102 may receive a BLE signal to scan the electronic device 101.

According to various embodiments, the electronic device 101 may transmit a BLE response signal in response to the BLE signal received from the external electronic device 102 in operation 816.

According to various embodiments, the electronic device 101 and the external electronic device 102 may perform authentication and channel connection in operation 818. According to an embodiment, the electronic device 101 and the external electronic device 102 may perform authentication, and may connect a channel (e.g., Bluetooth) to operate in a second mode. The external electronic device 102 (e.g., a vehicle) may recognize a BLE response signal received from the electronic device 101 (e.g., a portable terminal), may determine whether the MAC address of the electronic device 101 (e.g., a portable terminal) that transmits the received BLE response signal is the same as a registered MAC address, to perform authentication, and may connect a channel when the authentication is completed.

According to various embodiments, the external electronic device 102 may monitor the strength of the BLE response signal received from the electronic device 101 in operation 860. The external electronic device 102 may periodically monitor a change in the strength of a BLE response signal transmitted from the electronic device 101, in order to determine an area where the electronic device 101 is located. Determining the area may include determining the relative position between the electronic device 101 and the external electronic device 102.

According to various embodiments, the external electronic device 102 may sense (or identify) the area where the electronic device 101 is located using a linear quadratic estimator in operation 862. According to an embodiment, the external electronic device 102 may periodically monitor a change in the strength of a BLE response signal transmitted from the electronic device 101, and may analyze a trend of a change in the strength of a BLE response signal using the linear quadratic estimator, such as the Kalman filter. The external electronic device 102 may determine whether the electronic device 101 approaches the external electronic device 102, or the electronic device 101 becomes distant from the external electronic device 102, using the linear quadratic estimator. The external electronic device 102 may determine the short-distance/long-distance location of the electronic device and proximity to the external electronic device 102, using a trend of a change in the strength of a BLE response signal together with the current signal strength.

According to various embodiments, at least one of the electronic device 101 and the external electronic device 102 may operate in a mode based on the area where the electronic device 101 is located, in operation 864. According to an embodiment, when the electronic device (e.g., the electronic device 101 of FIG. 7) is located in the second area (e.g., the second area 720 of FIG. 7) or enters the second area, at least one of the electronic device (e.g., the electronic device 101 of FIG. 7) and the external electronic device (e.g., the external electronic device 102 of FIG. 7) may operate in the second mode. According to an embodiment, the second mode includes a function by which the electronic device (e.g., the electronic device 101 of FIG. 7) transmits a control signal for controlling operation (e.g., controlling the door or the engine of the vehicle) to the external electronic device 102 (e.g., the external electronic device 102 of FIG. 7), and a function by which the external electronic device 102 controls the door or the engine of the vehicle. According to an embodiment, when the electronic device (e.g., the electronic device 101 of FIG. 7) operates in the second mode, the electronic device (e.g., the electronic device 101 of FIG. 7) may display a start-up menu on a display (e.g., the display 160), and the external electronic device (e.g., the external electronic device 102 of FIG. 7) may perform at least one of unlocking the door of the vehicle and adjusting a car seat. According to an embodiment, in the state in which at least one of the electronic device (e.g., the electronic device 101 of FIG. 7) and the external electronic device (e.g., the external electronic device 102 of FIG. 7) operates in the second mode, when the strength of a BLE signal that the electronic device (e.g., the electronic device 101 of FIG. 7) receives from the external electronic device (e.g., the external electronic device 102 of FIG. 7) is less than or equal to a predetermined strength, at least one of the electronic device (e.g., the electronic device 101 of FIG. 7) and the external electronic device (e.g., the external electronic device 102 of FIG. 7) may interrupt the second mode operation.

According to various embodiments, when the electronic device (e.g., the electronic device 101 of FIG. 7) is located in the first area (e.g., the first area 710 of FIG. 7) or enters the first area, at least one of the electronic device (e.g., the electronic device 101 of FIG. 7) and the external electronic device (e.g., the external electronic device 102 of FIG. 7) may operate in a first mode. According to an embodiment, while the electronic device (e.g., the electronic device 101 of FIG. 7) operates in the second mode, when a wireless charging signal from the external electronic device (e.g., the external electronic device 102 of FIG. 7) is sensed, the electronic device (e.g., the electronic device 101 of FIG. 7) may determine whether the strength of the wireless charging signal is greater than or equal to a predetermined strength. When the strength of the wireless charging signal is greater than or equal to the predetermined strength, at least one of the electronic device (e.g., the electronic device 101 of FIG. 7) and the external electronic device (e.g., the external electronic device 102 of FIG. 7) may operate in the first mode. According to an embodiment, when the electronic device (e.g., the electronic device 101 of FIG. 7) operates in the first mode, the electronic device (e.g., the electronic device 101 of FIG. 7) may wirelessly receive power from the external electronic device 102, may connect multimedia to the vehicle such as navigation, Bluetooth, a mirroring link, or the like, or may perform a vehicle mode, and the external electronic device (e.g., the external electronic device 102 of FIG. 7) may control the engine of the vehicle in a standby state. According to another embodiment, in the state in which at least one of the electronic device (e.g., the electronic device 101 of FIG. 7) and the external electronic device (e.g., the external electronic device 102 of FIG. 7) operates in the first mode, when the strength of a wireless charging signal that the electronic device (e.g., the electronic device 101 of FIG. 7) receives from the external electronic device (e.g., the external electronic device 102 of FIG. 7) is less than or equal to a predetermined strength, at least one of the electronic device (e.g., the electronic device 101 of FIG. 7) and the external electronic device (e.g., the external electronic device 102 of FIG. 7) may interrupt the first mode operation. For example, the electronic device (e.g., the electronic device 101 of FIG. 7) may perform at least one of disconnecting multimedia from the vehicle, releasing a vehicle mode, and storing a parking location. In this instance, when the engine of the vehicle is in the standby state, the external electronic device (e.g., the external electronic device 102 of FIG. 7) may perform at least one of outputting an escape alarm, and locking the door of the vehicle.

According to various embodiments, although FIG. 8B illustrates that the external electronic device 102 senses an area where the electronic device 101 is located, and operates in a mode based on the corresponding area, this is merely an example. The electronic device 101 may operate in a mode based on an area where the external electronic device 102 is located, via at least one operation performed by the external electronic device 102.

Figure 8C:
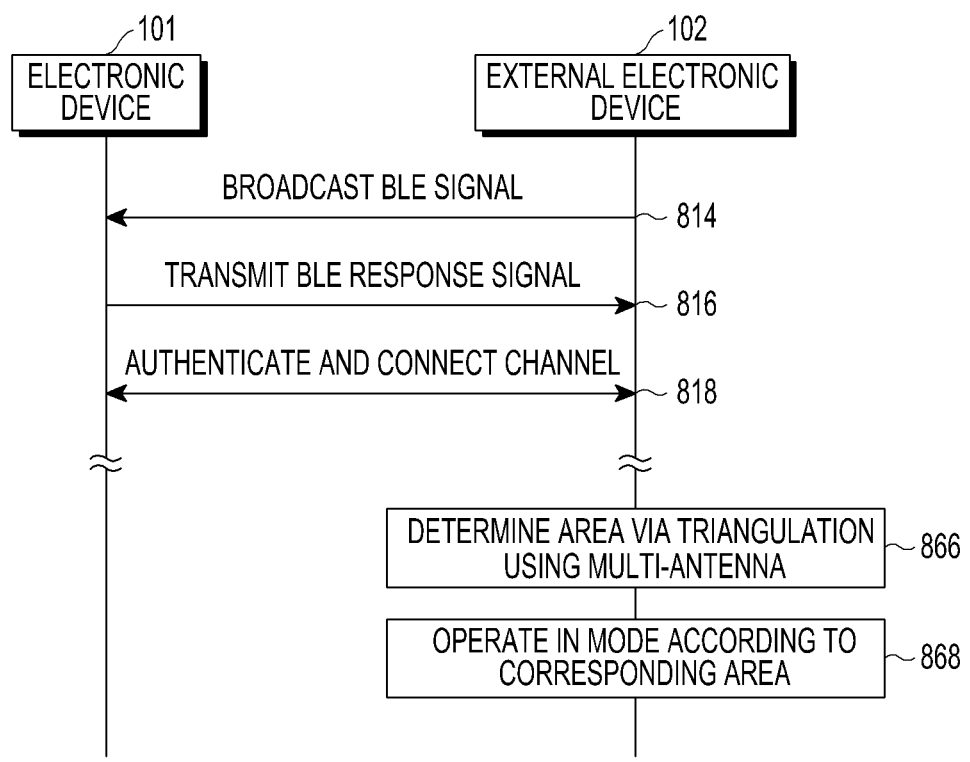
FIG. 8C is a flowchart illustrating a process of determining an area where an electronic device is located, using triangulation, by an external electronic device according to an embodiment.

FIG. 8C is a flowchart illustrating a process of determining an area where an electronic device is located, using triangulation, by an external electronic device according to an embodiment.

Referring to FIG. 7, for example, in the state in which the electronic device 101 is located in a second area (e.g., the second area 720 of FIG. 7), the electronic device 101 may move to a first area (e.g., the first area 710 of FIG. 7) in the second area.

Descriptions of operations 814 to 818 will not be repeated here, since operations 814 to 818 have been described with reference to FIGS. 8A and 8B.

According to various embodiments, the external electronic device 102 may determine (or identify) an area where the electronic device 101 is located, via triangulation using a multi-antenna in operation 866. The electronic device 101 or the external electronic device 102 may include a multi-antenna capable of transmitting and receiving a signal. The external electronic device 102 may receive a BLE response signal that the electronic device 101 transmits via the multi-antenna. According to an embodiment, when the electronic device 101 transmits a BLE response signal to the external electronic device 102 via a uni-antenna, the external electronic device 102 may receive the BLE response signal via the multi-antenna. The distance to the electronic device 101 or the distance to the external electronic device 102 may be determined according to a method such as angle of arrival (AoA) or an angle of departure (AoD) using a multi-antenna. The electronic device 101 or the external electronic device 102 may determine whether the electronic device 101 approaches the external electronic device 102, or whether the electronic device 101 becomes distant, based on the determined distance. According to an embodiment, the electronic device 101 or the external electronic device 102 may sense an area where the electronic device 101 is located according to triangulation using angle information of the electronic device 101 or the external electronic device 102 which is estimated from a multi-antenna. The external electronic device 102 may periodically perform sampling a BLE response signal, which is received from the electronic device 101, via each antenna, and may extract an inphase & quadrature (I&Q) value. The external electronic device 102 may calculate the angle and the distance of the electronic device 101 using the extracted I&Q value. The external electronic device 102 may calculate the angle and the distance to the electronic device 101, based on the I&Q value extracted from the BLE response signal received by each 2.4 GHz antenna.

According to various embodiments, descriptions of operation 868 will not be repeated here since it has been described with reference to operation 864 of FIG. 8B.

According to various embodiments, although FIG. 8C illustrates that the external electronic device 102 operates in a mode based on an area where the electronic device 101 is located, this is merely an example. The electronic device 101 may determine the angle and the distance to the external electronic device 102 via at least one operation performed by the external electronic device 102, and may operate in a mode based on an area where the external electronic device 102 is located.

Figure 8D:
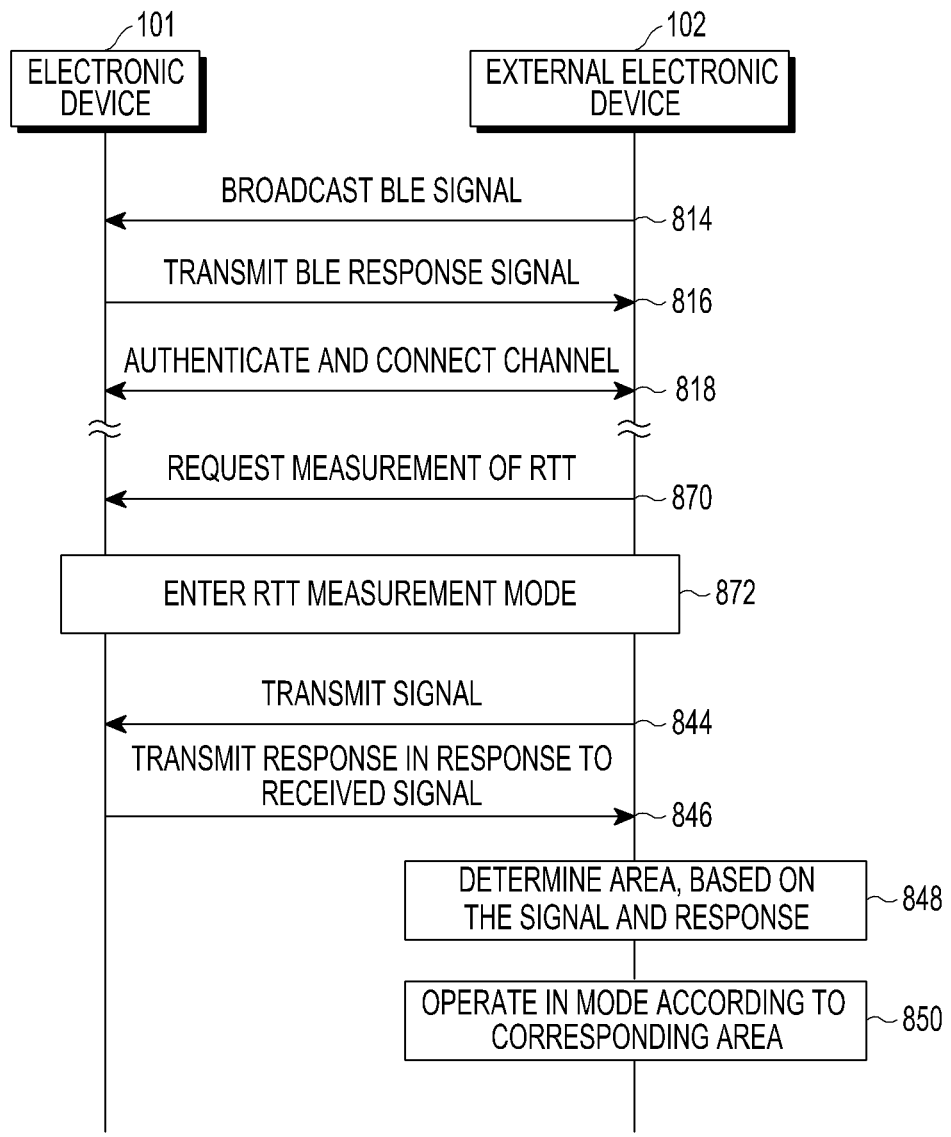
FIG. 8D is a flowchart illustrating a process of determining an area where an electronic device is located, using RTT, by an external electronic device according to an embodiment.

FIG. 8D is a flowchart illustrating a process of determining an area where an electronic device is located, using an RTT, by an external electronic device according to an embodiment.

Referring to FIG. 7, for example, in the state in which the electronic device 101 is located in a second area (e.g., the second area 720 of FIG. 7), the electronic device 101 may move to a first area (e.g., the first area 710 of FIG. 7) in the second area.

Descriptions of operations 814 to 818 will not be repeated here, since operations 814 to 818 have been described with reference to FIGS. 8A and 8B.

According to various embodiments, the external electronic device 102 transmits a round trip time (RTT) measurement request to the electronic device 101 in operation 870. When a BLE response signal is received from the electronic device 101, the external electronic device 102 may request the electronic device 101 to measure an RTT. When the BLE response signal is received from the electronic device 101, the external electronic device 102 may request the electronic device 101 to measure an RTT in order to sense an area where the electronic device 101 is located. In the case in which the external electronic device 102 (e.g., a vehicle) measures the distance between the vehicle and the electronic device 101 (e.g., a portable terminal) using an RTT, when it is determined that a BLE advertising (broadcast) signal received from the electronic device 101 (e.g., a portable terminal) is from the previously connected electronic device 101 (e.g., a portable terminal), the external electronic device 102 (e.g., a vehicle) may request measurement of an RTT.

According to various embodiments, the electronic device 101 and the external electronic device 102 may enter an RTT measurement mode in operation 872. The electronic device 101 and the external electronic device 102 may enter an RTT measurement mode such that they enter the RTT mode at an agreed time and transmit a signal (e.g., a round trip signal).

According to various embodiments, the external electronic device 102 may transmit a signal to the electronic device 101 in operation 844. The external electronic device 102 may enter the RTT measurement mode and transmit a signal (e.g., a round trip signal) in order to sense an area where the electronic device 101 is located. According to an embodiment, the electronic device 101 (e.g., a portable terminal) and the external electronic device 102 (e.g., a vehicle) may enter the RTT measurement mode at an agreed time, and may transmit an RTT signal.

According to various embodiments, the electronic device 101 may transmit a response to the external electronic device 102 in response to the received signal in operation 846. According to an embodiment, the electronic device 101 (e.g., a portable terminal) may transmit a signal to the external electronic device 102 (e.g., a vehicle) in response to an RTT signal received from the external electronic device 102 (e.g., a vehicle). The external electronic device 102 may receive a response to the transmitted signal.

According to various embodiments, the external electronic device 102 may determine (e.g., sense or identify) the area where the electronic device 101 is located, based on the transmitted signal and the response in operation 848.

According to various embodiments, descriptions of operation 850 will be omitted since it has been described with reference to operation 864 of FIG. 8B and operation 868 of FIG. 8C.

Although FIG. 8D illustrates that the external electronic device 102 senses an area where the electronic device 101 is located, and operates in a mode based on the corresponding area, this is merely an example. The electronic device 101 may determine an area where the external electronic device 102 is located via at least one operation performed by the external electronic device 102, and may operate in a mode based on the area where the external electronic device 102 is located.

Figure 8E:
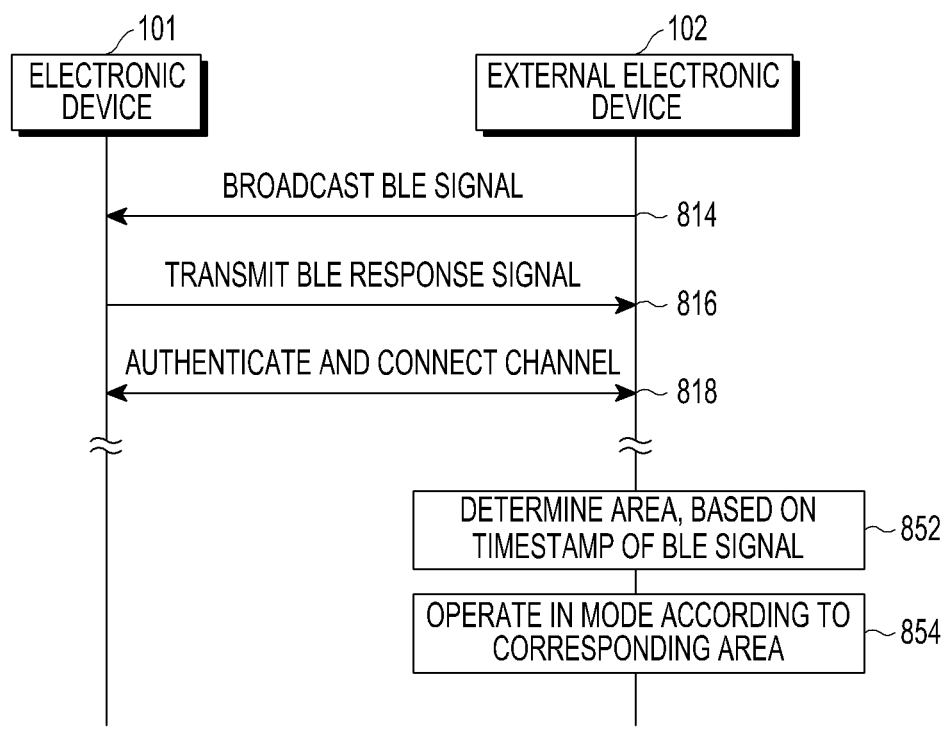
FIG. 8E is a flowchart illustrating a process of determining an area where an electronic device is located, using a timestamp of a short-range communication signal, by an external electronic device according to an embodiment.

FIG. 8E is a flowchart illustrating a process of determining an area where an electronic device is located, using a timestamp of a BLE signal, by an external electronic device according to an embodiment.

Referring to FIG. 7, for example, in the state in which the electronic device 101 is located in a second area (e.g., the second area 720 of FIG. 7), the electronic device 101 may move to a first area (e.g., the first area 710 of FIG. 7) in the second area.

Descriptions of operations 814 to 818 will not be repeated here, since operations 814 to 818 have been described with reference to FIGS. 8A and 8B.

According to various embodiments, the external electronic device 102 may determine an area where the electronic device 101 is located, based on a timestamp of a BLE response signal received from the electronic device 101, in operation 852. For example, the external electronic device 102 compares timestamp values of BLE response signals transmitted from the electronic device 101 at regular intervals, and may determine whether the electronic device 101 currently exists at a short distance or at a long distance. According to an embodiment, in the state in which the electronic device 101 and the external electronic device 102 are not synchronized, when a response signal, such as a scan request, with respect to advertising is received, the electronic device 101 may enter a predetermined mode for generating a timestamp. The external electronic device 102 may use timestamp information included in a BLE response signal. Accordingly, by receiving only a BLE response signal transmitted from the electronic device 101, the external electronic device 102 may have the same effect as the case of determining the distance using an RTT.

According to various embodiments, descriptions of operation 854 will be omitted since it has been described with reference to operation 864 of FIG. 8B and operation 868 of FIG. 8C.

Although FIG. 8E illustrates that the external electronic device 102 determines an area where the electronic device 101 is located, this is merely an example. The electronic device 101 may determine an area where the external electronic device 102 is located via at least one operation performed by the external electronic device 102, and may operate in a mode based on the area where the external electronic device 102 is located.

Figure 9:
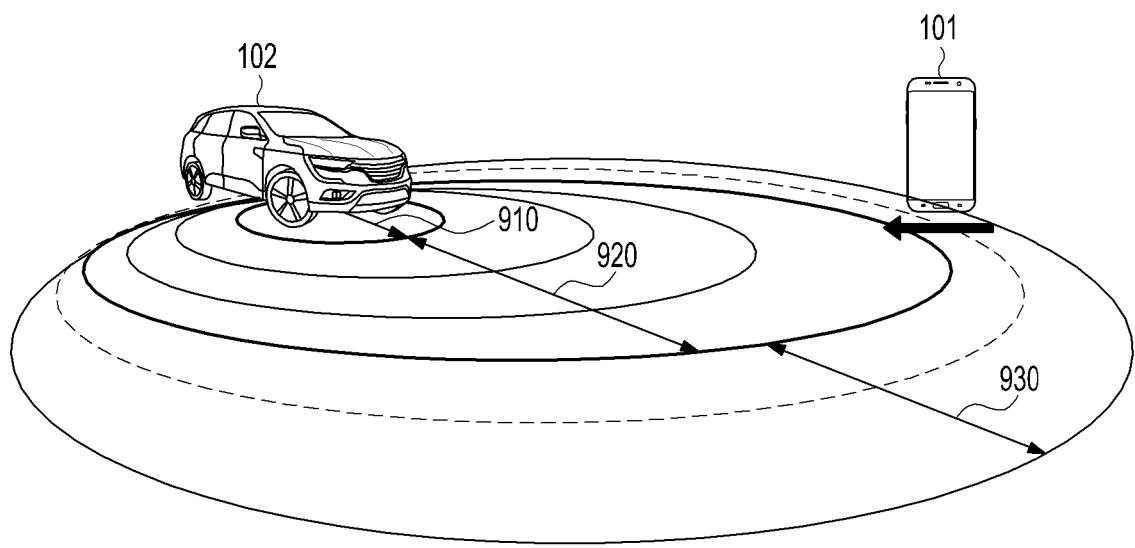
FIG. 9 is a diagram illustrating an example in which an electronic device located in a third area moves to a first area inside a second area via the second area inside the third area according to an embodiment.

FIG. 9 is a diagram illustrating an example in which an electronic device located in a third area moves to a first area in a second area via the second area in a third area according to an embodiment.

The third area 930 is an area at which the distance between the electronic device 101 and the external electronic device 102 is greater than or equal to a second threshold value, and is within the maximum distance at which the external electronic device 102 can sense the electronic device 101. In the third area 930, the external electronic device 102 may sense the electronic device 101 for the first time, or the electronic device 101 may sense the external electronic device 102 for the first time. The external electronic device 102 may operate in a third mode when the electronic device 101 is sensed from the third area 930. According to an embodiment, the third area 930 may be an area in which a BLE Long Range signal can be sensed. For example, when a BLE Long Range signal is sensed or when the strength of the sensed BLE Long Range signal is greater than or equal to a threshold value, it is determined that the electronic device is located in the third area. For example, when a BLE Long Range signal is sensed or when the strength of the sensed BLE Long Range signal is greater than or equal to a threshold value, the electronic device may activate a function associated with a BLE signal. The second area 920 may be an area at which the distance between the electronic device 101 and the external electronic device 102 is greater than or equal to a first threshold value and within the second threshold value. The second area 920 is an area in which the external electronic device 102 operates in a second mode when the external electronic device 102 senses the electronic device 101. According to an embodiment, when the electronic device 101 moves from the second area 920 to the third area 930, the external electronic device 102 may sense that the electronic device 101 becomes distant. When it is sensed that the electronic device 101 becomes distant, the external electronic device 102 may change the operation mode of the external electronic device 102 again from the second mode to the third mode. According to an embodiment, the second area 920 may be an area in which a BLE signal can be sensed. For example, when a BLE is sensed or when the strength of the sensed BLE signal is greater than or equal to a threshold value, it is determined that the electronic device is located in the second area. For example, when a BLE Long Range signal is sensed or when the strength of the sensed BLE Long Range signal is greater than or equal to a threshold value, the electronic device may deactivate a function associated with the BLE Long Range signal, or may activate a function associated with a wireless charging signal.

The first area 910 may be an area at which the distance to the external electronic device 102 is within the first threshold value. The first area 910 is an area in which the external electronic device 102 operates in a first mode when the external electronic device 102 senses the electronic device 101. According to an embodiment, the first area 910 may be an area in which a wireless charging signal can be sensed. For example, when a wireless charging signal is sensed or when the strength of the sensed wireless charging signal or wireless charging efficiency is greater than or equal to a threshold value, it is determined that the electronic device is located in the first area. For example, when a wireless charging signal is sensed or when the strength of the sensed wireless charging signal or wireless charging efficiency is greater than or equal to a threshold value, the electronic device may deactivate a function associated with a BLE signal.

According to an embodiment, the electronic device 101 may be located in the first area 910, the second area 920, or the third area 930, according to the distance to the external electronic device 102. The electronic device 101 may move from the third area 930 to the second area 920, or may move from the second area 920 to the first area 910. Alternatively, the electronic device 101 may move from the first area 910 to the second area 920, or may move from the second area 920 to the third area 930. The electronic device 101 may perform different operations, according to an area based on the distance to the external electronic device 102.

Referring to FIG. 9, although the electronic device 101 is currently located in the third area 930, the electronic device 101 may move in a direction close to the external electronic device 102 via the second area 920, and may move to the first area 910. According to an embodiment, when the electronic device 101 is located in the third area 930, the electronic device 10 may receive (or detect) a BLE Long Range signal broadcasted from the external electronic device 102. The electronic device 101 or the external electronic device 102 may determine that the electronic device 101 approaches at a long distance to the external electronic device 102, via a transmitted and received BLE Long Range signal. According to an embodiment, the electronic device 101 may determine that the external electronic device 102 enters the third area 930, based on the strength of the transmitted BLE Long Range signal. According to an embodiment, when the strength of the BLE Long Range signal is less than a previously designated threshold, it is determined that the electronic device 101 is located in the third area 930, and when the strength of the BLE Long Range signal is greater than a previously designated threshold value or when a BLE signal is received, it is determined that the electronic device 101 is located in (or enters) the second area 920. According to an embodiment, when the external electronic device 102 determines that the electronic device 101 is located at a long distance, at least one of the electronic device 101 and the external electronic device 102 may operate in the third mode. The third mode may include a function by which the electronic device 101 transmits a control signal for outputting at least one alarm (turning on/off the headlight of the vehicle) to the external electronic device 102, and a function by which the external electronic device 102 controls the headlight of the vehicle to be turned on/off. According to an embodiment, when the electronic device 101 operates in the third mode, the electronic device 101 executes a smart key application for quick execution or displays various information related to the vehicle in the form of a pop-up on a display (e.g., the display 160). Some functions of the smart key application may be restricted. According to an embodiment, when the electronic device 101 operates in the third mode, the electronic device 101 may automatically execute an application or a function that may control the vehicle, may display a short-cut to switch to the corresponding function in the form of a pop-up on a screen, or may provide a notification to a user in the form of an announcement. According to an embodiment, when the electronic device 101 operates in the third mode, the electronic device 101 may configure an AoD screen, and may perform a smart key operation, even though a user does not separately activate the screen of the electronic device 101. According to an embodiment, when the electronic device 101 operates in the third mode, the electronic device 101 may display information associated with a smart key in another electronic device (e.g., GEAR) that is connected to the electronic device 101.

According to various embodiments, in the state in which the electronic device 101 is located in the second area 920 (e.g., a BLE coverage), the electronic device 101 or the external electronic device 102 may determine proximity, based on the strength of a transmitted and received short-range communication signal, adjustment of transmission power of the short-range communication signal, the RTT of the signal, signaling after connection to the external electronic device, or a combination of at least a part thereof. According to an embodiment, when the strength of a BLE Long Range signal that the external electronic device 102 transmits is greater than a previously designated threshold value, or a BLE signal is received, the electronic device 101 may determine that the electronic device 101 is located in the second area 920. When the electronic device 101 is located in the second area 920, at least one of the electronic device 101 and the external electronic device 102 may start a wireless charging operation. When the electronic device 101 is located in the second area 920 (or when the distance to the external electronic device 102 is within the second threshold value, and greater than or equal to the first threshold value), at least one of the external electronic device 102 and the electronic device 101 may operate in the second mode. The second mode may include a function by which the electronic device 101 transmits a control signal for controlling operation (e.g., controlling the door or engine of the vehicle) to the external electronic device 102, and a function by which the external electronic device 102 controls the door or engine of the vehicle. The second mode may include a function by which the electronic device 101 displays a vehicle start-up menu, and a function by which the external electronic device 102 performs at least one of unlocking the door of the vehicle and adjusting a car seat. According to an embodiment, when the electronic device 101 moves from the second area 920 to the first area 910 (e.g., when the electronic device 101 enters an area where the electronic device 101 can wirelessly receive power from the external electronic device 102), the external electronic device 102 operates in the first mode, activates a wireless charging function, charges the designated electronic device 101, and performs a designated operation according to charging efficiency.

According to various embodiments, in the state in which the electronic device 101 is located in the first area 910, the electronic device 101 or the external electronic device 102 may determine proximity of the electronic device 101 using charging efficiency based on a transmitted and received wireless charging signal, adjustment of power of the wireless charging circuit (e.g., the wireless charging circuit 410 of FIG. 4A), or a combination of at least a part thereof. The external electronic device 102 may monitor wireless charging efficiency provided by the electronic device 101, and may estimate proximity to the electronic device 101. When it is identified that power greater than or equal to a predetermined level is used for charging, the external electronic device 102 may determine whether the electronic device 101 exists at a short distance or exists inside the vehicle. When the electronic device 101 is located in the first area 910 (or when the distance to the external electronic device 102 is within the first threshold value), at least one of the external electronic device 102 and the electronic device 101 may operate in the first mode. According to an embodiment, the first mode may include a function by which the external electronic device 102 wirelessly transmits power to the electronic device 101, and a function by which the electronic device 101 wirelessly receives power from the external electronic device 102. According to an embodiment, the first mode may include a function by which the electronic device 101 connects multimedia to the vehicle, such as navigation, Bluetooth, a mirroring link, or performs a vehicle mode, and a function by which the external electronic device 102 controls the engine of the vehicle to be in a standby state. The external electronic device 102 may calculate the efficiency of wirelessly transmitted power in real time or at designated time intervals. Alternatively, the external electronic device 102 may transmit a control signal to the electronic device 101, to enable the electronic device 101 to execute an application capable of controlling the external electronic device 102, or to display or execute various information related to the vehicle in the form of a pop-up on a display. As described above, at least one of the electronic device 101 and the external electronic device 102 may provide various services or functions to a user, based on the determined distance.

Figure 10:
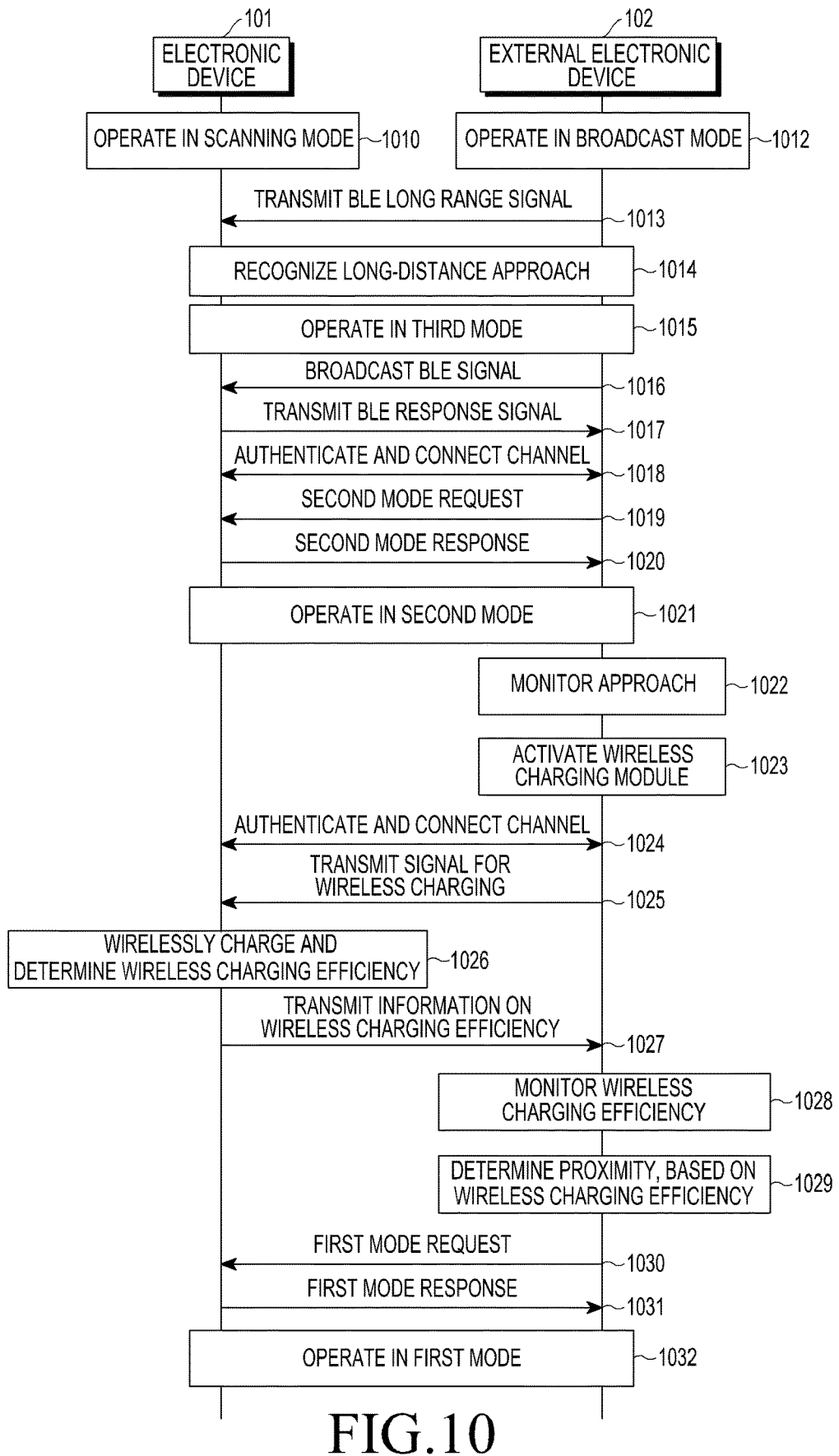
FIG. 10 is a flowchart illustrating a process of determining proximity to an external electronic device, based on a short-range communication signal and efficiency of wireless charging, and a controlling operation by an electronic device according to another embodiment.

FIG. 10 is a flowchart illustrating a process of determining proximity to the external electronic device 102 (e.g., the external electronic device 102 of FIG. 9), based on a short-range communication signal and wireless charging efficiency, and a controlling operation, by the electronic device 101 (e.g., the electronic device 101 of FIG. 9) according to another embodiment.

According to various embodiments, the electronic device 101 (e.g., the electronic device 101 of FIG. 9) may operate in a scanning mode in operation 1010. According to an embodiment, when the electronic device 101 (e.g., the electronic device 101 of FIG. 9) is located in a third area (e.g., the third area 930 of FIG. 9) or outside the third area, the electronic device 101 (e.g., the electronic device 101 of FIG. 9) may operate in a scanning mode for receiving a short-range communication signal (e.g., a BLE signal) in operation 1010.

According to various embodiments, the electronic device 101 (e.g., the electronic device 101 of FIG. 9) may operate in a broadcast mode in operation 1012. According to an embodiment, when the electronic device 101 (e.g., the electronic device 101 of FIG. 9) is located in the third area (e.g., the third area 930 of FIG. 9) or outside the third area, the external electronic device 102 (e.g., the external electronic device 102 of FIG. 9) may operate in a broadcast mode for transmitting a short-range communication signal (e.g., a BLE signal).

According to various embodiments, the external electronic device 102 (e.g., the external electronic device 102 of FIG. 9) may transmit a BLE Long Range signal to the electronic device 101 (e.g., the electronic device 101 of FIG. 9) in operation 1013. According to an embodiment, the external electronic device 102 (e.g., the external electronic device 102 of FIG. 9) may periodically (or aperiodically) broadcast a BLE Long Range signal in order to sense whether the electronic device 101 (e.g., the electronic device 101 of FIG. 9) exists at a long distance. According to an embodiment, the external electronic device 102 (e.g., the external electronic device 102 of FIG. 9) may control transmission power of a BLE Long Range signal or may control changing of a profile of a BLE Long Range signal, in order to sense whether the electronic device 101 (e.g., the electronic device 101 of FIG. 9) approaches at a long distance. According to various embodiments, at least one of the electronic device 101 (e.g., the electronic device 101 of FIG. 9) and the external electronic device 102 (e.g., the external electronic device 102 of FIG. 9) may recognize long-distance approach in operation 1014. According to an embodiment, the electronic device 101 (e.g., the electronic device 101 of FIG. 9) receives a BLE Long Range signal transmitted from the external electronic device 102 (e.g., the external electronic device 102 of FIG. 9), thereby determining that the external electronic device 102 (e.g., the external electronic device 102 of FIG. 9) has approached a long-distance area (e.g., has entered the third area 930) of the electronic device 101 (e.g., the electronic device 101 of FIG. 9). According to an embodiment, the BLE Long Range may support a coverage area that is larger than a coverage area where a BLE signal of FIG. 7 is transmitted. According to an embodiment, when long-distance approach is sensed, at least one of the electronic device 101 (e.g., the electronic device 101 of FIG. 9) and the external electronic device 102 (e.g., the external electronic device 102 of FIG. 9) may execute at least one operation corresponding to a long-distance. According to an embodiment, the method of determining a distance using a BLE signal of FIG. 7 or the method of determining a distance using a BLE Long Range signal of FIG. 9 may be selectively determined and/or executed by at least one of the electronic device 101 (e.g., the electronic device 101 of FIG. 9) and the external electronic device 102 (e.g., the external electronic device 102 of FIG. 9). When long-distance approach to the electronic device 101 (e.g., the electronic device 101 of FIG. 9) is sensed, the external electronic device 102 (e.g., the external electronic device 102 of FIG. 9) may operate in a third mode in operation 1015. According to an embodiment, in the case in which the external electronic device 102 (e.g., the external electronic device 102 of FIG. 9) is a vehicle, when it is determined that the electronic device 101 (e.g., the electronic device 101 of FIG. 9) approaches at a long distance, the external electronic device 102 may operate in the third mode, and may control the headlight of the vehicle to be turned on/off. Alternatively, the external electronic device 102 (e.g., the external electronic device 102 of FIG. 9) transmits a control signal to the electronic device 101 (e.g., the electronic device 101 of FIG. 9), such that the electronic device 101 executes an application capable of controlling the external electronic device 102 (e.g., the external electronic device 102 of FIG. 9), or displays or executes various information related to the vehicle in the form of a pop-up on a display (e.g., the display 160).

According to various embodiments, operations 1016 to 1032 may be replaced with descriptions of operations 814 to 842 of FIG. 8A, and thus, a detailed description thereof will not be repeated here.

Figure 11:
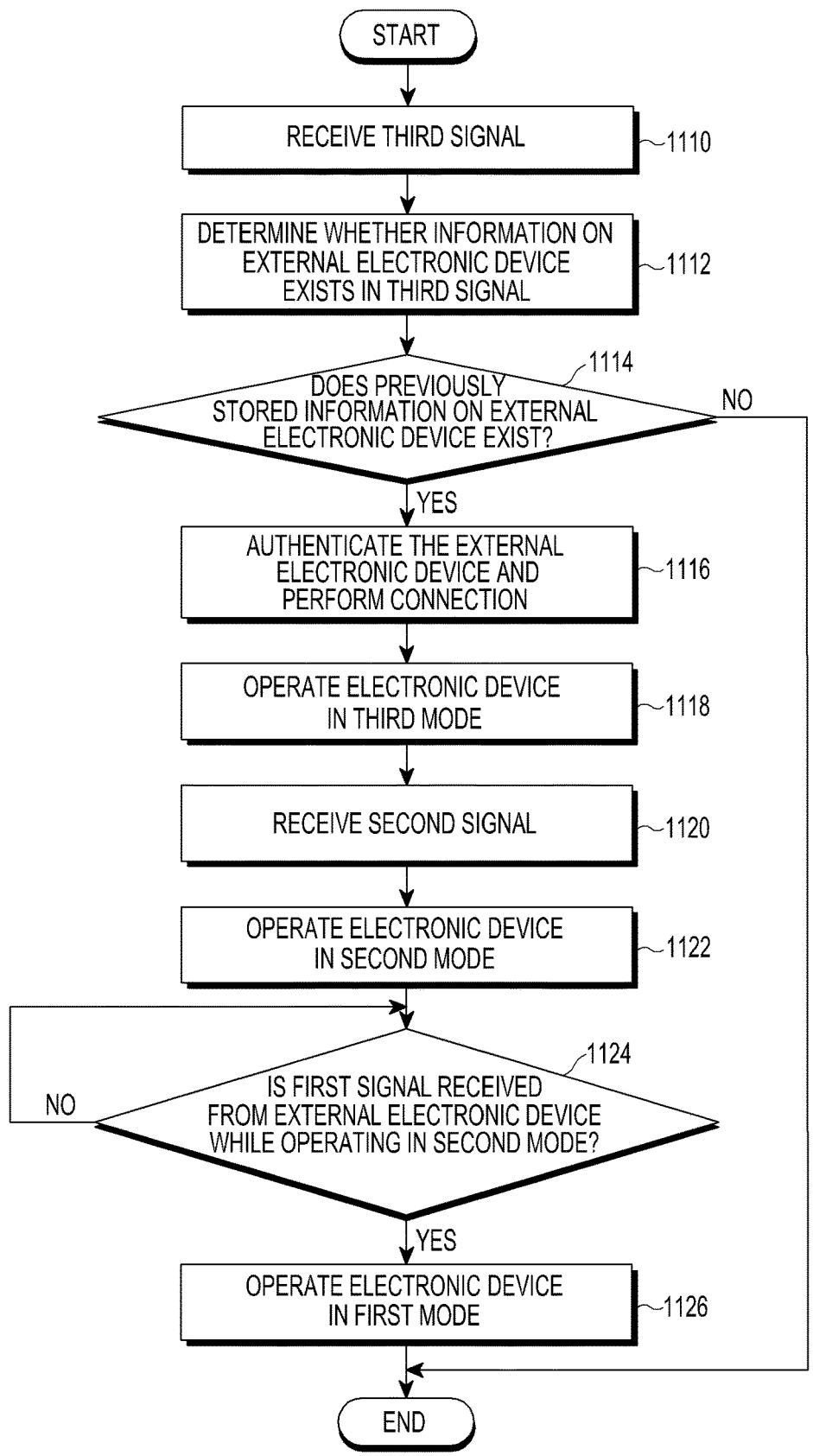
FIG. 11 is a flowchart illustrating an operation of controlling the operation mode of an electronic device according to an embodiment.

FIG. 11 is a flowchart illustrating a process of controlling the operation mode of an electronic device according to an embodiment.

Hereinafter, referring to FIG. 11, a process of controlling the operation mode of an electronic device will be described in greater detail as follows. In the descriptions associated with FIG. 11, it is assumed that the electronic device 101 is a terminal (e.g., a smart phone, a wearable device, or the like) that a user can carry, and the external electronic device 102 is a vehicle.

According to various embodiments, the electronic device 101 (e.g., the processor 120) may receive a third signal from the external electronic device 102 in operation 1110. For example, when the electronic device 101 is located at a long distance from the external electronic device 102, the processor 120 of the electronic device 101 may receive a signal (e.g., a BLE Long Range signal) transmitted from the external electronic device 102 via a communication interface (e.g., the communication interface 170). For example, when the electronic device 101 is located in the third area (e.g., the third area 930 of FIG. 9), the electronic device 101 may receive a BLE Long Range signal from the external electronic device 102.

According to various embodiments, in operation 1112, the electronic device 101 (e.g., the processor 120) may determine whether information associated with the external electronic device 102 exists in the received third signal. For example, when the third signal is received from the external electronic device 102, the electronic device 101 (e.g., the processor 120) may determine whether the information associated with the external electronic device 102 that transmits the third signal exists in the received third signal.

According to various embodiments, the electronic device 101 (e.g., the processor 120) may determine whether information associated with the external electronic device 102 that transmits the third signal is stored in advance in a memory (e.g., the memory 130) of the electronic device 101 in operation 1112. For example, the processor 120 of the electronic device 101 may analyze the third signal received from the external electronic device 102, and may determine whether information (e.g., an identifier) associated with the external electronic device 102 is included in the signal.

According to various embodiments, the electronic device 101 (e.g., the processor 120) may determine whether information associated with the external electronic device 102 that transmits the third signal is the same as previously stored information associated with the external electronic device in operation 1114. The electronic device 101 may determine whether the identifier of the external electronic device 102 that transmits the third signal is the same as a previously stored identifier. For example, the electronic device 101 may determine whether the media access control (MAC) address of the external electronic device 102, which is included in the first signal, is included in MAC addresses of a plurality of electronic devices which are stored in the memory 130.

According to various embodiments, the electronic device 101 (e.g., the processor 120) performs authentication and connection with the external electronic device in operation 1116 when the previously stored information on the external device exists in operation 1114 (e.g., 1114-Y). For example, when the MAC address of the external electronic device 102 is included in the MAC addresses of the plurality of external electronic devices, the electronic device 101 may authenticate the external electronic device 102, and may maintain connection with the external electronic device. According to an embodiment, when authentication is performed between the electronic device 101 and the external electronic device 102, key-related information may be displayed on the display 160.

According to various embodiments, the electronic device 101 (e.g., the processor 120) may operate in a third mode in operation 1118. According to an embodiment, when authentication and connection with the external electronic device 102 is performed, the electronic device 101 (e.g., the processor 120) may operate in the third mode. According to an embodiment, the third mode may include a function of outputting the distance or direction to the external electronic device 102 to a user. For example, it is assumed that the electronic device 101 is a smart phone that a user carries and the external electronic device 102 is a vehicle. In this instance, in the third mode, when a BLE Long Range signal is received from the vehicle, the smart phone may display information associated with the distance to the vehicle, the location of the vehicle, or the direction of the vehicle, and the vehicle may control the headlight of the vehicle to be turned on/off. According to an embodiment, when it is determined that the electronic device 101 is located at a long distance from the vehicle, the vehicle may disregard a start-up request obtained by a start-up button, and may not perform the corresponding operation. According to an embodiment, when the electronic device 101 has a key for two vehicles, the electronic device 101 may display, to a user, a pop-up associated with an application capable of controlling a vehicle that the electronic device currently approaches. In the state in which two vehicles are parked side by side, when the electronic device 101 approaches the corresponding parking site, the electronic device 101 shows an application for controlling the two vehicles via a pop-up, and may enable a user to select a vehicle to control. According to another embodiments, the electronic device 101 may determine distances between the electronic device 101 and the two vehicles, and may display a function of controlling a vehicle that is closer to the electronic device, on the display 160 of the electronic device 101. According to an embodiment, the vehicle smart key of the electronic device 101 may operate for only one vehicle, and may not operate for the two vehicles at the same time. According to an embodiment, the electronic device 101 may select a vehicle that registers the electronic device 101, via an user interface operation such as Samsung Pay, whereby a control command for a vehicle selected by a user may be performed.

According to various embodiments, the electronic device 101 (e.g., the processor 120) may receive a second signal from the external electronic device 102 in operation 1120. For example, when the electronic device 101 moves from a third area (e.g., the third area 930 of FIG. 9) to a second area (e.g., the second area 920 of FIG. 9), the electronic device 101 may receive a second signal from the external electronic device 102.

According to various embodiments, the electronic device 101 (e.g., the processor 120) may operate in a second mode in operation 1122. The electronic device 101 may determine the operation mode of the electronic device 101 as the second mode, while connection to the external electronic device 102 is maintained. The electronic device 101 may determine the operation mode of the electronic device 101 as the second mode, when the second signal is received from the external electronic device 102. For example, the second mode may perform at least one of transmitting a control signal for controlling the external electronic device 102 according to the distance to the external electronic device 102. For example, when it is assumed that the external electronic device 102 is a vehicle, the second mode may include a function of controlling the door or the engine of the vehicle to be turned on/off. For example, when it is determined that the vehicle is located at a short distance from the electronic device 101, the vehicle may perform activating a flickering operation of the headlight, unlocking the door via the handle of the vehicle, activating a start-up button in the vehicle, or the like. The electronic device 101 may determine the distance (or proximity) to the external electronic device 102, based on the strength of the second signal. The electronic device 101 may provide various services or functions to a user, based on the determined distance (or proximity). Alternatively, the electronic device 101 may receive a control signal from the external electronic device 102, such that the electronic device 101 may execute an application capable of controlling the external electronic device 102, or may display various information related to the vehicle in a pop-up. While the electronic device 101 operates in the second mode, the electronic device 101 may activate a wireless charging circuit (e.g., the wireless charging circuit 410 of FIG. 4A). The electronic device 101 may activate the wireless charging circuit (e.g., the wireless charging circuit 410 of FIG. 4A), and may enter a preparation stage for wirelessly receiving power from the external electronic device 102.

According to various embodiments, while the electronic device 101 operates in the second mode, the electronic device 101 (e.g., the processor 120) may determine whether a first signal is received from the external electronic device 102 in operation 1124. The first signal is a signal used when the external electronic device 102 detects an object (e.g., a wireless power receiving device) for wirelessly providing power. The electronic device 101 may receive a signal for detecting a target for wireless charging from the external electronic device 102, and may transmit a response signal to the external electronic device 102 in response to the received signal for detecting the target for wireless charging. When the electronic device 101 is located in the first area (e.g., the first area 910 of FIG. 9), the electronic device 101 may receive, from the external electronic device 102, a signal for detecting whether wireless power reception from the external electronic device 102 is allowed.

When the result of operation 1124 shows that the first signal is not received, at least one of the electronic device 101 and the external electronic device 102 may keep in the second mode.

When the result of operation 1124 shows that the first signal is received, according to various embodiments, the electronic device 101 (e.g., the processor 120) may operate in the first mode in operation 1126. When the electronic device 101 enters the first area (the first area 910 of FIG. 9), at least one of the electronic device 101 and the external electronic device 102 may operate in the first mode. The first mode may include at least one function from among navigation, Bluetooth, power transmission and reception, mirror link connection to the external electronic device 102, and starting a mode for controlling a vehicle, and may include a function of controlling the door or the engine of the vehicle to be turned on/off.

According to various embodiments, when the electronic device 101 is located in the first area (e.g., the first area 910 of FIG. 9), the external electronic device 102 may wirelessly transmit power to the electronic device 101, and the electronic device 101 may wirelessly receive power from the external electronic device 102. According to an embodiment, when a long beacon is received from the external electronic device 102, the electronic device 101 may perform BLE communication with the external electronic device 102. The external electronic device 102 may activate a wireless charging module for wireless charging, and may start advertising in order to connect a channel to the electronic device 101. When the electronic device 101 recognizes advertising from the external electronic device 102 and receives a connection request, the electronic device 101 may register (or authenticate) the external electronic device 102 to start wireless charging. According to an embodiment, the external electronic device 102 determines whether the electronic device 101 approaches, to activate a wireless charging module, and may output a short beacon and a long beacon. When the external electronic device 102 receives BLE advertizing from the electronic device 101, the external electronic device 102 may connect a channel to the electronic device 101, and may perform a registration (or authentication) process for wireless charging. Via the above process, the external electronic device 102 may wirelessly transmit power to the electronic device 101, whereby the electronic device 101 may wirelessly receive power from the external electronic device 102.

According to various embodiments, at least one of the electronic device 101 and the external electronic device 102 may calculate efficiency of wirelessly received power in real time or at designated time intervals. At least one of the electronic device 101 and the external electronic device 102 may periodically monitor the efficiency of wireless power, and may determine whether the electronic device 101 is close to the external electronic device 102. According to an embodiment, when the external electronic device 102 is a vehicle, the electronic device 101 may transmit a control signal to the vehicle, and may wirelessly receive power from the vehicle. A wireless charging circuit (e.g., the wireless charging circuit 410 of FIG. 4A) included in the electronic device 101 and the external electronic device 102 may support a resonance coupling scheme. In the case of the resonance coupling scheme of the wireless charging scheme, a transmitting device (e.g., a vehicle) may generate electromagnetic waves having a selected resonant frequency using a power transmission circuit, and a receiving device (e.g., a portable terminal) may receive the generated electromagnetic waves using a power reception circuit. The external electronic device 102 may include at least some of the elements for wireless charging (e.g., a power transmission circuit, a sensing circuit, a control circuit, a user interface, or a communication circuit). The electronic device 101 may include at least some of the elements for wireless charging (e.g., a power reception circuit, a sensing circuit, a control circuit, a user interface, or a communication circuit). The external electronic device 102 may identify an object by sensing that at least one of the frequency, current, and voltage of a power transmission circuit is changed. According to an embodiment, the external electronic device 102 may distinguish the electronic device 101 and objects (e.g., a key, a coin, or the like) incapable of receiving wireless power from among objects existing in a sensing area. The external electronic device 102 may request identification information of the electronic device 101 and/or setting information associated with wireless charging. According to an embodiment, the identification information may include version information, a production code, or a basic device identifier. According to an embodiment, the setting information may include a wireless charging frequency, the maximum chargeable power level, the amount of power required for charging, the amount of average power transmitted, or the like.

According to various embodiments, in the first mode, a vehicle may differently control the vehicle based on authentication information of the electronic device 101. For example, when it is determined that the electronic device 101 is located in the vehicle, the vehicle may display information related to the vehicle (e.g., the welcome logo of the vehicle), may allow the vehicle to get started, and may maximally allow a change in speed without limiting the speed of the vehicle to the maximum speed. As another example, the vehicle acknowledges that a second electronic device is on board, and allows start-up using the same or drives the vehicle by limiting the speed of the vehicle to the maximum speed (e.g., 100 km/h). When the electronic device 101 enters the first area (e.g., the first area 910 of FIG. 9), the first mode may be changed. For example, at least one of a function by which the electronic device 101 disconnects multimedia from the external electronic device 102 and a function by which the electronic device 101 terminates a mode for controlling the vehicle may be included, and a function by which the external electronic device 102 controls the door or the engine of the vehicle to be turned on/off may be included. According to an embodiment, in the state in which the amount of charge remaining in the battery is insufficient, or when the electronic device 101 is turned off, the electronic device 101 may operate as a smart key. According to an embodiment, although a user recognizes that the electronic device 101 is turned off, the electronic device 101 may store the minimum amount of power for operating at least one module (e.g., a wireless charging module) required for wirelessly receiving power from a vehicle, and may operate the wireless charging module, based on the store power, to wirelessly receive power. For example, when the power state of the battery is a designated level (e.g., about 2.8 v to 3.3 v), the electronic device 101 automatically turns off the main power, and independently supplies a key block with power of the battery in the low-power state, thereby continuously providing a smart key function. According to an embodiment, when the battery of the vehicle is discharged, the electronic device 101 may supply the vehicle with power required for starting up the vehicle. For example, the electronic device 101 may charge an auxiliary battery of the vehicle, which is required for start-up. When the main power is discharged, the vehicle may control start-up of the vehicle using the auxiliary battery required for start-up. According to an embodiment, the vehicle may provide information associated with the state of the battery of the electronic device 101. For example, the vehicle may provide guidance associated with the location (e.g., the window of the driver's seat) at which high wireless charging efficiency can be obtained, or may display the available battery time related to a smart key operation of the electronic device 101 or the estimated charging time.

Figure 12:
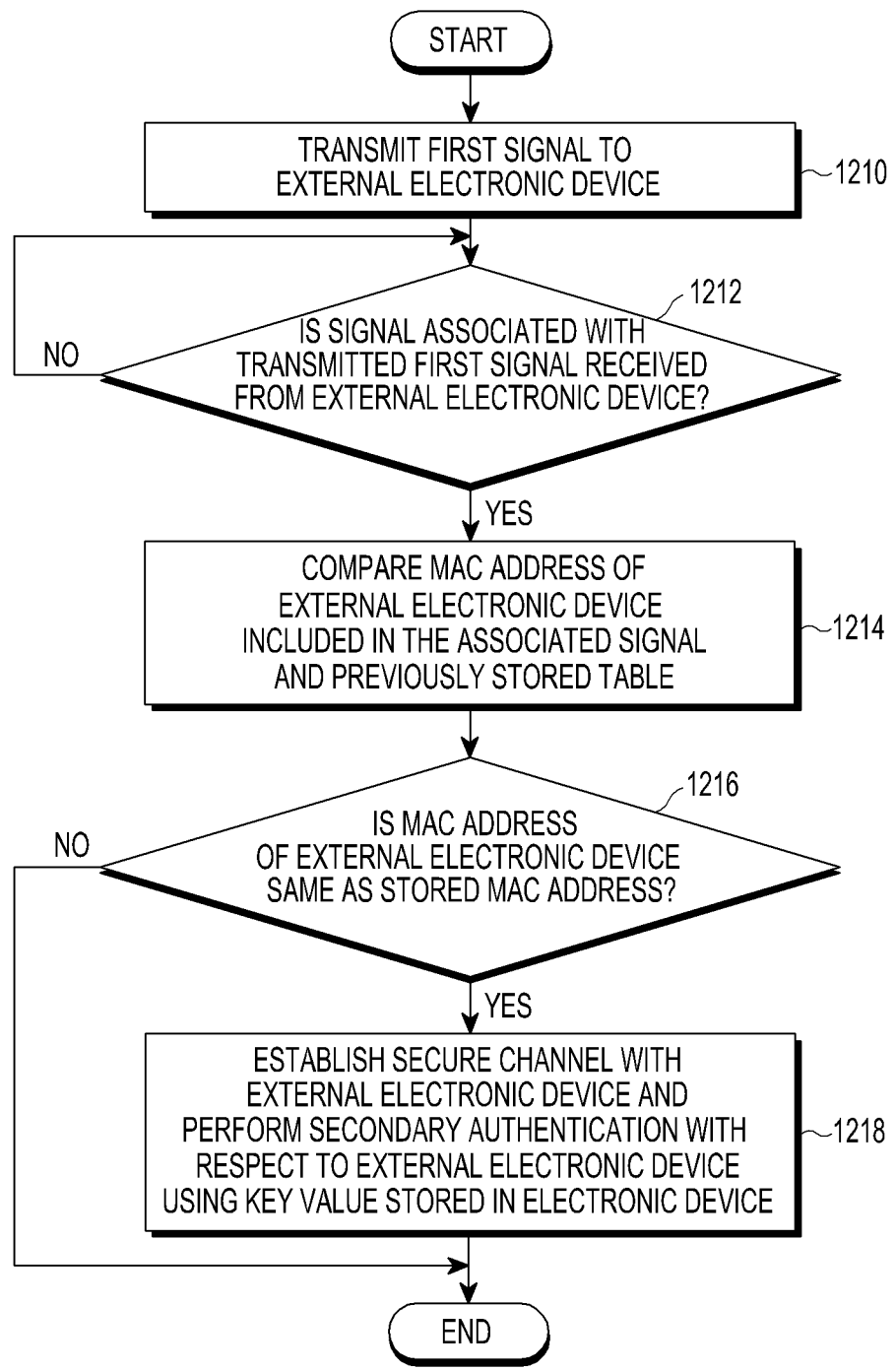
FIG. 12 is a flowchart illustrating a process of authenticating an external electronic device by an electronic device according to an embodiment.

FIG. 12 is a flowchart illustrating an operation of authenticating an external electronic device by an electronic device according to an embodiment.

Hereinafter, referring to FIG. 12, an operation of authenticating an external electronic device by the electronic device according to an embodiment will be described in greater detail as follows. The electronic device according to an embodiment may have the same structure as the entirety or at least a part of the external electronic device 102 of FIG. 4A, and the external electronic device may have the same structure as the entirety or at least a part of the electronic device 101 of FIG. 4A. For example, referring to FIG. 12, it is assumed that the electronic device 101 is a vehicle, and the external electronic device 102 is a terminal that a user can carry (e.g., a smart phone, a wearable device, or the like).

According to various embodiments, the electronic device 101 may transmit a first signal to the external electronic device 102 in order to determine whether at least one external electronic device approaches, in operation 1210. For example, the first signal may be a short-range communication signal (e.g. a BLE signal). The electronic device 101 may control a communication interface (e.g., the communication circuit 435 of FIG. 4A), to transmit the first signal to the external electronic device 102. According to an embodiment, the electronic device 101 may periodically or aperiodically transmit a short-range communication signal in order to sense at least one external electronic device.

According to various embodiments, the electronic device 101 may determine whether a response signal is received from the external electronic device 102 in response to the transmitted first signal in operation 1212. According to an embodiment, the electronic device 101 may determine whether the response signal that responds to the signal transmitted to the external electronic device 102 is received from the external electronic device 102.

According to various embodiments, the electronic device 101 may compare the MAC address of the external electronic device 102 included in the response signal and a table that is stored in advance in a memory (e.g., the memory 130) in operation 1214 (where the signal associated with the transmitted first signal is received from the external electronic device in operation 1212, e.g., 1212-Y). For example, the electronic device 101 may compare the MAC address of the external electronic device 102 that transmits the response signal and MAC addresses of a plurality of external electronic devices that are stored in advance in the memory, to authenticate the external electronic device 102. The electronic device 101 may determine whether to approve control by the external electronic device 102, based on the authentication.

According to various embodiments, in operation 1216, the electronic device 101 (e.g., the control circuit 439 of FIG. 4A) may determine whether the MAC address of the external electronic device 102 is the same as the MAC address of an external electronic device that is stored in the table, to perform primary authentication. The electronic device 101 may determine whether the identifier of the external electronic device 102 that transmits the signal is the same as an identifier that is stored in advance in the memory. According to an embodiment, the electronic device 101 may determine whether the media access control (MAC) address of the external electronic device 102, which is included in the signal, is included in MAC addresses of a plurality of electronic devices. The MAC address included in the signal may be the result of a previously defined calculation, and may be used for authenticating the external electronic device using data shared when previous connection.

According to various embodiments, in operation 1218, when the identifier of the external electronic device 102 that transmits the signal is the same as the identifier that is stored in advance in the memory, the electronic device 101 may establish a secure channel with the external electronic device 102 and may perform secondary authentication with respect to the external electronic device 102 using a key value stored in the electronic device 101. According to an embodiment, the electronic device 101 may authenticate the external electronic device 102, based on a secure channel connected to the external electronic device 102, using a previously stored key value. According to an embodiment, the secondary authentication may be performed using a key value stored in a secure storage (e.g., a secure element) in the electronic device 101. The secondary authentication may be an operation of determining whether the external electronic device 102 is a device that is registered in the electronic device 101 as a key when the external electronic device 102 approaches a wireless charging area of the electronic device 101. As described above, authentication with respect to the external electronic device 102 may be performed one more time during a signaling process for wireless charging. When the secondary authentication is completed, the electronic device 101 may enter a short-range search mode, and may activate a wireless charging circuit (e.g., the wireless charging circuit 430 of FIG. 4A). At least a part of the authentication process performed in FIG. 12 may be performed while a BLE Long Range signal is transmitted and received, a BLE signal is transmitted and received, or a wireless power signal is transmitted and received.

According to various embodiments, a method of the present disclosure for communicating with an external electronic device by an electronic device may include: determining an area where the electronic device is located, based on a second signal that is used to communicate with the external electronic device via a wireless communication circuit when the external electronic device is located in a second area, based on a first signal that is used to communicate with the external electronic device via the wireless charging circuit when the external electronic device is located in a first area within the second area, or based on a combination of at least a part thereof; determining an operation mode corresponding to the determined area from among a plurality of operation modes of the electronic device; and controlling operation of the electronic device, based on the determined operation mode.

According to an embodiment, when the external electronic device is located in a third area outside the second area, the present disclosure may further include determining the distance (or proximity) to the external electronic device using a third signal that is used to communicate with the external electronic device via the wireless charging circuit.

According to an embodiment, the present disclosure may further include: transmitting the third signal to the external electronic device, to sense the external electronic device; transmitting the second signal to the external electronic device; receiving a response signal from the external electronic device in response to the transmitted second signal; determining whether information on the external electronic device is the same as information on the external electronic device which is stored in advance in the memory 130, to authenticate the external electronic device; and maintaining connection with the external electronic device.

According to an embodiment, the present disclosure may include: determining the operation mode of the electronic device as a third mode when the external electronic device is sensed from the third area; determining the operation mode of the electronic device as a second mode when the external electronic device is sensed from the second area; and determining the operation mode of the electronic device as a first mode when the external electronic device is sensed from the first area.

According to an embodiment, the present disclosure may further include: wirelessly providing the power to the external electronic device, based on the determined first mode; determining efficiency of the wirelessly provided power; and providing different functions, based on the comparison of the determined efficiency and a designated threshold value.

Figure 13:
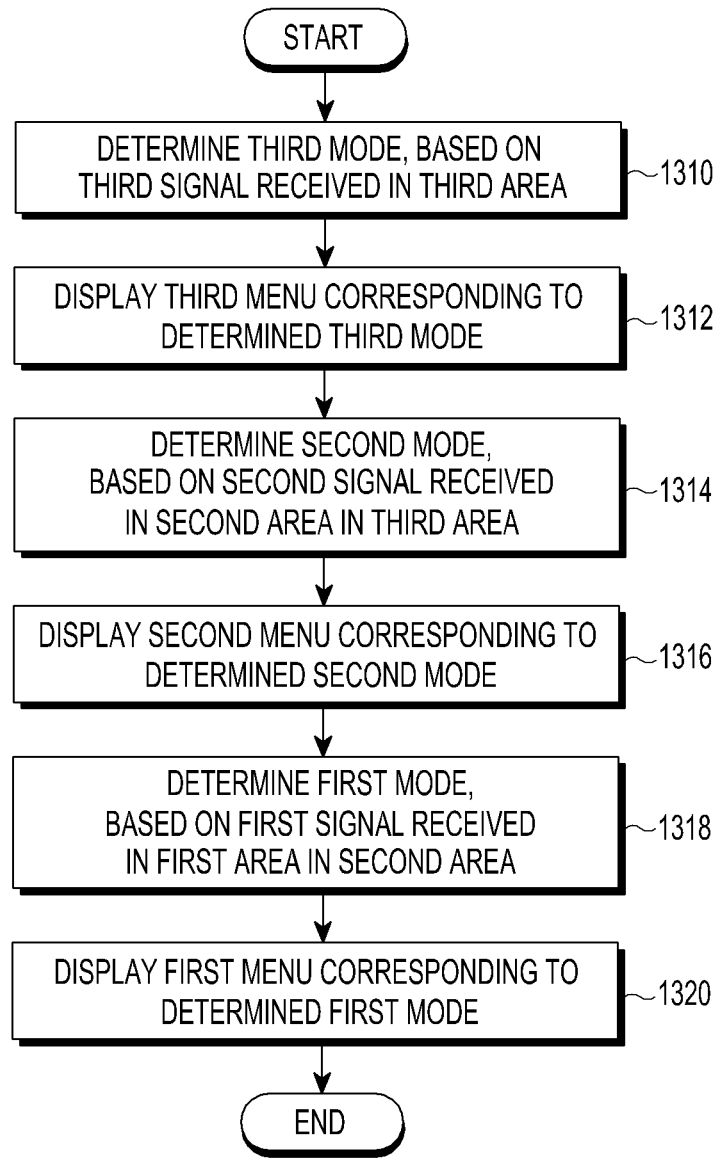
FIG. 13 is a flowchart illustrating an operation of displaying a menu corresponding to each mode by an electronic device according to an embodiment.

FIG. 13 is a flowchart illustrating an operation of displaying a menu corresponding to each mode by an electronic device according to an embodiment.

Hereinafter, referring to FIG. 13, a process of displaying a menu corresponding each mode by an electronic device according to an embodiment will be described in detail as follows.

According to various embodiments, when the electronic device 101 (e.g., the electronic device 101 of FIG. 9) is located in a third area (e.g., the third area 930 of FIG. 9), the electronic device 101 may sense a third signal transmitted from the external electronic device 102 (e.g., the external electronic device 102 of FIG. 9), and may determine to operate the electronic device 101 (the electronic device 101 of FIG. 9) in a third mode in operation 1310. According to an embodiment, when the third signal (e.g., a BLE Long Range signal) transmitted by the external electronic device 102 is sensed in the third area (e.g., the third area 930 of FIG. 9), the electronic device 101 (e.g., the electronic device 101 of FIG. 9) may determine that the electronic device 101 is located at a long distance from the external electronic device (e.g., the external electronic device 102 of FIG. 9). According to an embodiment, when the third signal is received from the external electronic device (e.g., the external electronic device 102 of FIG. 9), the electronic device (e.g., the electronic device 101 of FIG. 9) may control the electronic device (e.g., the electronic device of FIG. 9) to operate in the third mode. For example, as a criterion for determining the electronic device 101 to operate in the third mode, based on the third signal (e.g., a BLE Long Range signal), at least some methods from among a method of using the strength of the third signal, a method of using a linear quadratic estimator, a method of using triangulation, a method of using an RTT, and a method of using a timestamp may be used.

According to various embodiments, the electronic device 101 (e.g., the processor 120 of FIG. 1) may display a third menu corresponding to the determined third mode on a display (e.g., the display 160 of FIG. 1) in operation 1312. The third menu may include a key application capable of quickly executing an application that is capable of controlling an external electronic device (e.g., the external electronic device 102 of FIG. 9). The third menu may include at least some of the functions associated with the third mode that controls the external electronic device (e.g., the external electronic device 102 of FIG. 9). The third menu may include various information, such as external electronic device's headlight on/off control, alarm sound on/off control, or at least some functions of a smart key application for quickly controlling (or executing) the external electronic device (e.g., the external electronic device 102 of FIG. 9).

According to an embodiment, the function corresponding to the third mode may include a function of outputting at least one alarm by the external electronic device (e.g., the external electronic device 102 of FIG. 9). For example, the electronic device (e.g., the electronic device 101 of FIG. 9) may transmit a control signal to the external electronic device (e.g., the external electronic device 102 of FIG. 9) such that the external electronic device (e.g., the external electronic device 102 of FIG. 9) in the third mode outputs at least one alarm (e.g., headlight on/off, alarm sound on/off, or the like). According to another embodiment, in the third mode, the electronic device (e.g., the electronic device 101-a of FIG. 5) executes a smart key application for quickly controlling (or executing) the external electronic device (e.g., the external electronic device 102 of FIG. 9), and some functions of the smart key application may be restricted.

According to various embodiments, in operation 1314, the electronic device (e.g., the electronic device 101 of FIG. 9) may determine the operation mode of the electronic device (e.g., the electronic device 101 of FIG. 9) as a second mode, based on a second signal received in a second area within the third area. According to an embodiment, when the second signal (e.g., a BLE signal) is received from the external electronic device (e.g., the external electronic device 102 of FIG. 9) in the second area (e.g., the second area 920 of FIG. 9), the electronic device (e.g., the electronic device 101 of FIG. 9) may determine that the electronic device is located at a short distance from the external electronic device. According to an embodiment, the electronic device (the electronic device 101 of FIG. 9) may authenticate the external electronic device (e.g., the external electronic device 102 of FIG. 9), and may determine the second mode upon completion of the authentication. For example, as a criterion for determining the electronic device to operate in the second mode, based on the second signal (e.g., a BLE signal), at least some methods from among a method of using the strength of the second signal, a method of using a linear quadratic estimator, a method of using triangulation, a method of using an RTT, and a method of using a timestamp may be used.

According to various embodiments, the electronic device 101 (e.g., the electronic device 101 of FIG. 9) may display a second menu corresponding to the determined second mode in operation 1316. According to an embodiment, the electronic device 101 (e.g., the processor 120 of FIG. 1) may determine the operation mode of the electronic device (e.g., the electronic device 101 of FIG. 9) as the second mode, based on the second signal received in the second area (e.g., the second area 920 of FIG. 9), and may display the second menu corresponding to the determined second mode on a display (e.g., the display 160 of FIG. 1). According to an embodiment, the second menu may include at least some of the functions associated with the second mode that controls the external electronic device (e.g., the external electronic device 102 of FIG. 9). According to another embodiment, the second menu may include various information that provides convenience for a user when driving a vehicle, such as vehicle door lock/unlock control associated with the external electronic device (e.g., the external electronic device 102 of FIG. 9), engine on/off control, car seat control for a driver, or at least some functions of a smart key application for quickly controlling (or executing) the external electronic device (e.g., the external electronic device 102 of FIG. 9).

According to an embodiment, the electronic device (e.g., the electronic device 101 of FIG. 9) may transmit a control signal to the external electronic device (e.g., the external electronic device 102 of FIG. 9) such that the external electronic device (e.g., the external electronic device 102 of FIG. 9) in the second mode provides at least one function (e.g., vehicle door lock/unlock control, engine on/off control, car seat control for a driver, navigation on/off control, or the like).

According to various embodiments, in operation 1318, the electronic device (e.g., the electronic device 101 of FIG. 9) may determine the operation mode of the electronic device (e.g., the electronic device 101 of FIG. 9) as a first mode, based on a first signal received in a first area within the second area. According to an embodiment, when the first signal (e.g., a wireless charging signal) is received from the external electronic device (e.g., the external electronic device 102 of FIG. 9) in the first area (e.g., the first area 910 of FIG. 9), the electronic device (e.g., the electronic device 101 of FIG. 9) may determine that the electronic device is located very close to the external electronic device (e.g., the external electronic device 102 of FIG. 9) or is located in the vehicle. According to an embodiment, the external electronic device (e.g., the external electronic device 102 of FIG. 9) may monitor wireless charging efficiency provided by the electronic device (e.g., the electronic device 101 of FIG. 9) to estimate proximity to the electronic device (e.g., the electronic device 101 of FIG. 9). When it is identified that power greater than or equal to a predetermined level is used for charging, the external electronic device (e.g., the external electronic device 102 of FIG. 9) may determine whether the electronic device (e.g., the electronic device 101 of FIG. 9) exists at a short distance or exists inside the vehicle. For example, as a criterion for determining the electronic device to operate in the first mode, based on the first signal (e.g., a wireless charging signal), at least some of a method of using the strength of a wireless charging signal and a method of determining wireless charging efficiency may be used. For example, when the first signal is received from the external electronic device 102, the electronic device 101 (e.g., the processor 120) may control the electronic device 101 such that the electronic device 101 operates in the first mode. The first mode may include a function of wirelessly receiving power from the external electronic device 102. When the first signal is received, the electronic device 101 may activate a wireless charging module for wirelessly receiving power. The electronic device 101 may wirelessly receive power from the external electronic device 102 via the activated wireless charging module.

According to various embodiments, the electronic device 101 (e.g., the electronic device 101 of FIG. 9) may display a first menu corresponding to the determined first mode in operation 1320. According to an embodiment, the electronic device 101 (e.g., the processor 120 of FIG. 1) may determine the operation mode of the electronic device (e.g., the electronic device 101 of FIG. 9) as the first mode, based on the first signal received in the first area (e.g., the first area 910 of FIG. 9), and may display the first menu corresponding to the determined first mode on a display (e.g., the display 160 of FIG. 1). According to an embodiment, the first menu may include at least some from among information indicating wireless power reception from the external electronic device (e.g., the external electronic device 102 of FIG. 9) and a function associated with the first mode. According to another embodiment, the first menu may include various information associated with charging, such as the charging time, a charging rate, charging efficiency, or the like. According to an embodiment, the first menu may provide different functions according to whether the electronic device (e.g., the electronic device 101 of FIG. 9) exists inside or outside the external electronic device (e.g., the external electronic device 102 of FIG. 9).

The term "module" as used herein may refer, for example, to a unit including one of hardware, software, and firmware or any combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include, for example, and without limitation, at least one of a dedicated processor, a CPU, an Application-Specific Integrated Circuit (ASIC) chip, a Field-Programmable Gate Arrays (FPGA), and a programmable-logic device for performing operations, or the like, which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which can be executed in a computer using an interpreter, as well as machine codes made by a compiler or codes executable by a computer. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Furthermore, some operations may be executed in a different order or may be omitted, or other operations may be added. According to various embodiments, a storage medium stores instructions, and, in a method of communicating with an external electronic device by an electronic device, the instructions may include: a first instruction set to determine an area where the electronic device is located, based on a second signal that is used to communicate with the external electronic device via a wireless communication circuit when the external electronic device is located in a second area, based on a first signal that is used to communicate with the external electronic device via the wireless charging circuit when the external electronic device is located in a first area within the second area, or based on a combination of at least a part thereof; a second instruction set to determine an operation mode corresponding to the determined area; and a third instruction set to control operation of the electronic device, based on the determined operation mode.

Example embodiments illustrated and described in this specification and the drawings correspond to specific examples presented in order to easily describe technical contents of the present disclosure and to help comprehension of the present disclosure, and are not intended to limit the scope of the present disclosure. Therefore, it should be understood that, in addition to the embodiments disclosed herein, all modifications and changes or modified and changed forms derived from the technical idea of the present disclosure fall within the scope of the present disclosure.

What is claimed is:

1. An electronic device, comprising:
   a wireless communication circuit configured to support short-range communication;
   a wireless charging circuit configured to support wireless charging;
   at least one processor electrically connected to the wireless communication circuit and the wireless charging circuit; and
   a memory electronically connected to the at least one processor,
   wherein the memory stores instructions that, when executed by the at least one processor, are configured to cause the electronic device to perform operations comprising:
   identifying an area in which the electronic device is located, based on at least one of a second signal for communicating with an external electronic device via the wireless communication circuit when the external electronic device is located in a second area, a first signal for communicating with the external electronic device via the wireless charging circuit when the external electronic device is located in a first area within the second area, and a combination of at least a part of the first signal and the second signal;
   identifying an operation mode corresponding to the identified area; and
   controlling operation of the electronic device, based on the identified operation mode.

2. The electronic device of claim 1, wherein, when the external electronic device is located in a third area outside the second area, the instructions when executed by the at least one processor are configured to cause the electronic device to identify a distance to the external electronic device using a third signal for communicating with the external electronic device via the wireless communication circuit.

3. The electronic device of claim 2, wherein the instructions when executed by the at least one processor are configured to cause the electronic device to operate the external electronic device in different modes based on whether the external electronic device is located in the first area, the second area, or the third area.

4. The electronic device of claim 2, wherein the instructions when executed by the at least one processor are configured to cause the electronic device to perform operations further comprising:
   transmitting the third signal to the external electronic device for sensing the external electronic device;
   transmitting the second signal to the external electronic device, and receiving a response signal from the external electronic device in response to the transmitted second signal;
   identifying whether information associated with the external electronic device is the same as information associated with the external electronic device that is stored in advance in the memory, to authenticate the external electronic device; and
   maintaining connection with the external electronic device.

5. The electronic device of claim 2, wherein the instructions when executed by the at least one processor are configured to cause the electronic device to perform operations further comprising:
   identifying an operation mode of the electronic device as a first mode when the external electronic device is sensed in the first area;
   identifying the operation mode of the electronic device as a second mode when the external electronic device is sensed in the second area; and
   identifying the operation mode of the electronic device as a third mode when the external electronic device is sensed in the third area.

6. The electronic device of claim 5, wherein the first mode includes a function of wirelessly transmitting power to the external electronic device, the second mode includes a function of transmitting a control signal for controlling an operation of the external electronic device, and the third mode includes a function of outputting at least one alarm.

7. The electronic device of claim 5, wherein the instructions when executed by the at least one processor are configured to cause the electronic device to perform operations further comprising:
   wirelessly providing power to the external electronic device, based on the identified first mode;
   identifying an efficiency of the wirelessly provided power, and
   transmitting different functions, based on a comparison of the identified efficiency and a designated threshold value.

8. The electronic device of claim 2, wherein the first signal includes a wireless charging signal, the second signal includes a Bluetooth Low Energy (BLE) signal, and the third signal includes a BLE Long Range signal.

9. The electronic device of claim 1, wherein the instructions when executed by the at least one processor are configured to cause the electronic device to perform operations further comprising:
   identifying an area where the electronic device is located, based on proximity to the external electronic device obtained using at least one of a strength of a response signal transmitted in response to the second signal, adjustment of transmission power of the second signal, a round trip time of the second signal, signaling after connection with the external electronic device, or a combination of at least a part of the strength of the response signal, the adjustment of transmission power of the second signal and round trip time of the second signal.

10. The electronic device of claim 1, wherein the instructions when executed by the at least one processor configured to cause the electronic device to perform operations further comprising:
identifying proximity to the external electronic device using charging efficiency based on at least one of the first signal, adjustment of power of the wireless charging circuit, and a combination of at least a part of the proximity and the adjustment.

11. A method of communicating with an external electronic device by an electronic device, the method comprising:
identifying, by at least one processor of the electronic device, an area where the electronic device is located, by at least identifying a distance between the electronic device and the external electronic device, based on at least one of a second signal for communicating with the external electronic device via a wireless communication circuit of the electronic device when the external electronic device is located in a second area, a first signal for communicating with the external electronic device via a wireless charging circuit of the electronic device when the external electronic device is located in a first area within the second area, and a combination of at least a part of the first signal and the second signal, wherein the wireless communication circuit is configured to support short-range communication, and the wireless charging circuit is configured to support wireless charging;
identifying, by the at least one processor, an operation mode corresponding to the identified area where the electronic device is located from among a plurality of operation modes of the electronic device, wherein the plurality of operation modes respectively correspond to a plurality of areas including the identified area; and
controlling, by the at least one processor, an operation of the electronic device, based on the identified operation mode.

12. The method of claim 11, further comprising:
identifying, by the at least one processor, the distance to the external electronic device using a third signal for communicating with the external electronic device via the wireless communication circuit when the external electronic device is located in a third area outside the second area.

13. The method of claim 12, further comprising:
transmitting, by the at least one processor, the third signal to the external electronic device to sense the external electronic device;
transmitting, by the at least one processor, the second signal to the external electronic device, and receiving a response signal from the external electronic device in response to the transmitted second signal;
identifying, by the at least one processor, whether information associated with the external electronic device is the same as information associated with the external electronic device that is stored in advance in a memory of the electronic device, to authenticate the external electronic device; and
maintaining connection with the external electronic device.

14. The method of claim 12, further comprising:
identifying, by the at least one processor, the operation mode of the electronic device as a first mode when the external electronic device is sensed in the first area;
identifying, by the at least one processor, the operation mode of the electronic device as a second mode when the external electronic device is sensed in the second area; and
identifying, by the at least one processor, the operation mode of the electronic device as a third mode when the external electronic device is sensed in the third area.

15. The method of claim 14, further comprising:
wirelessly providing, by the at least one processor, the power to the external electronic device, based on the identified first mode, and identifying efficiency of the wirelessly provided power; and
providing, by the at least one processor, different functions based on a comparison of the identified efficiency and a designated threshold value.

16. An electronic device, comprising:
a housing;
a display exposed through a first part of the housing;
a wireless communication circuit configured to support short-range communication;
a wireless charging circuit configured to support wireless charging;
a power supply electrically connected to the wireless charging circuit;
at least one processor electrically connected to the wireless communication circuit and the wireless charging circuit; and
a memory electronically connected to the at least one processor,
wherein the memory is configured to store instructions that when executed by the at least one processor cause the electronic device to perform at least one operation comprising:
identifying a second mode, based on a second signal received from an external electronic device in a second area via the wireless communication circuit, and displaying a second menu corresponding to the identified second mode on the display; and
identifying a first mode, based on a first signal received in a first area within the second area via the wireless charging circuit, and displaying a first menu corresponding to the identified first mode on the display.

17. The electronic device of claim 16, wherein the instructions when executed by the at least one processor cause the electronic device to perform at least one operation further comprising:
identifying a third mode based on a third signal received in a third area outside the second area from the external electronic device via the wireless communication circuit, and
displaying a third menu corresponding to the identified third mode on the display.

18. The electronic device of claim 17, wherein the first mode includes a function for wirelessly receiving power from the external electronic device, the second mode includes a function of transmitting a control signal for controlling operation of the external electronic device, and the third mode includes a function for causing outputting at least one alarm from the external electronic device.

19. The electronic device of claim 17, wherein the first menu includes first information for wirelessly receiving power from the external electronic device, the second menu includes second information for controlling the external electronic device, and the third menu includes third information for controlling the external electronic device.

20. The electronic device of claim 17, wherein the instructions when executed by the at least one processor cause the electronic device to perform at least one operation further comprising:
   wirelessly receiving the power from the external electronic device, based on the identified first mode,
   identifying efficiency of the wirelessly provided power; and
   providing different functions, based on a comparison of the identified efficiency and a designated threshold value.

\* \* \* \* \*